United States Patent
Jani et al.

(10) Patent No.: US 11,930,830 B2
(45) Date of Patent: Mar. 19, 2024

(54) SYSTEM AND METHOD OF FORMING MULTILAYER CONFECTIONERY

(71) Applicant: INTERCONTINENTAL GREAT BRANDS LLC, East Hanover, NJ (US)

(72) Inventors: Bharat Jani, East Brunswick, NJ (US); Vesselin D. Miladinov, Denville, NJ (US)

(73) Assignee: INTERCONTINENTAL GREAT BRANDS LLC, East Hanover, NJ (US)

(*) Notice: Subject to any disclaimer, the term of this patent is extended or adjusted under 35 U.S.C. 154(b) by 263 days.

(21) Appl. No.: 17/136,802

(22) Filed: Dec. 29, 2020

(65) Prior Publication Data

US 2021/0127705 A1    May 6, 2021

Related U.S. Application Data

(62) Division of application No. 14/004,343, filed as application No. PCT/US2012/028232 on Mar. 8, 2012, now Pat. No. 10,973,238.

(60) Provisional application No. 61/451,805, filed on Mar. 11, 2011.

(51) Int. Cl.
| | | |
|---|---|---|
| *A23G 4/20* | (2006.01) | |
| *A23G 3/20* | (2006.01) | |
| *A23G 3/54* | (2006.01) | |
| *A23G 4/02* | (2006.01) | |
| *A23G 4/04* | (2006.01) | |

(52) U.S. Cl.
CPC .............. *A23G 4/20* (2013.01); *A23G 3/2023* (2013.01); *A23G 3/54* (2013.01); *A23G 4/02* (2013.01); *A23G 4/04* (2013.01)

(58) Field of Classification Search
CPC .......... A23G 4/20; A23G 3/2023; A23G 3/54; A23G 4/02; A23G 4/04
USPC ........................................................... 426/5
See application file for complete search history.

(56) References Cited

U.S. PATENT DOCUMENTS

| | | |
|---|---|---|
| 168,443 A | 10/1875 | Arend |
| 571,921 A | 11/1896 | Harton |
| 678,043 A | 7/1901 | Scott et al. |
| 1,006,902 A | 10/1911 | Bickerton |
| 1,357,665 A | 11/1920 | Watkins |
| 1,629,461 A | 5/1927 | Berg |
| 1,684,436 A | 9/1928 | Dellenbarger |
| 1,771,506 A | 7/1930 | Mustin |
| 1,829,029 A | 10/1931 | Zimmerli et al. |
| 1,871,346 A | 8/1932 | Savy |
| 1,879,897 A | 9/1932 | Gernelle-Danloy |
| 2,156,810 A | 5/1939 | Garbutt |
| 2,227,728 A | 1/1941 | Lombi |
| 2,496,548 A | 2/1950 | La Rosa et al. |
| 2,507,477 A | 5/1950 | McDonald et al. |
| 2,558,899 A | 7/1951 | Green |
| 2,604,056 A | 7/1952 | Mahle |
| 2,771,637 A | 11/1956 | Silvasy et al. |
| 2,941,655 A | 6/1960 | Wells |
| 3,215,407 A | 11/1965 | Dye |
| 3,215,536 A | 11/1965 | Simeone et al. |
| 3,366,992 A | 2/1968 | Seanor et al. |
| 3,384,498 A | 5/1968 | Ahrabi |
| 3,455,755 A | 7/1969 | Phillips |
| 3,464,609 A | 9/1969 | Murphy |
| 3,492,131 A | 1/1970 | Schlatter |
| 3,570,417 A | 3/1971 | Herrmann |
| 3,585,923 A | 6/1971 | Waller |
| 3,632,358 A | 1/1972 | Echeandia |
| 3,644,169 A | 2/1972 | Phillips |
| 3,652,377 A | 3/1972 | Helmick |
| 3,745,022 A | 7/1973 | Broeg et al. |
| 3,765,918 A | 10/1973 | Jordan et al. |
| 3,779,034 A | 12/1973 | Morgan |
| 3,779,410 A | 12/1973 | Phillips et al. |
| 3,806,290 A | 4/1974 | Graff et al. |
| 3,857,963 A | 12/1974 | Graff et al. |
| 3,866,571 A | 2/1975 | Austin et al. |
| 3,871,328 A | 3/1975 | English |
| 3,881,708 A | 5/1975 | Carle |
| 3,908,032 A | 9/1975 | Didelot et al. |
| 3,912,817 A | 10/1975 | Sapsowitz |
| B583,712 I5 | 2/1976 | Ehrgott |
| 3,962,463 A | 6/1976 | Witzel |
| 3,969,513 A | 7/1976 | Canonne |
| 3,995,064 A | 11/1976 | Ehrgott et al. |

(Continued)

FOREIGN PATENT DOCUMENTS

| | | |
|---|---|---|
| CA | 1253735 | 5/1989 |
| CN | 1048648 A | 1/1991 |

(Continued)

OTHER PUBLICATIONS

NPL "Bar Manufacturing" [Nov. 17, 2007 (Nov. 17, 2007), XP002678488, Retrieved from the Internet: URL:http://web.archive.org/ web/20061 1 17002445/http:/Awww.sollich.com/webEnglisch/produkte/riegelherstellung/conbarsuesswaren.php?navid=7 [retrieved on Jun. 25, 2012] (Year: 2007).*

(Continued)

*Primary Examiner* — Donald R Spamer
*Assistant Examiner* — Bhaskar Mukhopadhyay
(74) *Attorney, Agent, or Firm* — CANTOR COLBURN LLP

(57) ABSTRACT

A method and an apparatus for making a multilayer confectionery product provided. The method and apparatus include at least two sets of forming drums that form and laminate confectionery sheets.

10 Claims, 8 Drawing Sheets

(56) References Cited

U.S. PATENT DOCUMENTS

| | | |
|---|---|---|
| 4,032,661 A | 6/1977 | Rowsell et al. |
| 4,033,709 A | 7/1977 | Kroyer |
| 4,105,461 A | 8/1978 | Racciato |
| 4,117,645 A | 10/1978 | Phillips |
| 4,124,339 A | 11/1978 | Bernard |
| 4,136,163 A | 1/1979 | Watson et al. |
| 4,178,459 A | 12/1979 | Watson et al. |
| 4,187,320 A | 2/1980 | Koch et al. |
| 4,205,951 A | 6/1980 | Sollich |
| 4,217,368 A | 8/1980 | Witzel et al. |
| 4,229,484 A | 10/1980 | Steels et al. |
| 4,230,688 A | 10/1980 | Rowsell et al. |
| 4,238,510 A | 12/1980 | Cherukuri et al. |
| 4,250,196 A | 2/1981 | Friello |
| 4,266,920 A | 5/1981 | Hayashi et al. |
| 4,274,535 A | 6/1981 | Haas, Sr. et al. |
| 4,279,931 A | 7/1981 | Verwaerde et al. |
| 4,296,255 A | 10/1981 | Roswell et al. |
| 4,299,825 A | 11/1981 | Lee |
| 4,352,824 A | 10/1982 | Puglia et al. |
| 4,352,825 A | 10/1982 | Cherukuri et al. |
| 4,357,355 A | 11/1982 | Koch et al. |
| 4,370,350 A | 1/1983 | Fisher et al. |
| 4,379,169 A | 4/1983 | Reggio et al. |
| 4,382,962 A | 5/1983 | Devos et al. |
| 4,388,343 A | 6/1983 | Voss et al. |
| 4,405,647 A | 9/1983 | Fisher et al. |
| 4,428,679 A | 1/1984 | Fischer et al. |
| 4,431,678 A | 2/1984 | Sollich |
| 4,448,736 A | 5/1984 | Emery et al. |
| 4,454,834 A | 6/1984 | Haas, Sr. et al. |
| 4,459,311 A | 7/1984 | DeTora et al. |
| 4,459,425 A | 7/1984 | Amano et al. |
| 4,466,983 A | 8/1984 | Cifrese et al. |
| 4,472,437 A | 9/1984 | Corsello et al. |
| 4,473,299 A | 9/1984 | Guibert |
| 4,486,983 A | 12/1984 | Sunnen et al. |
| 4,490,046 A | 12/1984 | Guibert |
| 4,491,596 A | 1/1985 | Elias |
| 4,497,846 A | 2/1985 | Boursier et al. |
| 4,505,375 A | 3/1985 | Kuster |
| 4,510,271 A | 4/1985 | Muhle et al. |
| 4,519,844 A | 5/1985 | Chaux et al. |
| 4,524,086 A | 6/1985 | Player et al. |
| 4,541,824 A | 9/1985 | Muller |
| 4,555,407 A | 11/1985 | Kramer et al. |
| 4,557,938 A | 12/1985 | Sander et al. |
| 4,562,076 A | 12/1985 | Arnold et al. |
| 4,579,738 A | 4/1986 | Cherukuri et al. |
| 4,587,125 A | 5/1986 | Cherukuri et al. |
| 4,599,002 A | 7/1986 | Gutknecht |
| 4,607,099 A | 8/1986 | Kanda et al. |
| 4,612,355 A | 9/1986 | Belz |
| 4,614,264 A | 9/1986 | Fishburne |
| 4,614,654 A | 9/1986 | Ream et al. |
| 4,619,834 A | 10/1986 | Zanno et al. |
| 4,656,039 A | 4/1987 | Weiss et al. |
| 4,659,014 A | 4/1987 | Soth et al. |
| 4,671,961 A | 6/1987 | Patel et al. |
| 4,692,478 A | 9/1987 | Viswanathan et al. |
| 4,693,888 A | 9/1987 | Miyahara et al. |
| 4,711,784 A | 12/1987 | Yang |
| 4,724,151 A | 2/1988 | Mansukhani et al. |
| 4,728,515 A | 3/1988 | Patel et al. |
| 4,747,881 A | 5/1988 | Shaw et al. |
| 4,757,892 A | 7/1988 | Wenger |
| 4,764,020 A | 8/1988 | Moriyama |
| 4,753,790 A | 10/1988 | Silva et al. |
| 4,792,495 A | 12/1988 | Taniguchi et al. |
| 4,806,364 A | 2/1989 | Kubota et al. |
| 4,816,265 A | 3/1989 | Cherukuri et al. |
| 4,832,962 A | 5/1989 | Oppenheimer et al. |
| 4,840,491 A | 6/1989 | Hagiwara et al. |
| 4,850,842 A | 7/1989 | Van Alstine |
| 4,876,095 A | 10/1989 | Yang |
| 4,882,172 A | 11/1989 | Van Alstine |
| 4,882,175 A | 11/1989 | Ream et al. |
| 4,882,176 A | 11/1989 | Koyama et al. |
| 4,900,156 A | 2/1990 | Bauer |
| 4,906,102 A | 3/1990 | Schwarz et al. |
| 4,911,937 A | 3/1990 | Crosello et al. |
| 4,915,958 A | 4/1990 | Fanst et al. |
| 4,929,447 A | 5/1990 | Yang |
| 4,929,508 A | 5/1990 | Sharma et al. |
| 4,933,183 A | 6/1990 | Sharma et al. |
| 4,933,189 A | 6/1990 | Cherukuri |
| 4,933,190 A | 6/1990 | Cherukuri et al. |
| 4,935,242 A | 6/1990 | Sharma et al. |
| 4,938,128 A | 7/1990 | Knebel |
| 4,940,594 A | 7/1990 | Van Alstine |
| 4,971,806 A | 11/1990 | Cherukuri et al. |
| 4,980,177 A | 12/1990 | Cherukuri et al. |
| 4,980,178 A | 12/1990 | Cherukuri et al. |
| 4,981,698 A | 1/1991 | Cherukuri et al. |
| 4,997,659 A | 3/1991 | Yatka et al. |
| 5,009,893 A | 4/1991 | Cherukuri et al. |
| 5,009,916 A | 4/1991 | Colliopoulos |
| 5,045,325 A | 9/1991 | Lesko et al. |
| 5,045,326 A | 9/1991 | Glass et al. |
| 5,085,872 A | 2/1992 | Patel et al. |
| 5,110,607 A | 5/1992 | Yang |
| 5,110,608 A | 5/1992 | Cherukuri et al. |
| 5,125,819 A | 6/1992 | Hager et al. |
| 5,126,151 A | 6/1992 | Bodor et al. |
| 5,128,155 A | 7/1992 | Song et al. |
| 5,135,760 A | 8/1992 | Degady et al. |
| 5,141,128 A | 8/1992 | Pippin |
| 5,158,725 A | 10/1992 | Handa et al. |
| 5,164,210 A | 11/1992 | Campbell et al. |
| 5,170,877 A | 12/1992 | Francioni |
| 5,171,589 A | 12/1992 | Richey et al. |
| 5,192,561 A | 3/1993 | Bunczek et al. |
| 5,192,562 A | 3/1993 | Grey et al. |
| 5,205,106 A | 4/1993 | Zimmermann et al. |
| 5,213,724 A | 5/1993 | Saatkamp |
| 5,217,735 A | 6/1993 | Zibell |
| 5,223,282 A | 6/1993 | Patel et al. |
| 5,227,154 A | 7/1993 | Reynolds |
| 5,229,148 A | 7/1993 | Copper |
| 5,236,720 A | 8/1993 | Cherukuri |
| 5,266,592 A | 11/1993 | Grub et al. |
| 5,283,021 A | 2/1994 | Shih |
| 5,286,502 A | 2/1994 | Meyers |
| 5,300,305 A | 4/1994 | Stapler et al. |
| 5,310,955 A | 5/1994 | Shirtum et al. |
| 5,324,530 A | 6/1994 | Kehoe et al. |
| 5,334,397 A | 8/1994 | Ream et al. |
| 5,344,664 A | 9/1994 | Fitch et al. |
| 5,366,740 A | 11/1994 | Shaw et al. |
| 5,378,131 A | 1/1995 | Greenberg |
| 5,384,144 A | 1/1995 | Bedard et al. |
| 5,397,580 A | 3/1995 | Song et al. |
| 5,405,623 A | 4/1995 | Barkalow et al. |
| 5,407,665 A | 4/1995 | McLaughlin et al. |
| 5,409,715 A | 4/1995 | Meyers |
| 5,419,919 A | 5/1995 | Song et al. |
| 5,425,962 A | 6/1995 | Johnson et al. |
| 5,429,827 A | 7/1995 | Song et al. |
| 5,433,960 A | 7/1995 | Meyers |
| 5,436,013 A | 7/1995 | Synosky et al. |
| 5,437,879 A | 8/1995 | Kabse et al. |
| 5,441,750 A | 8/1995 | Synosky et al. |
| 5,474,787 A | 12/1995 | Grey et al. |
| 5,478,593 A | 12/1995 | Serpelloni et al. |
| 5,486,366 A | 1/1996 | Song et al. |
| 5,494,685 A | 2/1996 | Tyrpin et al. |
| 5,520,457 A | 5/1996 | Gontero et al. |
| 5,523,097 A | 6/1996 | Song et al. |
| 5,534,281 A | 7/1996 | Pappas et al. |
| 5,538,742 A | 7/1996 | McHale et al. |
| 5,543,160 A | 8/1996 | Song et al. |
| 5,545,416 A | 8/1996 | Broderick et al. |
| 5,545,424 A | 8/1996 | Nakatsu |
| 5,547,689 A | 8/1996 | Ribadeau-Dumas et al. |

(56) References Cited

U.S. PATENT DOCUMENTS

| | | |
|---|---|---|
| 5,554,416 A | 9/1996 | Scheufler et al. |
| 5,562,936 A | 10/1996 | Song et al. |
| 5,567,450 A | 10/1996 | Zuromski et al. |
| 5,571,543 A | 11/1996 | Song et al. |
| 5,595,757 A | 1/1997 | Kiefer et al. |
| 5,601,858 A | 2/1997 | Mansukhani et al. |
| 5,611,420 A | 3/1997 | Heim et al. |
| 5,612,071 A | 3/1997 | Song et al. |
| 5,614,234 A | 3/1997 | Song et al. |
| 5,629,042 A | 5/1997 | Serpelloni et al. |
| 5,637,334 A | 6/1997 | Yatka et al. |
| 5,650,232 A | 7/1997 | Glenn et al. |
| 5,665,406 A | 9/1997 | Reed et al. |
| 5,679,389 A | 10/1997 | Wong et al. |
| 5,679,397 A | 10/1997 | Kuroda et al. |
| 5,698,181 A | 12/1997 | Luo |
| 5,714,119 A | 2/1998 | Kawagoe et al. |
| 5,733,583 A | 3/1998 | Muller |
| 5,756,020 A | 5/1998 | Locke et al. |
| 5,756,133 A | 5/1998 | Duggan et al. |
| 5,773,053 A | 6/1998 | Song et al. |
| 5,789,002 A | 8/1998 | Duggan et al. |
| 5,792,494 A | 8/1998 | Kanca et al. |
| 5,792,495 A | 8/1998 | Degady et al. |
| 5,800,847 A | 9/1998 | Song et al. |
| 5,820,821 A | 10/1998 | Kawagoe et al. |
| 5,827,549 A | 10/1998 | Rancich et al. |
| 5,837,302 A | 11/1998 | Degady et al. |
| 5,853,243 A | 12/1998 | Duggan et al. |
| 5,879,728 A | 3/1999 | Graff et al. |
| 5,908,645 A | 6/1999 | Townsend et al. |
| 5,915,524 A | 6/1999 | Horlacher |
| 5,925,387 A | 7/1999 | Gimmler et al. |
| 5,938,826 A | 8/1999 | Baker et al. |
| 5,944,266 A | 8/1999 | Degady et al. |
| 5,955,116 A | 9/1999 | Kehoe et al. |
| 5,955,123 A | 9/1999 | Daggy |
| 5,958,472 A | 9/1999 | Robinson et al. |
| 5,971,739 A | 10/1999 | Hoffman et al. |
| 5,972,392 A | 10/1999 | Kopecky et al. |
| 5,976,581 A | 11/1999 | Song et al. |
| 6,004,589 A | 12/1999 | Song et al. |
| 6,010,723 A | 1/2000 | Song et al. |
| 6,017,565 A | 1/2000 | Rancich et al. |
| 6,017,566 A | 1/2000 | Bunczek et al. |
| 6,030,647 A | 2/2000 | Song et al. |
| 6,045,855 A | 4/2000 | Lindqvist |
| 6,056,429 A | 5/2000 | Duggan et al. |
| 6,074,135 A | 6/2000 | Tapphorn et al. |
| 6,080,432 A | 6/2000 | Tyrpin et al. |
| 6,086,925 A | 7/2000 | Song et al. |
| 6,103,159 A | 8/2000 | Schutze et al. |
| 6,159,509 A | 12/2000 | Johnson et al. |
| 6,168,306 B1 | 1/2001 | Degady et al. |
| 6,190,706 B1 | 2/2001 | Bunczek et al. |
| 6,200,608 B1 | 3/2001 | Gmunder et al. |
| 6,214,389 B1 | 4/2001 | Hoffman et al. |
| 6,221,421 B1 | 4/2001 | Wullschleger et al. |
| 6,235,318 B1 | 5/2001 | Lombarday, Jr. et al. |
| 6,238,710 B1 | 5/2001 | Song et al. |
| 6,254,373 B1 | 7/2001 | Hoffman et al. |
| 6,270,826 B1 | 8/2001 | Kashulines, Jr. et al. |
| 6,277,385 B1 | 8/2001 | Luke |
| 6,280,780 B1 | 8/2001 | Degady et al. |
| 6,312,740 B1 | 11/2001 | Roberts |
| 6,314,389 B2 | 11/2001 | Milsom |
| 6,350,480 B1 | 2/2002 | Urnezis et al. |
| 6,375,448 B1 | 4/2002 | Duggan et al. |
| 6,436,326 B1 | 8/2002 | Keillor, III |
| 6,436,461 B1 | 8/2002 | Bouwmeesters et al. |
| 6,436,899 B2 | 8/2002 | Portman |
| 6,440,240 B1 | 8/2002 | Ohman |
| 6,440,472 B1 | 8/2002 | Song et al. |
| 6,444,240 B1 | 9/2002 | Barkalow et al. |
| 6,455,080 B1 | 9/2002 | Wolf et al. |
| 6,458,427 B2 | 10/2002 | Bertellotti et al. |
| 6,468,962 B1 | 10/2002 | Portman |
| 6,471,945 B2 | 10/2002 | Luo et al. |
| 6,479,071 B2 | 11/2002 | Holme et al. |
| 6,485,739 B2 | 11/2002 | Luo et al. |
| 6,551,643 B2 | 4/2003 | Bernatz et al. |
| 6,555,146 B2 | 4/2003 | Rapp et al. |
| 6,558,690 B2 | 5/2003 | Portman |
| 6,558,752 B2 | 5/2003 | Bellemare et al. |
| 6,562,382 B1 | 5/2003 | Corriveau et al. |
| 6,578,232 B2 | 6/2003 | Salice |
| 6,592,884 B2 | 7/2003 | Hofmann et al. |
| 6,601,708 B1 | 8/2003 | Degady et al. |
| 6,620,243 B1 | 9/2003 | Bertellotti et al. |
| 6,623,266 B2 | 9/2003 | Jani et al. |
| 6,627,233 B1 | 9/2003 | Wolf et al. |
| 6,630,182 B1 | 10/2003 | Warrington et al. |
| 6,685,916 B1 | 2/2004 | Holme et al. |
| 6,696,044 B2 | 2/2004 | Luo et al. |
| 6,716,815 B2 | 4/2004 | Portman |
| 6,733,818 B2 | 5/2004 | Luo et al. |
| 6,743,453 B2 | 6/2004 | Warrington et al. |
| 6,759,066 B2 | 7/2004 | Savage et al. |
| 6,773,716 B2 | 8/2004 | Ream et al. |
| 6,773,730 B1 | 8/2004 | Liu et al. |
| 6,776,288 B2 | 8/2004 | Kopecky |
| 6,780,443 B1 | 8/2004 | Nakatsu |
| 6,783,783 B2 | 8/2004 | Clark et al. |
| 6,803,061 B1 | 10/2004 | Foster |
| 6,811,797 B1 | 11/2004 | Wolfe et al. |
| 6,838,431 B2 | 1/2005 | Portman |
| 6,846,500 B1 | 1/2005 | Luo et al. |
| 6,858,237 B1 | 2/2005 | Wolfe et al. |
| 6,878,390 B2 | 4/2005 | Murray et al. |
| 6,929,814 B2 | 8/2005 | Bouwmeesters et al. |
| 6,964,779 B1 | 11/2005 | Hayakawa et al. |
| 6,974,597 B2 | 12/2005 | Ohta et al. |
| 7,022,352 B2 | 4/2006 | Castro et al. |
| 7,030,273 B1 | 4/2006 | Sun |
| 7,087,254 B1 | 8/2006 | Wolfe et al. |
| 7,112,345 B1 | 9/2006 | McHale et al. |
| 7,115,288 B2 | 10/2006 | Witkewitz et al. |
| 7,189,760 B2 | 3/2007 | Erman et al. |
| 7,244,454 B1 | 7/2007 | Zyck et al. |
| 7,300,679 B1 | 11/2007 | Robinson et al. |
| 7,438,942 B2 | 10/2008 | Ortiz De Zaratte et al. |
| 7,442,026 B2 | 10/2008 | Shulski et al. |
| 7,537,792 B2 | 5/2009 | Niekerk et al. |
| 7,578,874 B2 | 8/2009 | Benjamin et al. |
| 7,581,872 B2 | 9/2009 | Allen |
| 7,637,999 B2 | 12/2009 | Struschka et al. |
| 7,641,926 B2 | 1/2010 | Kabse et al. |
| 7,732,020 B2 | 6/2010 | King et al. |
| 7,736,681 B2 | 6/2010 | Belzowski et al. |
| 7,771,182 B2 | 8/2010 | Fornaguera |
| 7,786,191 B2 | 8/2010 | De Koning et al. |
| 7,810,446 B2 | 10/2010 | Degady et al. |
| 8,114,211 B2 | 2/2012 | Handrosch et al. |
| 8,226,401 B2 | 7/2012 | Olejarski et al. |
| 9,028,894 B2 | 5/2015 | Olejarski et al. |
| 9,060,526 B2 | 6/2015 | Jani |
| 9,693,570 B2 | 7/2017 | Miladinov et al. |
| 9,700,064 B2 | 7/2017 | Miladinov et al. |
| 9,700,065 B2 | 7/2017 | Miladinov et al. |
| 2001/0001512 A1 | 5/2001 | Voss |
| 2001/0002274 A1 | 5/2001 | Lessmeister et al. |
| 2002/0028276 A1 | 3/2002 | Rapp et al. |
| 2002/0034592 A1 | 3/2002 | Hogan et al. |
| 2002/0038160 A1 | 3/2002 | Maynard et al. |
| 2002/0058102 A1 | 5/2002 | Makela et al. |
| 2002/0114863 A1 | 8/2002 | Ream et al. |
| 2002/0192330 A1 | 12/2002 | Bunkers et al. |
| 2002/0197388 A1 | 12/2002 | Brown et al. |
| 2003/0044486 A1 | 3/2003 | Wargocki et al. |
| 2003/0072842 A1 | 4/2003 | Johnson et al. |
| 2003/0099741 A1 | 5/2003 | Gubler |
| 2003/0124228 A1 | 7/2003 | Goto et al. |
| 2003/0124234 A1 | 7/2003 | Hayashi et al. |
| 2003/0157213 A1 | 8/2003 | Jenkins |

(56) References Cited

U.S. PATENT DOCUMENTS

| | | |
|---|---|---|
| 2003/0160358 A1 | 8/2003 | De Koning et al. |
| 2003/0161914 A1 | 8/2003 | Sault et al. |
| 2003/0185961 A1 | 10/2003 | Sault et al. |
| 2003/0190397 A1 | 10/2003 | Serpelloni |
| 2003/0206993 A1 | 11/2003 | Gubler |
| 2003/0215417 A1 | 11/2003 | Uchiyama et al. |
| 2004/0081713 A1 | 4/2004 | Maxwell et al. |
| 2004/0096544 A1 | 5/2004 | Yatka et al. |
| 2004/0136928 A1 | 7/2004 | Holme et al. |
| 2004/0234648 A1 | 11/2004 | Mazurek et al. |
| 2005/0008732 A1 | 1/2005 | Gebreselassie et al. |
| 2005/0008747 A1 | 1/2005 | Barkalow et al. |
| 2005/0025721 A1 | 2/2005 | Holme et al. |
| 2005/0047267 A1 | 3/2005 | Gneuss et al. |
| 2005/0091873 A1 | 5/2005 | Maryakhin |
| 2005/0112236 A1 | 5/2005 | Boghani et al. |
| 2005/0202118 A1 | 9/2005 | Johnson et al. |
| 2005/0220867 A1 | 10/2005 | Boghani et al. |
| 2005/0222256 A1 | 10/2005 | Erman et al. |
| 2005/0265930 A1 | 12/2005 | Erman et al. |
| 2005/0266091 A1 | 12/2005 | Lyons et al. |
| 2006/0019005 A1 | 1/2006 | Talbot |
| 2006/0024425 A1 | 2/2006 | Barkalow et al. |
| 2006/0034975 A1 | 2/2006 | Schechner et al. |
| 2006/0039872 A1 | 2/2006 | Schmidt |
| 2006/0045934 A1 | 3/2006 | Kabse et al. |
| 2006/0057276 A1 | 3/2006 | Carcasona et al. |
| 2006/0078508 A1 | 4/2006 | Gebreselassie et al. |
| 2006/0078509 A1 | 4/2006 | Gebreselassie et al. |
| 2006/0147585 A1 | 7/2006 | Winckelmann et al. |
| 2006/0165833 A1 | 7/2006 | Muschalik et al. |
| 2006/0228451 A1 | 10/2006 | Martin |
| 2006/0280834 A1 | 12/2006 | Jani et al. |
| 2006/0280934 A1 | 12/2006 | Wenz et al. |
| 2006/0286220 A1 | 12/2006 | King |
| 2006/0292271 A1 | 12/2006 | King |
| 2007/0014889 A1 | 1/2007 | McHale et al. |
| 2007/0042079 A1 | 2/2007 | Miladinov et al. |
| 2007/0065557 A1 | 3/2007 | Pandey et al. |
| 2007/0076170 A1 | 4/2007 | Lin et al. |
| 2007/0082026 A1 | 4/2007 | Aimutis, Jr. et al. |
| 2007/0141198 A1 | 6/2007 | Yang |
| 2007/0148284 A1 | 6/2007 | Jani et al. |
| 2007/0160707 A1 | 7/2007 | Garcia |
| 2007/0218165 A1 | 9/2007 | Castro et al. |
| 2007/0224311 A1 | 9/2007 | Grey et al. |
| 2007/0231424 A1 | 10/2007 | Castro et al. |
| 2007/0231425 A1 | 10/2007 | Ream et al. |
| 2007/0231426 A1 | 10/2007 | Acar et al. |
| 2007/0231427 A1 | 10/2007 | Ream |
| 2007/0231434 A1 | 10/2007 | Ream et al. |
| 2007/0269577 A1 | 11/2007 | Pershad et al. |
| 2008/0014302 A1 | 1/2008 | Elejalde et al. |
| 2008/0050605 A1 | 2/2008 | Rapp et al. |
| 2008/0057154 A1 | 3/2008 | Acar |
| 2008/0057155 A1 | 3/2008 | Luo et al. |
| 2008/0063748 A1 | 3/2008 | Massey et al. |
| 2008/0075830 A1 | 3/2008 | Wen et al. |
| 2008/0085354 A1 | 4/2008 | Paeschke et al. |
| 2008/0095899 A1 | 4/2008 | Fornaguera |
| 2008/0107771 A1 | 5/2008 | Fabre et al. |
| 2008/0152756 A1 | 6/2008 | Ream et al. |
| 2008/0159921 A1 | 7/2008 | Mizumoto et al. |
| 2008/0166449 A1 | 7/2008 | Kabse et al. |
| 2008/0166477 A1 | 7/2008 | Rowe et al. |
| 2008/0178802 A1 | 7/2008 | Sakakibara et al. |
| 2008/0199564 A1 | 8/2008 | Boghani et al. |
| 2008/0241319 A1 | 10/2008 | Pandey et al. |
| 2008/0265055 A1 | 10/2008 | Quan et al. |
| 2008/0265056 A1 | 10/2008 | Quan et al. |
| 2009/0029018 A1 | 1/2009 | Elejalde et al. |
| 2009/0053390 A1 | 2/2009 | Sakou et al. |
| 2009/0074924 A1 | 3/2009 | Scudieri et al. |
| 2009/0130251 A1 | 5/2009 | Perry et al. |
| 2009/0135100 A1 | 5/2009 | Kim et al. |
| 2009/0142444 A1 | 6/2009 | Jarrard, Jr. et al. |
| 2009/0155423 A1 | 6/2009 | Moore et al. |
| 2009/0162475 A1 | 6/2009 | Duggan et al. |
| 2009/0162476 A1 | 6/2009 | Duggan et al. |
| 2009/0214719 A1 | 8/2009 | Gouin et al. |
| 2009/0220656 A1 | 9/2009 | Fabre et al. |
| 2009/0238027 A1 | 9/2009 | Yamaguchi et al. |
| 2009/0280211 A1 | 11/2009 | Friedman et al. |
| 2009/0327276 A1 | 12/2009 | Thurlow et al. |
| 2010/0055264 A1 | 3/2010 | Liniger et al. |
| 2010/0055280 A1 | 3/2010 | Simon |
| 2010/0062867 A1 | 3/2010 | Chen |
| 2010/0077956 A1 | 4/2010 | Zuehlke et al. |
| 2010/0136165 A1 | 6/2010 | Miladinov et al. |
| 2010/0136184 A1 | 6/2010 | Miladinov et al. |
| 2010/0136185 A1 | 6/2010 | Miladinov et al. |
| 2010/0166934 A1 | 7/2010 | Caiger et al. |
| 2010/0178382 A1 | 7/2010 | Olejarski et al. |
| 2010/0233332 A1 | 9/2010 | Xing et al. |
| 2011/0052756 A1 | 3/2011 | Cervenka et al. |
| 2011/0104330 A1 | 5/2011 | Colle et al. |
| 2011/0178382 A1 | 7/2011 | Topp |
| 2011/0183044 A1 | 7/2011 | Zimmermann et al. |
| 2011/0217427 A1 | 9/2011 | Vaman et al. |
| 2011/0256305 A1 | 10/2011 | Jacques et al. |
| 2012/0207875 A1 | 8/2012 | Aldridge et al. |
| 2012/0207888 A1 | 8/2012 | King |
| 2012/0229325 A1 | 9/2012 | Dutruc |
| 2012/0234942 A1 | 9/2012 | Unosawa et al. |
| 2013/0055907 A1 | 3/2013 | Brandt, Jr. et al. |
| 2013/0202734 A1 | 8/2013 | Jani et al. |
| 2013/0209605 A1 | 8/2013 | Adivi et al. |
| 2013/0209606 A1 | 8/2013 | Boudy et al. |
| 2013/0209644 A1 | 8/2013 | Miladinov et al. |
| 2013/0216661 A1 | 8/2013 | Miladinov et al. |
| 2014/0287091 A1 | 9/2014 | Jani et al. |
| 2014/0302195 A1 | 10/2014 | Jani et al. |
| 2014/0302196 A1 | 10/2014 | Jani et al. |
| 2015/0250202 A1 | 9/2015 | Jani |
| 2016/0205965 A1 | 7/2016 | Elejalde et al. |
| 2016/0324183 A1 | 11/2016 | Jani |
| 2016/0330993 A1 | 11/2016 | Grant et al. |
| 2017/0059749 A1 | 3/2017 | Wakatsuki |
| 2017/0071226 A1 | 3/2017 | Modak |
| 2017/0099854 A1 | 4/2017 | Mecrin et al. |
| 2017/0124550 A1 | 5/2017 | Oberli et al. |
| 2017/0215455 A1 | 8/2017 | Buck et al. |
| 2017/0251693 A1 | 9/2017 | Miladinov et al. |
| 2017/0258107 A1 | 9/2017 | Miladinov et al. |
| 2017/0265493 A1 | 9/2017 | Miladinov et al. |
| 2019/0230954 A1 | 8/2019 | Jani et al. |
| 2021/0360942 A1 | 11/2021 | Jani et al. |

FOREIGN PATENT DOCUMENTS

| | | |
|---|---|---|
| CN | 1423525 A | 6/2003 |
| CN | 1464774 A | 12/2003 |
| CN | 1324976 C | 7/2007 |
| CN | 101031207 A | 9/2007 |
| CN | 101179943 A | 5/2008 |
| CN | 101448405 A | 6/2009 |
| CN | 101448407 A | 6/2009 |
| CN | 101453904 A | 6/2009 |
| CN | 101478885 A | 7/2009 |
| CN | 101605463 A | 12/2009 |
| CN | 101708026 A | 5/2010 |
| CN | 101873803 A | 10/2010 |
| CN | 102046020 A | 5/2011 |
| CN | 102652528 A | 9/2012 |
| DE | 3933745 A1 | 4/1991 |
| DE | 10035461 B4 | 2/2002 |
| DE | 10338217 B3 | 1/2005 |
| DE | 112005002546 T5 | 9/2007 |
| EA | 0007647 B1 | 12/2006 |
| EP | 0150934 A2 | 7/1985 |
| EP | 0231984 A2 | 8/1987 |
| EP | 0273809 A2 | 7/1988 |
| EP | 0438923 A1 | 7/1991 |
| EP | 0657101 A1 | 6/1995 |

(56) References Cited

FOREIGN PATENT DOCUMENTS

| | | |
|---|---|---|
| EP | 0732057 A1 | 9/1996 |
| EP | 0831028 A1 | 3/1998 |
| EP | 0941768 A2 | 9/1999 |
| EP | 0979714 A1 | 2/2000 |
| EP | 1250847 | 10/2002 |
| EP | 1264544 A2 | 12/2002 |
| EP | 0980407 B1 | 7/2003 |
| EP | 0759703 B1 | 9/2003 |
| EP | 1410718 A1 | 4/2004 |
| EP | 1514483 A1 | 3/2005 |
| EP | 1061814 B1 | 8/2006 |
| EP | 1894476 A2 | 3/2008 |
| EP | 2206437 A1 | 7/2010 |
| EP | 2260717 A1 | 12/2010 |
| EP | 2575493 A2 | 4/2013 |
| EP | 2712506 A1 | 4/2014 |
| EP | 2774492 A2 | 9/2014 |
| FR | 2350146 A2 | 12/1977 |
| FR | 2635441 A1 | 2/1990 |
| GB | 359458 | 10/1931 |
| GB | 639695 | 7/1950 |
| GB | 746101 A | 3/1956 |
| GB | 831028 | 3/1960 |
| GB | 2053651 A | 3/1960 |
| GB | 1441446 A | 6/1976 |
| GB | 1497507 A | 1/1978 |
| GB | 2034572 A | 6/1980 |
| GB | 2042969 A | 10/1980 |
| GB | 2120517 A | 12/1983 |
| GB | 2124468 A | 2/1984 |
| JP | S4706226 Y1 | 3/1972 |
| JP | S52082756 A | 7/1977 |
| JP | S52082758 A | 7/1977 |
| JP | S54049367 A | 4/1979 |
| JP | S55135548 A | 10/1980 |
| JP | S5639748 A | 4/1981 |
| JP | S56158971 A | 12/1981 |
| JP | S5862898 U | 4/1983 |
| JP | S58111644 A | 7/1983 |
| JP | S59111445 A | 6/1984 |
| JP | S59163381 | 11/1984 |
| JP | S60186250 A | 9/1985 |
| JP | S6128391 U | 2/1986 |
| JP | 61162136 | 7/1986 |
| JP | S61162136 A | 7/1986 |
| JP | S61181367 A | 8/1986 |
| JP | 63177758 A | 1/1987 |
| JP | S62205753 A | 9/1987 |
| JP | S62224275 A | 10/1987 |
| JP | S63167744 A | 7/1988 |
| JP | S63177758 A | 7/1988 |
| JP | 63273438 | 11/1988 |
| JP | S63273438 A | 11/1988 |
| JP | 6460332 A | 3/1989 |
| JP | S6460332 A | 3/1989 |
| JP | 02286307 A | 11/1990 |
| JP | H04179445 A | 6/1992 |
| JP | H04215867 A | 8/1992 |
| JP | H0646760 A | 2/1994 |
| JP | H06189689 A | 7/1994 |
| JP | 07067554 A | 3/1995 |
| JP | H07132051 A | 5/1995 |
| JP | H07233046 A | 9/1995 |
| JP | 2504105 B2 | 6/1996 |
| JP | H08191665 A | 7/1996 |
| JP | H0923862 A | 1/1997 |
| JP | H0965833 A | 3/1997 |
| JP | H09065833 A | 3/1997 |
| JP | H09205994 A | 8/1997 |
| JP | H11507243 A | 6/1999 |
| JP | 2000004792 A | 1/2000 |
| JP | 2000166477 A | 6/2000 |
| JP | 2001512985 A | 8/2001 |
| JP | 2002017266 A | 1/2002 |
| JP | 2002045117 A | 2/2002 |
| JP | 2002176904 A | 6/2002 |
| JP | 2002516672 A | 6/2002 |
| JP | 2002320453 A | 11/2002 |
| JP | 2003508039 A | 3/2003 |
| JP | 2004506434 A | 3/2004 |
| JP | 2004141004 A | 5/2004 |
| JP | 2004520849 A | 7/2004 |
| JP | 2004314106 A | 11/2004 |
| JP | 2004321096 A | 11/2004 |
| JP | 2006102571 A | 4/2006 |
| JP | 2006204185 A | 8/2006 |
| JP | 2006280216 A1 | 10/2006 |
| JP | 2006345781 A | 12/2006 |
| JP | 2007000798 A | 1/2007 |
| JP | 2007028951 A | 2/2007 |
| JP | 2007029018 A | 2/2007 |
| JP | 2007215450 A | 8/2007 |
| JP | 2008510491 A | 4/2008 |
| JP | 2004517627 A | 5/2008 |
| JP | 2008539804 A | 11/2008 |
| JP | 2010011875 A | 1/2010 |
| JP | 4461255 B2 | 5/2010 |
| JP | 2010515460 A | 5/2010 |
| JP | 4711754 B2 | 6/2011 |
| JP | 2012510273 A | 5/2012 |
| JP | 2012512630 A | 6/2012 |
| JP | 2012516676 A | 7/2012 |
| JP | 2013508279 A | 3/2013 |
| JP | 2013513299 A | 4/2013 |
| JP | 2013513302 A | 4/2013 |
| JP | 2013517767 A | 5/2013 |
| JP | 2013172735 A | 9/2013 |
| JP | 5667071 B2 | 2/2015 |
| JP | 6018625 B2 | 11/2016 |
| JP | 6046760 B2 | 12/2016 |
| KR | 20090039105 | 4/2009 |
| KR | 100919653 B1 | 9/2009 |
| RU | 2214720 | 10/2003 |
| RU | 2325071 C1 | 5/2008 |
| SU | 566505 A3 | 7/1977 |
| SU | 839470 A1 | 6/1981 |
| WO | 9422323 A1 | 10/1994 |
| WO | 9734708 A1 | 9/1997 |
| WO | 9851750 A1 | 11/1998 |
| WO | 9944436 A1 | 9/1999 |
| WO | 9945791 A1 | 9/1999 |
| WO | 0033971 A1 | 6/2000 |
| WO | 0141583 A1 | 6/2001 |
| WO | 0215708 A2 | 2/2002 |
| WO | 0217851 A2 | 3/2002 |
| WO | 200217851 A2 | 3/2002 |
| WO | 02056697 A1 | 7/2002 |
| WO | 200306800 | 1/2003 |
| WO | 03047360 A1 | 6/2003 |
| WO | 03068000 A1 | 8/2003 |
| WO | 2004073691 A1 | 9/2004 |
| WO | 2004112971 A1 | 12/2004 |
| WO | 2005089255 A2 | 9/2005 |
| WO | 2006026298 A3 | 3/2006 |
| WO | 2006043535 | 4/2006 |
| WO | 2006125334 A1 | 11/2006 |
| WO | 2006127277 A2 | 11/2006 |
| WO | 2007056685 A2 | 5/2007 |
| WO | 2007076170 A2 | 7/2007 |
| WO | 2007109718 | 9/2007 |
| WO | 2008030274 A1 | 3/2008 |
| WO | 2008045259 A2 | 4/2008 |
| WO | 2009018158 A1 | 2/2009 |
| WO | 2009036954 A1 | 3/2009 |
| WO | 2009070570 A1 | 6/2009 |
| WO | 2009108769 A2 | 9/2009 |
| WO | 2009135100 A1 | 11/2009 |
| WO | 2009135126 A1 | 11/2009 |
| WO | 2009140351 A2 | 11/2009 |
| WO | 2009151506 A2 | 12/2009 |
| WO | WO-2009151506 A2 * | 12/2009 ............... A23G 4/02 |
| WO | 2010000811 A2 | 1/2010 |
| WO | 2010006385 A1 | 1/2010 |
| WO | 2010061291 A2 | 6/2010 |

(56) References Cited

FOREIGN PATENT DOCUMENTS

| WO | 2010062866 A2 | 6/2010 |
|---|---|---|
| WO | 2010062867 A2 | 6/2010 |
| WO | 2010084759 A1 | 7/2010 |
| WO | 2010092480 A1 | 8/2010 |
| WO | 2011044373 A2 | 4/2011 |
| WO | 2011063082 A2 | 5/2011 |
| WO | 2011084759 A1 | 7/2011 |
| WO | 2011090520 A1 | 7/2011 |
| WO | 2011117634 A2 | 9/2011 |
| WO | 2011137329 A2 | 11/2011 |
| WO | 2011153229 A1 | 12/2011 |
| WO | 2011154398 A1 | 12/2011 |
| WO | 2011159935 A1 | 12/2011 |
| WO | 2012125397 A2 | 9/2012 |
| WO | 2013013041 A2 | 1/2013 |
| WO | 2013013045 A2 | 1/2013 |
| WO | 2013013046 A2 | 1/2013 |
| WO | 2013049800 A2 | 4/2013 |
| WO | 2014047263 A1 | 3/2014 |

OTHER PUBLICATIONS

U.S. Office Action; U.S. Appl. No. 12/624,436; Advisory Action; dated Apr. 11, 2013, pp. 1-7.
U.S. Office Action; U.S. Appl. No. 12/624,436; Final Office Action; dated Aug. 21, 2015, pp. 1-43.
U.S. Office Action; U.S. Appl. No. 12/624,436; Final Office Action; dated Dec. 14, 2016, pp. 1-20.
U.S. Office Action; U.S. Appl. No. 12/624,436; Final Office Action; dated Feb. 14, 2013, pp. 1-31.
U.S. Office Action; U.S. Appl. No. 12/624,436; Interview Summary; dated Aug. 10, 2016, pp. 1-3.
U.S. Office Action; U.S. Appl. No. 12/624,436; Interview Summary; dated May 13, 2013, pp. 1-3.
U.S. Office Action; U.S. Appl. No. 12/624,436; Non-Final Office Action; dated Feb. 12, 2015, pp. 1-39.
U.S. Office Action; U.S. Appl. No. 12/624,436; Non-Final Office Action; dated Jun. 2, 2016, pp. 1-30.
U.S. Office Action; U.S. Appl. No. 12/624,436; Non-Final Office Action; dated Mar. 15, 2012, pp. 1-49.
U.S. Office Action; U.S. Appl. No. 12/624,436; Notice of Allowance; dated Mar. 8, 2017, pp. 1-12.
U.S. Office Action; U.S. Appl. No. 12/624,436; Supplemental Notice of Allowance; dated Mar. 29, 2017, pp. 1-2.
U.S. Office Action; U.S. Appl. No. 12/624,436; Supplemental Notice of Allowance; dated May 26, 2017, pp. 1-8.
U.S. Office Action; U.S. Appl. No. 13/483,638; Advisory Action; dated Jul. 18, 2014, pp. 1-3.
U.S. Office Action; U.S. Appl. No. 13/483,638; Final Office Action; dated Apr. 23, 2014, pp. 1-13.
U.S. Office Action; U.S. Appl. No. 13/483,638; Non-Final Office Action; dated Sep. 12, 2013, pp. 1-15.
U.S. Office Action; U.S. Appl. No. 13/483,638; Notice of Allowance; dated Jan. 16, 2015, pp. 1-9.
U.S. Office Action; U.S. Appl. No. 13/522,767; Non-Final Office Action; dated Nov. 10, 2014, pp. 1-83.
U.S. Office Action; U.S. Appl. No. 13/522,767; Advisory Action; dated Aug. 11, 2015, pp. 1-3.
U.S. Office Action; U.S. Appl. No. 13/522,767; Final Office Action; dated Jun. 3, 2015, pp. 1-31.
U.S. Office Action; U.S. Appl. No. 13/522,767; Final Office Action; dated Jun. 30, 2017, pp. 1-24.
U.S. Office Action; U.S. Appl. No. 13/522,767; Non-Final Office Action; dated Dec. 13, 2016, pp. 1-23.
U.S. Office Action; U.S. Appl. No. 13/522,767; Non-Final Office Action; dated Jun. 3, 2016, pp. 1-20.
U.S. Office Action; U.S. Appl. No. 13/701,104; Advisory Action; dated Mar. 1, 2016, pp. 1-8.
U.S. Office Action; U.S. Appl. No. 13/701,104; Final Office Action; dated Nov. 4, 2015, pp. 1-24.
U.S. Office Action; U.S. Appl. No. 13/701,104; Non-Final Office Action; dated Apr. 9, 2015, pp. 1-111.
U.S. Office Action; U.S. Appl. No. 13/701,196; Final Office Action; dated Jun. 24, 2015, pp. 1-34.
U.S. Office Action; U.S. Appl. No. 13/701,196; Non-Final Office Action; dated Dec. 17, 2014, pp. 1-22.
U.S. Office Action; U.S. Appl. No. 13/701,196; Non-Final Office Action; dated Jul. 7, 2014, pp. 1-40.
U.S. Office Action; U.S. Appl. No. 13/701,196; Restriction Requirement; dated Feb. 13, 2014, pp. 1-7.
U.S. Office Action; U.S. Appl. No. 14/004,343; Non-Final Office Aciton; dated Sep. 6, 2018, pp. 1-16.
U.S. Office Action; U.S. Appl. No. 14/004,343; Advisory Action; dated Apr. 20, 2017; pp. 1-5.
U.S. Office Action; U.S. Appl. No. 14/004,343; Advisory Action; dated Dec. 14, 2015; pp. 1-8.
U.S. Office Action; U.S. Appl. No. 14/004,343; Final Office Action; dated Dec. 30, 2016; pp. 1-13.
U.S. Office Action; U.S. Appl. No. 14/004,343; Final Office Action; dated Sep. 17, 2015; pp. 1-18.
U.S. Office Action; U.S. Appl. No. 14/004,343; Non-Final Office Action; dated Feb. 26, 2015; pp. 1-44.
U.S. Office Action; U.S. Appl. No. 14/004,343; Non-Final Office Action; dated Jul. 3, 2014, pp. 1-42.
U.S. Office Action; U.S. Appl. No. 14/004,343; Non-Final Office Action; dated May 23, 2016; pp. 1-13.
U.S. Office Action; U.S. Appl. No. 14/004,343; Notice of Allowance; dated Jun. 7, 2017; pp. 1-8.
U.S. Office Action; U.S. Appl. No. 14/004,343; Restriction Requirement; dated Jan. 15, 2014, pp. 1-8.
U.S. Office Action; U.S. Appl. No. 14/233,796; Final Office Action; dated Feb. 5, 2018, pp. 1-23.
U.S. Office Action; U.S. Appl. No. 14/233,698, filed Jun. 6, 2014; Non-Final Office Action; dated May 4, 2017; pp. 1-9.
U.S. Office Action; U.S. Appl. No. 14/233,698; Restriction Requirement; dated Feb. 17, 2017; pp. 1-8.
U.S. Office Action; U.S. Appl. No. 14/233,796; Non-Final Office Action; dated Jul. 24, 2017, pp. 1-102.
U.S. Office Action; U.S. Appl. No. 14/233,796; Restriction Requirement; dated Mar. 3, 2017, pp. 1-9.
U.S. Office Action; U.S. Appl. No. 14/233,829, filed Jun. 6, 2014; Non-Final Office Action; dated Apr. 13, 2017, pp. 1-11
U.S. Office Action; U.S. Appl. No. 14/233,829; Restriction Requirement; dated Jan. 26, 2017, pp. 1-7.
U.S. Office Action; U.S. Appl. No. 14/430,083; Restriction Requirement; dated Jul. 5, 2017, pp. 1-7.
U.S. Office Action; U.S. Appl. No. 15/108,916; Non-Final Office Action; dated Sep. 19, 2018, pp. 1-17.
U.S. Final Office Action; U.S. Appl. No. 14/233,829, filed Jun. 6, 2014; dated Jan. 10, 2020; 16 pages.
U.S. Non Final Office Action; U.S. Appl. No. 14/430,083, filed Mar. 20, 2015; dated Mar. 25, 2020; 77 pages.
RU 1st Office Action with translation; RU Application No. 2014106422/13(010184); dated May 14, 2015, pp. 1-10.
RU 1st Office Action with Translation; RU Patent Application No. 2016130013/13(046711); dated Nov. 21, 2017; pp. 1-9.
RU 2nd Office Action with translation; Application No. 2012135675/13(057620); dated Feb. 6, 2014, pp. 1-4.
RU 2nd Office Action with translation; RU Application No. 2014106421/13(010183); dated Oct. 20, 2015, pp. 1-7.
RU 2nd Office Action with translation; RU Application No. 2014106422/13(010184); dated Aug. 11, 2015, pp. 1-11.
RU 3rd Office Action with translation; Application No. 2012135675/13(057620); dated Apr. 28, 2014, pp. 1-7.
RU Decision of Granting with translation, RU Application No. 2014106418/13(010180); dated Jan. 13, 2016, pp. 1-24.
RU Decision of Granting with Translation; Application No. 2012135675/13(057620) dated Aug. 22, 2014, pp. 1-16.
RU Decision of Granting with translation; Application No. 2013145559/13(070430); dated Mar. 26, 2015; pp. 1-15.
RU Decision of Granting with translation; RU Application No. 2014106421/13(010183); dated Jan. 26, 2016, pp. 1-19.

(56) References Cited

OTHER PUBLICATIONS

RU Decision of Granting with translation; RU Application No. 2014106422/13(010184); dated Nov. 26, 2015, pp. 1-22.
RU Inquiry of the formal examination board with translation; Application No. 2012135675/20(057620); dated Nov. 29, 2012, pp. 1-6.
Supervising Editor Aya Kagawa, "Fourth Standard Tables of Food Composition in Japan," First Edition, Kagawa Education Institute of Nutrition, Published Department, (1994), pp. 72-73.
Supplementary European Search Report for App. No. 08 866 890 dated Jan. 22, 2014.
Supplementary European Search Report for App. No. 08868714 dated Jan. 15, 2014.
U.S. Appl. No. 13/522,767, Non-Final Office Action dated Nov. 10, 2014.
U.S. Final Office Action; U.S. Appl. No. 13/522,767, filed Nov. 16, 2012; dated Nov. 29, 2018; 21 pages.
U.S. Final Office Action; U.S. Appl. No. 14/004,343, filed Sep. 10, 2013; dated Mar. 29, 2019; 49 Pages.
U.S. Non Final Office Action; U.S. Appl. No. 15/600,250, filed May 19, 2017; dated Nov. 5, 2019; 17 pages.
U.S. Non-Final Office Action; U.S. Appl. No. 13/522,767, filed Nov. 16, 2012; dated Jan. 6, 2020; 85 pages.
U.S. Non-Final Office Action; U.S. Appl. No. 14/233,796, filed Jun. 6, 2014; dated Feb. 19, 2020; 77 pages.
U.S. Non-Final Office Action; U.S. Appl. No. 15/108,624, filed Jun. 28, 2016; dated Jan. 28, 2019; 13 pages.
U.S. Non-Final Office Action; U.S. Appl. No. 15/108,624, filed Jun. 28, 2016; dated Jun. 26, 2020; 19 pages.
U.S. Non-Final Office Action; U.S. Appl. No. 15/123,387, filed Sep. 2, 2016; dated Oct. 26, 2018; 8 pages.
U.S. Non-Final Office Action; U.S. Appl. No. 15/609,311, filed May 31, 2017; dated Jun. 28, 2019; 140 pages.
U.S. Non-Final Office Action; U.S. Appl. No. 15/609,830, filed May 31, 2017; dated Jun. 28, 2019; 145 pages.
U.S. Office Action; U.S. Appl. No. 12/352,110; Advisory Action; dated Dec. 16, 2011, pp. 1-3.
U.S. Office Action; U.S. Appl. No. 12/352,110; Final Office Action; dated Oct. 25, 2011, pp. 1-30.
U.S. Office Action; U.S. Appl. No. 12/352,110; Non-Final Office Action; dated May 25, 2011, pp. 1-26.
U.S. Office Action; U.S. Appl. No. 12/352,110; Notice of Allowance; dated Mar. 22, 2012, pp. 1-8.
U.S. Office Action; U.S. Appl. No. 12/352,110; Restriction Requirement; dated Feb. 2, 2011, pp. 1-5.
U.S. Office Action; U.S. Appl. No. 12/624,440; Final Office Action; dated Aug. 20, 2015, pp. 1-38.
U.S. Office Action; U.S. Appl. No. 12/624,440; Final Office Action; dated Dec. 15, 2016, pp. 1-19.
U.S. Office Action; U.S. Appl. No. 12/624,440; Final Office Action; dated Mar. 14, 2013, pp. 1-28.
U.S. Office Action; U.S. Appl. No. 12/624,440; Interview Summary; dated Sep. 14, 2016, pp. 1-3.
U.S. Office Action; U.S. Appl. No. 12/624,440; Non-Final Office Action; dated Mar. 13, 2012, pp. 1-44.
U.S. Office Action; U.S. Appl. No. 12/624,440; Non-Final Office Action; dated Mar. 2, 2015, pp. 1-39.
U.S. Office Action; U.S. Appl. No. 12/624,440; Non-Final Office Action; dated May 16, 2016, pp. 1-20.
U.S. Office Action; U.S. Appl. No. 12/624,440; Notice of Allowance; dated Mar. 1, 2017, pp. 1-20.
U.S. Office Action; U.S. Appl. No. 12/624,440; Restriction Requirement; dated Feb. 17, 2012, pp. 1-8.
U.S. Office Action; U.S. Appl. No. 12/624,440; Supplemental Notice of Allowance; dated Jun. 2, 2017, pp. 1-8.
U.S. Office Action; U.S. Appl. No. 12/624,453; Final Office Action; dated Aug. 25, 2015, pp. 1-37.
U.S. Office Action; U.S. Appl. No. 12/624,453; Final Office Action; dated Dec. 16, 2016, pp. 1-17.
U.S. Office Action; U.S. Appl. No. 12/624,453; Final Office Action; dated Mar. 14, 2013, pp. 1-29.
U.S. Office Action; U.S. Appl. No. 12/624,453; Interview Summary; dated Aug. 24, 2016, pp. 1-3.
U.S. Office Action; U.S. Appl. No. 12/624,453; Non-Final Office Action; dated Feb. 13, 2015, pp. 1-35.
U.S. Office Action; U.S. Appl. No. 12/624,453; Non-Final Office Action; dated Mar. 13, 2012, pp. 1-47.
U.S. Office Action; U.S. Appl. No. 12/624,453; Non-Final Office Action; dated May 19, 2016, pp. 1-26.
U.S. Office Action; U.S. Appl. No. 12/624,453; Notice of Allowance; dated Mar. 6, 2017, pp. 1-19.
U.S. Office Action; U.S. Appl. No. 12/624,453; Supplemental Notice of Allowance; dated Jun. 2, 2017, pp. 1-8.
JP Notice of Allowance, JP Application No. 2013-513299; dated Jan. 27, 2015, pp. 1-1.
JP Notice of Allowance, JP Application No. 2013-513302; dated Jan. 27, 2015, pp. 1-1.
JP Notice of Allowance, JP Application No. 2014-171916; dated Jun. 7, 2016, pp. 1-2.
JP Notice of Allowance, JP Application No. 2014-521789; dated Mar. 1, 2016, pp. 1-2.
JP Notice of Allowance, JP Application No. 2015-527688; dated Oct. 25, 2016, pp. 1-3.
JP Notice of Allowance; JP Application No. 2016-535710; dated Sep. 21, 2017, pp. 1-3.
JP OA with translation Application No. 2016-559836 dated Sep. 4, 2017, pp. 1-14.
JP OA with translation Application No. 2016-562229 dated Sep. 21, 2017, pp. 1-7.
JP Pre-Appeal Report with translation, JP Application No. 2013-557853; dated Dec. 15, 2015, pp. 1-5.
JPD 1st Office Action with translation, JP Application No. 2014-139188; dated Jul. 28, 2015, pp. 1-4.
JPD 1st Office Action with translation, JP Application No. 2015-196927; dated Jul. 12, 2016, pp. 1-11.
JPD 2nd Office Action with translation, JP Application No. 2014-139188; dated Jan. 19, 2016, pp. 1-5.
JPD 2nd Office Action with translation, JP Application No. 2015-196927; dated May 9, 2017, pp. 1-9.
JPD Notice of Allowance, JP Application No. 2014-139188; dated Jul. 5, 2016, pp. 1-2.
Mexican 1st Office Action with translation, MX Application No. MX/a/2013/010024; dated Jul. 29, 2015, pp. 4.
Mexican Office Action with Translation; MX Application No. MX/a/2014/000794; dated Nov. 3, 2017, pp. 1-9.
Mexican Office Action; International Application No. MX/A/2016/015188; International Filing Date: Nov. 18, 2016; dated Mar. 11, 2020; 3 pages.
Michael J. Lynch, "Soft Panning," The Manufacturing Confectioner, pp. 47-50, Nov. 1987.
MX 1st Office Action and Translation; Mexican Application No. MX/a/2014/000795; dated Oct. 31, 2017; pp. 1-11.
MX 1st Office Action and Translation; Mexican Application No. MX/a/2014/000819; dated Oct. 23, 2017; pp. 1-7.
MX 1st Office Action with translation; Mexican Patent Application No. MX/a/2012/008505; dated Aug. 7, 2015, pp. 1-7.
MX 1st Office Action; Mexican Patent Application No. MX/a/2011/005647; dated Aug. 30, 2013, pp. 1-7.
MX 1st Office Action; Mexican Patent Application No. MX/a/2011/005652; dated Jun. 17, 2015, pp. 1-12.
MX 1st Office Action; Mexican Patent Application No. MX/a/2011/005693; dated Jul. 17, 2013, pp. 1-3.
MX 1st Office Action; Mexican Patent Application No. MX/a/2012/013889; dated Jan. 27, 2016, pp. 1-4.
MX 1st Office Action; Mexican Patent Application No. MX/a/2012/013982; dated Jan. 21, 2016, pp. 1-5.
MX 2nd Office Action with translation; Mexican Patent Application No. MX/a/2012/008505; dated Feb. 19, 2016, pp. 1-7.
MX 2nd Office Action, Mexican Patent Application No. MX/a/2014/000795; dated Apr. 11, 2018, 8 pages.
MX 2nd Office Action; Mexican Patent Application No. MX/a/2011/005652; dated Sep. 23, 2015, pp. 1-4.

(56) References Cited

OTHER PUBLICATIONS

MX 3rd Office Action with translation; Mexican Patent Application No. MX/a/2012/008505; dated Oct. 25, 2016, pp. 1-9.
MX 4th Office Action with translation; Mexican Patent Application No. MX/a/2012/008505; dated Jun. 27, 2017, pp. 1-7.
MX Notice of Allowance and translation, MX Application No. MX/a/2013/010024; dated Dec. 14, 2015, pp. 1-3.
MX Notice of Allowance; Mexican Patent Application No. MX/a/2011/005647; dated Nov. 28, 2013, pp. 1-1.
MX Notice of Allowance; Mexican Patent Application No. MX/a/2011/005652; dated Nov. 9, 2015, pp. 1-1.
MX Notice of Allowance; Mexican Patent Application No. MX/a/2011/005693; dated Oct. 22, 2013, pp. 1-1.
MX Notice of Allowance; Mexican Patent Application No. MX/a/2012/013889 dated Apr. 21, 2016, pp. 1-1.
MX Notice of Allowance; Mexican Patent Application No. MX/a/2012/013982; dated Mar. 10, 2016, pp. 1-1.
National Academy of Sciences, "Chemicals used in food processing", publication 1274, pp. 63-258.
Non-Final Office Action issued in U.S. Appl. No. 12/338,428 dated Mar. 17, 2014.
Non-Final Office Action issued in U.S. Appl. No. 12/338,428 dated Apr. 12, 2011.
Non-Final Office Action issued in U.S. Appl. No. 12/338,682 dated Jan. 16, 2013.
Non-Final Office Action issued in U.S. Appl. No. 12/338,682 dated Sep. 26, 2014.
Non-Final Office Action issued in U.S. Appl. No. 12/338,682 dated Nov. 23, 2011.
Non-Final Office Action; U.S. Appl. No. 14/233,796, filed Jun. 6, 2014; Advanced Gum Forming; Notification Date: Nov. 2, 2018; 105 Pages.
Non-Final Office Action; U.S. Appl. No. 14/430,083, filed Mar. 20, 2015; Advanced Gum Forming; Notification Date: Oct. 19, 2017; pp. 1-15.
Notification of the First Office Action and Search Report; Chinese Application No. 2015/0026070.7; dated Mar. 12, 2018; 17 Pages.
Office Action and Search Report; Chinese Application No. 201480046262.X; dated Nov. 2, 2018; 10 Pages.
PCT Invitation to Pay Additional Fees and, Where applicable, Protest Fee; PCT International Applciation No. PCT/US2012/028232; International Filing Date: Mar. 8, 2012, dated Aug. 27, 2012, pp. 1-8.
PCT Invitation to Pay Additional Fees and, Where applicable, Protest Fee; PCT International Applciation No. PCT/US2012/047404; International Filing Date: Jul. 19, 2012, dated Nov. 21, 2012, pp. 1-8.
PCT Invitation to Pay Additional Fees and, Where applicable, Protest Fee; PCT International Applciation No. PCT/US2012/047409; International Filing Date: Jul. 19, 2012, dated Nov. 26, 2012, pp. 1-9.
CN 2nd Office Action with translation; CN Application No. 200980155690.5; dated Jun. 24, 2013, pp. 1-31.
CN 2nd Office Action with translation; CN Application No. 201280046229.8; dated Sep. 24, 2015, pp. 1-9.
CN 2nd Office Action with translation; CN Application No. 201280046231.5; dated Oct. 10, 2015, pp. 1-16.
CN 2nd Office Action with translation; CN Application No. 201380046385.9; dated Sep. 6, 2016, pp. 1-6.
CN 3rd Office Action with Translation, Application No. 201080065664.6, dated Dec. 31, 2014, pp. 1-9.
CN 3rd Office Action with translation; CN Application No. 200980155688.8; dated Apr. 19, 2016, pp. 1-24.
CN 3rd Office Action with translation; CN Application No. 200980155690.5; dated Nov. 14, 2013, pp. 1-17.
CN 3rd Office Action with translation; CN Application No. 201280046231.5; dated Mar. 9, 2016, pp. 1-6.
CN 4th Office Action with translation; CN Application No. 200980155688.8; dated Oct. 28, 2016, pp. 1-12.
CN Decision of Rejection with translation, CN Application No. 201280046306.X; dated May 4, 2016, pp. 1-20.
CN Decision of Rejection with translation; CN Application No. 200980155688.8; dated Feb. 7, 2014, pp. 1-20.
CN Decision of Rejection with translation; CN Application No. 201280046229.8; dated Apr. 14, 2016, pp. 1-7.
CN Decision of Rejection with translation; CN Application No. 201280046231.5; dated Sep. 7, 2016, pp. 1-14.
CN Notice of Allowance with translation, CN Application No. 201280022799.3, dated Sep. 9, 2015, pp. 1-4.
CN Notice of Allowance with translation; CN Application No. 200980155688.8; dated May 4, 2017, pp. 1-4.
CN Notice of Allowance with translation; CN Application No. 200980155689.2; dated Dec. 12, 2013, pp. 1-4.
CN Notice of Allowance with translation; CN Application No. 200980155690.5; dated Apr. 30, 2014, pp. 1-4.
CN Notice of Allowance with translation; CN Application No. 201080065664.6; dated Jul. 8, 2015 , pp. 1-6.
CN Notice of Allowance with translation; CN Application No. 201180037795.8; dated Mar. 17, 2014, pp. 1-4.
CN Notice of Allowance with translation; CN Application No. 201180037796.2; dated Mar. 17, 2014, pp. 1-14.
CN Notice of Allowance with translation; CN Application No. 201380046385.9; dated Mar. 15, 2017, pp. 1-4.
CN Notification of Correction with translation; CN Application No. 201710386468.2; dated Jul. 14, 2017, pp. 1-2.
CN Notification of Publication and Entering into Substantive Examination of Patent Application for Invention; CN Patent Application 201080065664.6, dated Apr. 3, 2013.
CN Notification of the Decision of Reexamination with translation; Application No. 201280046306.X; dated Aug. 28, 2017; pp. 1-28.
CN Notification of the Reexamination with translation for CN Patent Application No. 201280046231.5 dated Jul. 28, 2017.
CN Notification of the Reexamination with translation, CN Application No. 201280046306.X; dated May 12, 2017, pp. 1-22.
CN Notification of the Reexamination with translation; CN Application No. 201280046229.8; dated Feb. 16, 2017, pp. 1-7.
CN Notificiation of the Reexamination with translation, CN Application No. 201280046306.X; dated Dec. 22, 2016, pp. 1-20.
CN Request for Reexamination with translation; CN Application No. 201280046231.5; dated Dec. 22, 2016, pp. 1-30.
CN Summary of the Decision of Reexamination with translation; CN Application No. 201280046229.8; dated Jun. 22, 2017, pp. 1-10.
Cottrell et al., in Davison, Ed., "Handbook of Water Soluble Gums and Resins", McGraw-Hill, 1980, pp. 21-1 to 24-31.
Database FSTA [Online] International Food Information Service (IFIS), Frankfurt-Main, DE; 1992, Anaonymous: "How gum is made.", XP002687037, Database accession No. FS-1992-09-K-0010 abstract.
Decision of Final Rejection (with Translation); Japanese Application No. 2016-550532; dated Dec. 20, 2018; 10 Pages.
Douglas Fritz, "Formulation and Production of Chewing and Bubble Gum," CRC Press Jan. 2006, XP002687037, pp. 1-1.
E.B. Jackson, "Sugar Confectionery Manufacture," Blackie and Son Ltd. 1990, pp. 1-20.
E.B. Jackson, Ed., "Sugar Confectionery Manufacture", New York: Van Nostrand Reinhold, 1990, pp. 14 and 17-33.
English Translation of JP H06-46760. (Year: 1994), pp. 1-13.
EP Communication Extended European Search Report; Application No. 17185358.3-1375; dated Oct. 4, 2017, pp. 1-8.
EP Communication Pursuant to Aricle 94(3) EPC, Application No. 12 741 210.4-1358; dated May 12, 2017, pp. 1-8.
EP Communication Pursuant to Aricle 94(3) EPC, Application No. 12 741 210.4-1358; dated Sep. 15, 2016, pp. 1-8.
EP Communication Pursuant to Aricle 94(3) EPC; Application No. 12 741 209.6-1358; dated May 12, 2017, pp. 1-6.
EP Communication Pursuant to Aricle 94(3) EPC; Application No. 12 741 209.6-1358; dated Sep. 15, 2016, pp. 1-10.
EP Communication Pursuant to Article 94(3) EPC; Application No. 09 756 643.4-1358; dated Jul. 12, 2017, pp. 1-4.
EP Communication Pursuant to Article 94(3) EPC; Application No. 09 756 643.4-1358; dated Oct. 6, 2016, pp. 1-7.

(56) References Cited

OTHER PUBLICATIONS

EP Communication Pursuant to Article 94(3) EPC; Application No. 09 810 783.2-1358; dated Oct. 6, 2016, pp. 1-4.
EP Communication Pursuant to Article 94(3) EPC; Application No. 10 844 138.7-1375 dated Feb. 22, 2017, pp. 1-6.
EP Communication Pursuant to Article 94(3) EPC; Application No. 11 726 558.7-1358; dated May 18, 2015, pp. 1-5.
EP Communication Pursuant to Article 94(3) EPC; Application No. 11 781 895.5-1358; dated May 22, 2015, pp. 1-4.
EP Communication pursuant to Article 94(3) EPC; Application No. 12 709 260.9-1358; dated Feb. 1, 2017, pp. 1-4.
EP Communication Pursuant to Article 94(3) EPC; Application No. 12 741 209.6-1358; dated Dec. 20, 2017, pp. 1-6.
EP Communication Pursuant to Article 94(3) EPC; Application No. 12 741 211.2-1358; dated Mar. 23, 2017; pp. 1-6.
EP Communication Pursuant to Article 94(3) EPC; Application No. 12 741 211.2-1358; dated Sep. 15, 2016; pp. 1-7.
EP Communication Pursuant to Article 94(3) EPC; Application No. 14 824 334.8-1375; dated Aug. 17, 2017; pp. 1-14.
EP Communication Pursuant to Article 94(3) EPC; Application No. 14 824 335.5-1375; dated Nov. 13, 2017, pp. 1-7.
EP Communication Pursuant to Rules 161(1) and 162 EPC; Application No. 09756643.4-2114 PCT/US2009065594; dated Nov. 25, 2011, pp. 1-8.
EP Communication Pursuant to Rules 161(1) and 162 EPC; Application No. 09810783.2-2114 PCT/IB2009007718; dated Jul. 21, 2011, pp. 1-2.
EP Communication Pursuant to Rules 161(1) and 162 EPC; Application No. 11726558.7-2114; dated Jan. 9, 2013, pp. 1-2.
EP Communication Pursuant to Rules 161(1) and 162 EPC; Application No. 11781895.5-2114; dated Jan. 9, 2013, pp. 1-2.
EP Communication Pursuant to Rules 161(1) and 162 EPC; Application No. 12741209.6-1358; dated Feb. 28, 2014, pp. 1-2.
EP Communication Pursuant to Rules 161(1) and 162 EPC; Application No. 12741210.4-1358; dated Feb. 28, 2014, pp. 1-2.
EP Communication Pursuant to Rules 161(1) and 162 EPC; Application No. 12741211.2-1358; dated Feb. 28, 2014, pp. 1-2.
EP Communication Pursuant to Rules 161(1) and 162 EPC; Application No. 13771024.0-1357; dated Apr. 29, 2015, pp. 1-2.
EP Communication Pursuant to Rules 161(1) and 162 EPC; Application No. 14723283.9-1357; dated Nov. 24, 2015, pp. 1-2.
EP Communication Pursuant to Rules 161(1) and 162 EPC; Application No. 14824334.8-1375; dated Aug. 10, 2016, pp. 1-2.
EP Communication Pursuant to Rules 161(1) and 162 EPC; Application No. 14824335.5-1375; dated Aug. 10, 2016, pp. 1-2.
EP Communication Pursuant to Rules 161(1) and 162 EPC; Application No. 15709397.2-1358; dated Oct. 14, 2016, pp. 1-2.
EP Communication Pursuant to Rules 161(1) and 162 EPC; Application No. 15728967.9-1358; dated Jan. 20, 2017, pp. 1-2.
EP Communication Pursuant to Rules 161(1) and 162 EPC; Application No. 15729600.5-1375; dated Dec. 23, 2016, pp. 1-2.
EP Communication under Rule 71(3) EPC; Application No. 09 810 783.2-1358; dated Apr. 19, 2017, pp. 1-8.
EP Communication under Rule 71(3) EPC; Application No. 10 250 033.7-2114; dated Jul. 23, 2012; pp. 1-5.
EP Communication under Rule 71(3) EPC; Application No. 11 726 558.7-1358; dated Dec. 9, 2015, pp. 1-9.
EP Communication under Rule 71(3) EPC; Application No. 11 781 895.5-13588; dated Jul. 29, 2015, pp. 1-7.
EP Communication under Rule 71(3) EPC; Application No. 13 771 024.0-1375; dated Apr. 28, 2017; pp. 1-7.
EP Communication under Rule 94(3) EPC; Application No. 10 250 033.7-2114; dated Feb. 10, 2011; pp. 1-7.
EP Communication under Rule 94(3) EPC; Application No. 10 250 033.7-2114; dated Mar. 19, 2012; pp. 1-3.
EP Communication under Rule 94(3) EPC; Application No. 14 723 283.9-1375; dated Feb. 6, 2017; pp. 1-2.
EP Communication; Extended European Search Report; Application No. 10844138.7—1357/2525667 PCT/US2010051085; dated Oct. 14, 2013; pp. 1-7.

EP Examination Report; EP Application No. 15728967.9-1106; dated Apr. 30, 2018; 4 pages.
European Office Action; International Application No. 17185358.3-1105; International Filing Date: Aug. 8, 2017; dated Aug. 28, 2020; 4 pages.
European Office Action; International Application No. 18213709.1-1106; International Filing Date: Dec. 18, 2018; dated Sep. 22, 2020; 4 pages.
Examination Report under Sections 12 & 13 of the Patents Act, 1970 and the Patent Rules, 2003; Indian Application No. 313/CHENP/2014; dated Dec. 14, 2018; 7 Pages.
Extended European Search Report; European Application No. 18197983.2; dated Feb. 12, 2019; 11 Pages.
Extended European Search Report; International Application No. 20181435.7-1106; International Filing Date: Jun. 22, 2020; dated Oct. 19, 2020; 13 pages.
Final Rejection issued in U.S. Appl. No. 12/338,428 dated Sep. 12, 2014.
Final Rejection issued in U.S. Appl. No. 12/338,428 dated Nov. 25, 2011.
Final Rejection issued in U.S. Appl. No. 12/338,682 dated Apr. 30, 2012.
Final Rejection issued in U.S. Appl. No. 12/338,682 dated Jul. 23, 2013.
Final Rejection issued in U.S. Appl. No. 12/338,682 dated Mar. 25, 2014.
Food Protection Committee, "Chemicals Used in Food Processing", National Academy of Sciences, 1965, pp. 1-101.
Glenn Visscher, "Parallel Gum Component Mixing Systems and Methods," U.S. Appl. No. 61/045,764, filed Apr. 17, 2008.
International Search Report; International Application No. PCT/US2010/051085; International Filing Date: Oct. 1, 2010, dated Jun. 29, 2011, pp. 1-7.
International Search Report; International Application No. PCT/US2014/052614; International Filing Date: Aug. 26, 2014; dated Nov. 20, 2014; 4 Pages.
International Search Report; International Application No. PCT/US2015/031742; International Filing Date: May 20, 2015; dated Dec. 16, 2015; 7 Pages.
Invitation to Pay Additional Fees and, Where Applicable, Protect Fee; International Application No. PCT/US2009/065594; dated Mar. 30, 2010, pp. 1-31.
Invitation to Pay Additional Fees and, Where Applicable, Protect Fee; International Application No. PCT/US2009/065594; International Filing Date: Nov. 24, 2009, dated Mar. 30, 2010 pp. 1-4.
IPRP; International Application No. PCT/IB2009/007718; International Filing Date: Nov. 24, 2009, dated May 31, 2011, pp. 1-5.
IPRP; International Application No. PCT/US2009/065594; International Filing Date: Nov. 24, 2009, dated Sep. 27, 2011, pp. 1-8.
IPRP; International Application No. PCT/US2011/038738; International Filing Date: Jun. 1, 2011, dated Dec. 4, 2012, pp. 1-7.
IPRP; International Application No. PCT/US2011/038747; International Filing Date: Jun. 1, 2011, dated Dec. 4, 2012, pp. 1-9.
IPRP; International Application No. PCT/US2012/047404; International Filing Date: Jul. 19, 2012, dated Jan. 21, 2014, pp. 1-11.
IPRP; International Application No. PCT/US2014/072708; International Filing Date: Dec. 30, 2014, dated Jul. 5, 2016, pp. 1-7.
IPRP; International Application No. PCT/US2015/018072; International Filing Date: Feb. 27, 2015, dated Sep. 6, 2016, pp. 1-9.
IPRP; International Application No. PCT/US2015/031742; International Filing Date: May 20, 2015, dated Nov. 22, 2016, pp. 1-9.
James Duggan, "Gum Structure Miding Systems and Methods," U.S. Appl. No. 61/016,016, filed Dec. 21, 2007.
James Duggan, "Gum Structure Mixing Systems and Methods," U.S. Appl. No. 61/036,626, filed Mar. 14, 2008.
Japanese Office Action with Translation; JP Application No. 2016-535722; dated Nov. 14, 2017; pp. 1-5.
John Flanyak, "Panning Technology, An Overview," The Manufacturing Confectioner, pp. 65-74, Jan. 1998.
JP 1st Office Action and translation, JP Application No. 2016-550532; dated Jun. 19, 2017, pp. 1-11.
JP 1st Office Action with translation, JP Application No. 2011-538074; dated Feb. 5, 2013, pp. 1-7.

(56) References Cited

OTHER PUBLICATIONS

JP 1st Office Action with translation, JP Application No. 2011-538658; dated Feb. 5, 2013, pp. 1-7.
JP 1st Office Action with translation, JP Application No. 2011-538659; dated Feb. 19, 2013, pp. 1-6.
JP 1st Office Action with translation, JP Application No. 2012-549982; dated Sep. 17, 2013, pp. 1-4.
JP 1st Office Action with translation, JP Application No. 2013-256761; dated Mar. 10, 2015, pp. 1-6.
JP 1st Office Action with translation, JP Application No. 2013-513299; dated Feb. 4, 2014, pp. 1-7.
JP 1st Office Action with translation, JP Application No. 2013-513302; dated Feb. 4, 2014, pp. 1-7.
JP 1st Office Action with translation, JP Application No. 2013-557853; dated Nov. 18, 2014, pp. 1-8.
JP 1st Office Action with translation, JP Application No. 2014-171916; dated Oct. 13, 2015, pp. 1-4.
JP 1st Office Action with translation, JP Application No. 2014-521785; dated Feb. 3, 2015, pp. 1-7.
JP 1st Office Action with translation, JP Application No. 2014-521788; dated Jan. 13, 2015, pp. 1-7.
JP 1st Office Action with translation, JP Application No. 2014-521789; dated Jan. 20, 2015, pp. 1-5.
JP 1st Office Action with translation, JP Application No. 2015-527688; dated Feb. 3, 2016, pp. 1-10.
JP 1st Office Action with translation, JP Application No. 2016-045354; dated Jan. 17, 2017, pp. 1-7.
JP 1st Office Action with translation, JP Application No. 2016-045867; dated Jan. 17, 2017, pp. 1-6.
JP 1st Office Action with translation, JP Application No. 2016-130735; dated Apr. 25, 2017, pp. 1-11.
JP 1st Office Action with translation, JP Application No. 2016-249450; dated Jan. 9, 2018, pp. 1-4.
JP 1st Office Action with translation, JP Application No. 2016-535722; dated Mar. 29, 2017, pp. 1-8.
JP 1st Office Action with translation; JP Application No. 2016-535710; dated May 25, 2017, pp. 1-5.
JP 2nd Office Action with translation, JP Application No. 2011-538074; dated Aug. 20, 2013, pp. 1-3.
JP 2nd Office Action with translation, JP Application No. 2011-538658; dated Aug. 6, 2013, pp. 1-6.
JP 2nd Office Action with translation, JP Application No. 2011-538659; dated Feb. 4, 2014, pp. 1-6.
JP 2nd Office Action with translation, JP Application No. 2012-549982; dated Mar. 4, 2014, pp. 1-3.
JP 2nd Office Action with translation, JP Application No. 2013-513299; dated Oct. 14, 2014, pp. 1-5.
JP 2nd Office Action with translation, JP Application No. 2013-513302; dated Oct. 14, 2014, pp. 1-4.
JP 2nd Office Action with translation, JP Application No. 2013-557853; dated Jun. 2, 2015, pp. 1-6.
JP 2nd Office Action with translation, JP Application No. 2014-521785; dated Nov. 10, 2015, pp. 1-4.
JP 2nd Office Action with translation, JP Application No. 2014-521788; dated Nov. 10, 2015, pp. 1-4.
JP 2nd Office Action with translation, JP Application No. 2014-521789; dated Oct. 6, 2015, pp. 1-4.
JP 2nd Office Action, Japanese Patent Application No. 2016-550532; dated Apr. 27, 2018, 12 pages.
JP 3rd Office Action with translation, JP Application No. 2011-538074; dated Apr. 7, 2015, pp. 1-9.
JP 3rd Office Action with translation, JP Application No. 2011-538658; dated May 7, 2014, pp. 1-7.
JP 3rd Office Action with translation, JP Application No. 2011-538659; dated Nov. 25, 2014, pp. 1-3.
JP 3rd Office Action with translation, JP Application No. 2014-521785; dated Feb. 28, 2017, pp. 1-11.
JP 3rd Office Action with translation, JP Application No. 2014-521788; dated May 9, 2017, pp. 1-25.
JP Notice of Allowance with translation; JP Application No. 2012-549982; dated Oct. 7, 2014, pp. 1-4.
JP Notice of Allowance, Japanese Patent Application No. 2014-521785, dated Oct. 24, 2017, pp. 1-1.
JP Notice of Allowance, Japanese Patent Application No. 2014-521788 (Appeal No. 2016-003684); dated Nov. 14, 2017, pp. 1-2.
JP Notice of Allowance, Japanese Patent Application No. 2015-196927, dated Oct. 17, 2017, pp. 1-1.
JP Notice of Allowance, JP Application No. 2011-538074; dated Jul. 21, 2015, pp. 1-1.
JP Notice of Allowance, JP Application No. 2011-538658; dated Dec. 2, 2014, pp. 1-2.
JP Notice of Allowance, JP Application No. 2011-538659; dated Mar. 31, 2015, pp. 1-1.
"Bar Manufacturing," Nov. 17, 2007 (Nov. 17, 2007), XP002678488, Retrieved from the Internet: URL: http://web.archive.org/web/20061117002445/http://www.sollich.com/webEnglisch/produkte/riegelherstellung/conbarsuesswaren.php?navid=7 [retrieved on Jun. 25, 2012].
"What is Ultrasonic Spray Nozzle?", [Online], Jul. 16, 2013, [Apr. 18, 2018 Search], https://web.archive.org/web/20130716222437/http://www.ticjapan.com/japanese/products/atmizer.html>, 4 pages.
Anonymous: "Sugar Free Gum Product", GNPD, May 1, 2011, XP055397367, pp. 1-3; Retrieved from the Internet: www.gnpd.com/sinatra/recordpage/1550406 [retrieved on Aug. 9, 2017].
Anonymous: "Wild Strawberry & Tangy Citrus Sugar-Free Gum," GNPD, Feb. 1, 2010 (Feb. 1, 2010), XP055397371, pp. 1-3; Retrieved from the Internet: URL: www.gnpd.com/sinatra/recordpage/1263179; [retrieved on Aug. 9, 2017].
AU 1st Office Action, AU Application No. 2009319826; dated Jul. 2, 2012, pp. 1-4.
AU 1st Office Action, AU Application No. 2009319827; dated Jul. 25, 2012, pp. 1-4.
AU 1st Office Action, AU Application No. 2009321276; dated Jun. 21, 2012, pp. 1-4.
AU 1st Office Action, AU Application No. 2013206311; dated Apr. 24, 2014, pp. 1-6.
AU 1st Office Action, AU Application No. 2015203194; dated Jan. 22, 2016, pp. 1-5.
AU 1st Office Action; AU Application No. 2012229325; dated Jul. 11, 2014, pp. 1-3.
AU 2nd Office Action, AU Application No. 2009319826; dated Oct. 10, 2012, pp. 1-4.
AU 2nd Office Action, AU Application No. 2009321276; dated Oct. 11, 2012, pp. 1-3.
AU 2nd Office Action, AU Application No. 2013206311; dated Nov. 26, 2014, pp. 1-5.
AU Notice of Acceptance; AU Application No. 2010343332; dated May 8, 2014, pp. 1-2.
AU Notice of Allowance, AU Application No. 2009319826; dated Apr. 2, 2013, pp. 1-1.
AU Notice of Allowance, AU Application No. 2009319827; dated Nov. 9, 2012, pp. 1-3.
AU Notice of Allowance, AU Application No. 2009321276; dated Feb. 28, 2013, pp. 1-3.
AU Notice of Allowance, AU Application No. 2013206311; dated Feb. 19, 2015, pp. 1-2.
AU Patent Examination Report No. 1, Application No. 2010343332; dated Jun. 3, 2013, pp. 1-3.
Australian Notice of Acceptance, AU Application No. 2012229325, dated Jun. 25, 2015, pp. 1-2.
Bharat Jani, "Advanced Gum Forming," U.S. Appl. No. 61/510,119, filed Jul. 21, 2011.
Bharat Jani, "System and Method of Forming and Sizing Chewing Gum and/or Altering Temperature of Chewing Gum," U.S. Appl. No. 61/247,997, filed Oct. 2, 2009.
Bharat Jani, "System and Method of Forming Multilayer Confectionery," U.S. Appl. No. 61/451,805, filed Mar. 11, 2011.
Bogaty, H. and Talmage, J.M. "Apparent Viscosity Of Chewing Gum", J. Texture Studies, vol. 9, pp. 299-309, Sep. 25, 1978.
Brazilian Preliminary Office Action; International Application No. BR112016016620-5; International Filing Date: Feb. 27, 2015; dated Oct. 29, 2019; 4 pages.

(56) References Cited

OTHER PUBLICATIONS

CA Notice of Allowance; Application No. 2787148; 13427-P42240CA00; dated Mar. 3, 2015, p. 1.
Canadian Intellectual Property Office, Office Action; CA Application No. 2787148; dated Aug. 14, 2013, pp. 1-3.
Canadian Intellectual Property Office, Office Action; CA Application No. 2787148; dated May 20, 2014, pp. 1-4.
Canadian Intellectual Property Office, Office Action; CA Application No. 2829351, dated Jan. 16, 2015, pp. 1-5.
Canadian Notice of Allowance, CA 2829351, dated Nov. 18, 2015, pp. 1.
Cerestra, "Polyols In Food," Denbigh Lloyd, Aug. 2001, pp. 1-12.
Chinese Office Action; International Application No. 201580024617.X; International Filing Date: Nov. 10, 2016; dated Jun. 16, 2020; 12 pages.
Chinese Office Action; International Application No. 201711337861.9; International Filing Date: Dec. 14, 2017; dated Sep. 2, 2020; 17 pages.
CN 1st Office Action with Translation, Application No. 201080065664.6, dated Aug. 9, 2013, pp. 1-12.
CN 1st Office Action with translation, CN Application No. 201280022799.3; dated Jul. 7, 2014, pp. 1-18.
CN 1st Office Action with translation, CN Application No. 201280046306.X; dated Feb. 2, 2015, pp. 1-39.
CN 1st Office Action with translation; CN Application No. 200980155688.8; dated Nov. 5, 2012, pp. 1-28.
CN 1st Office Action with translation; CN Application No. 200980155689.2; dated Nov. 19, 2012, pp. 1-26.
CN 1st Office Action with translation; CN Application No. 200980155690.5; dated Oct. 29, 2012, pp. 1-14.
CN 1st Office Action with translation; CN Application No. 201180037795.8; dated Aug. 26, 2013, pp. 1-16.
CN 1st Office Action with translation; CN Application No. 201180037796.2; dated Aug. 26, 2013, pp. 1-12.
CN 1st Office Action with translation; CN Application No. 201280046229.8; dated Jan. 19, 2015, pp. 1-13.
CN 1st Office Action with translation; CN Application No. 201280046231.5; dated Jan. 14, 2015, pp. 1-18.
CN 1st Office Action with translation; CN Application No. 201380046385.9; dated Jan. 15, 2016, pp. 1-19.
CN 1st Office Action; CN Application No. 201480020612.5; dated May 3, 2017, pp. 1-13.
CN 2nd Office Action with Translation, Application No. 201080065664.6, dated Jun. 24, 2014, pp. 1-7.
CN 2nd Office Action with translation, CN Application No. 201280022799.3, dated Mar. 12, 2015, pp. 1-6.
CN 2nd Office Action with translation, CN Application No. 201280046306.X; dated Nov. 2, 2015, pp. 1-31.
CN 2nd Office Action with translation; CN Application No. 200980155688.8; dated Sep. 12, 2013, pp. 1-21.
CN 2nd Office Action with translation; CN Application No. 200980155689.2; dated Jul. 10, 2013, pp. 1-17.
U.S. Non-Final Office Action; U.S. Appl. No. 14/233,698, filed Jun. 6, 2014; dated Jan. 7, 2020; 108 pages.
U.S. Non-Final Office Action; U.S. Appl. No. 15/108,916, filed Jun. 29, 2016; dated Feb. 12, 2020; 75 pages.
William Raleigh, "HSH as a Bulking Agent in Confections," The Manufacturing Confectioner, Nov. 1995, pp. 57-59.
Written Opinion of the International Searching Authority; International Application No. PCT/US2008/087618 dated Apr. 8, 2009.
Written Opinion of the International Searching Authority; International Application No. PCT/US2008/087625 dated Apr. 7, 2009.
Written Opinion of the International Searching Authority; International Application No. PCT/US2010/051085; International Filing Date: Oct. 1, 2010, dated Jun. 29, 2011, pp. 1-6.
Written Opinion of the International Searching Authority; International Application No. PCT/US2014/052614; International Filing Date: Aug. 26, 2014; dated Nov. 20, 2014; 8 Pages.
Written Opinion of the International Searching Authority; International Application No. PCT/US2015/031742; International Filing Date: May 20, 2015; dated Dec. 16, 2015; 8 Pages.
PCT Invitation to Pay Additional Fees and, Where applicable, Protest Fee; PCT International Applciation No. PCT/US2012/047411, International Filing Date: Jul. 19, 2012, dated Nov. 26, 2012, pp. 1-8.
PCT Invitation to Pay Additional Fees and, Where applicable, Protest Fee; PCT International Applciation No. PCT/US2015/031742; International Filing Date: May 20, 2015, dated Sep. 18, 2015, pp. 1-6.
PCT IPRP; International Application No. PCT/US2010/051085; International Filing Date: Oct. 1, 2010, dated Aug. 2, 2012; pp. 1-8.
PCT IPRP; International Application No. PCT/US2012/028232; International Filing Date: Mar. 8, 2012, dated Sep. 17, 2013, pp. 1-10.
PCT IPRP; International Application No. PCT/US2012/047409; International Filing Date: Jul. 19, 2012, dated Jan. 21, 2014; pp. 1-10.
PCT IPRP; International Application No. PCT/US2012/047411; International Filing Date: Jul. 19, 2012, dated Jan. 21, 2014; pp. 1-11.
PCT IPRP; International Application No. PCT/US2013/060584; International Filing Date: Sep. 19, 2013, dated Mar. 24, 2015; pp. 1-6.
PCT IPRP; International Application No. PCT/US2014/034032; International Filing Date: Apr. 14, 2014, dated Oct. 20, 2015; pp. 1-9.
PCT IPRP; International Application No. PCT/US2014/072702; International Filing Date: Dec. 30, 2014, dated Jul. 5, 2016, pp. 1-11.
PCT Notification of Transmittal of The International Search Report; International Application No. PCT/IB2009/007718; International Filing Date: Nov. 24, 2009, dated May 21, 2010, pp. 1-6.
PCT Notification of Transmittal of The International Search Report; International Application No. PCT/US2009/065594; International Filing Date: Nov. 24, 2009, dated Sep. 22, 2011, pp. 1-6.
PCT Notification of Transmittal of The International Search Report; International Application No. PCT/US2011/038738; International Filing Date: Jun. 1, 2011, dated Feb. 6, 2012, pp. 1-5.
PCT Notification of Transmittal of The International Search Report; International Application No. PCT/US2011/038747; International Filing Date: Jun. 1, 2011, dated Sep. 6, 2011, pp. 1-5.
PCT Notification of Transmittal of The International Search Report; International Application No. PCT/US2012/028232; International Filing Date: Mar. 8, 2012, dated Nov. 16, 2012, pp. 1-7.
PCT Notification of Transmittal of The International Search Report; International Application No. PCT/US2012/047404; International Filing Date: Jul. 19, 2012, dated Feb. 27, 2013, pp. 1-8.
PCT Notification of Transmittal of The International Search Report; International Application No. PCT/US2012/047409; International Filing Date: Jul. 19, 2012, dated Feb. 27, 2013, pp. 1-8.
PCT Notification of Transmittal of The International Search Report; International Application No. PCT/US2012/047411; International Filing Date: Jul. 19, 2012, dated Feb. 27, 2013, pp. 1-7.
PCT Notification of Transmittal of The International Search Report; International Application No. PCT/US2013/060584; International Filing Date: Sep. 19, 2013, dated Nov. 25, 2013, pp. 1-5.
PCT Notification of Transmittal of The International Search Report; International Application No. PCT/US2014/034032; International Filing Date: Apr. 14, 2014, dated Sep. 8, 2014, pp. 1-17.
PCT Notification of Transmittal of The International Search Report; International Application No. PCT/US2014/072702; International Filing Date: Dec. 30, 2014, dated Mar. 16, 2015, pp. 1-5.
PCT Notification of Transmittal of The International Search Report; International Application No. PCT/US2014/072708; International Filing Date: Dec. 30, 2014, dated Mar. 3, 2015, pp. 1-4.
PCT Notification of Transmittal of The International Search Report; International Application No. PCT/US2015/018072; International Filing Date: Feb. 27, 2015, dated Jun. 17, 2015, pp. 1-6.
PCT Notification of Transmittal of The International Search Report; International Application No. PCT/US2015/031074; International Filing Date: May 15, 2015, dated Sep. 15, 2015, pp. 1-5.

(56) References Cited

OTHER PUBLICATIONS

PCT Notification of Transmittal of The International Search Report; International Application No. PCT/US2015/031742; International Filing Date: May 20, 2015, dated Dec. 16, 2015, pp. 1-7.
PCT Written Opinion; International Application No. PCT/IB2009/007718; International Filing Date: Nov. 24, 2009, dated May 21, 2010, pp. 1-4.
PCT Written Opinion; International Application No. PCT/US2009/065594; International Filing Date: Nov. 24, 2009, dated Sep. 22, 2011, pp. 1-7.
PCT Written Opinion; International Application No. PCT/US2011/038738; International Filing Date: Jun. 1, 2011, dated Feb. 6, 2012, pp. 1-7.
PCT Written Opinion; International Application No. PCT/US2011/038747; International Filing Date: Jun. 1, 2011, dated Sep. 6, 2011, pp. 1-7.
PCT Written Opinion; International Application No. PCT/US2012/028232; International Filing Date: Mar. 8, 2012, dated Nov. 16, 2012, pp. 1-10.
PCT Written Opinion; International Application No. PCT/US2012/047404; International Filing Date: Jul. 19, 2012, dated Feb. 27, 2013, pp. 1-11.
PCT Written Opinion; International Application No. PCT/US2012/047411; International Filing Date: Jul. 19, 2012, dated Feb. 27, 2013, pp. 1-11.
PCT Written Opinion; International Application No. PCT/US2013/060584; International Filing Date: Sep. 19, 2013, dated Nov. 25, 2013, pp. 1-6.
PCT Written Opinion; International Application No. PCT/US2014/034032; International Filing Date: Apr. 14, 2014, dated Sep. 8, 2014, pp. 1-8.
PCT Written Opinion; International Application No. PCT/US2014/072702; International Filing Date: Dec. 30, 2014, dated Mar. 16, 2015, pp. 1-10.
PCT Written Opinion; International Application No. PCT/US2014/072708; International Filing Date: Dec. 30, 2014, dated Mar. 3, 2015, pp. 1-6.
PCT Written Opinion; International Application No. PCT/US2015/018072; International Filing Date: Feb. 27, 2015, dated Jun. 17, 2015, pp. 1-8.
PCT Written Opinion; International Application No. PCT/US2015/031074; International Filing Date: May 15, 2015, dated Sep. 15, 2015, pp. 1-6.
PCT Written Opinion; International Application No. PCT/US2015/031742; International Filing Date: May 20, 2015, dated Dec. 16, 2015, pp. 1-8.
PCT Written Opnion; International Application No. PCT/US2012/047409; International Filing Date: Jul. 19, 2012, dated Feb. 27, 2013, pp. 1-10.
Petros Gebreselassie, "Effervescent Pressed Gum Tablet Compositions," U.S. Appl. No. 60/618,222, Filed: Oct. 13, 2004.
Richard W. Hartel, "Crystallization and Drying During Hard Panning," The Manufacturing Confectioner, pp. 51-57, Feb. 1995.
Robert Boutin, et al., "Sugarless Hard Panning," The Manufacturing Confectioner, pp. 35-42, Nov. 2004.
Robert D. Walter, "Panning—the specialist's specialty" Part 1;Candy & Snack Industry, pp. 43-51; Dec. 1974.
Robert D. Walter, "Panning—the Specialist's Specialty"; Part 2; Candy & Snack Industry; pp. 44-51; Jan. 1975.
Robert L. Davidson, "Handbook of Water-Soluble Gums and Resins," Handbook of Water-Soluble Gums and Resins, Jun. 5, 1980, Chapter 24, Xanthan Gum, pp. 1-33.
Roman Oberli, "System and Methods for Passive Ticketing," U.S. Appl. No. 62/247,997, filed Oct. 29, 2015.
RU 1st Office Action with translation, RU Application No. 2014106418/13(010180); dated Jul. 3, 2015, pp. 1-5.
RU 1st Office Action with translation; Application No. 2013145559/13(070430); dated Jan. 20, 2015, pp. 1-11.
RU 1st Office Action with translation; RU Application No. 2014106421/13(010183); dated Jul. 6, 2015, pp. 1-10.
U.S. Non-Final Office Action for U.S. Appl. No. 15/311,326; Application filing date Nov. 15, 2016; Report dated Mar. 10, 2023 (11 Pages).
Brazilian Office Action for Brazil Application No. BR112016016620-5; Office Action Report dated Nov. 9, 2021; (pp. 1-14—With Machine Translation).
Brazilian Office Action for Brazilian Application No. BR112016016620-5; Office Action Report dated Aug. 3, 2021; (pp. 1-14—With Machine Translation).
Chinese Office Action for Chinese Application No. 20140067736.9; Office Action Report dated Jan. 19, 2023; (pp. 1-7).
Chinese Office Action for Chinese Application No. 201580010596.6; Office Action Report dated Aug. 17, 2023; (pp. 1-24—With Machine Translation).
Chinese Office Action for Chinese Application No. 201580024617.X; Office Action Report dated Dec. 30, 2020; (pp. 1-7—With Machine Translation).
Chinese Office Action for Chinese Application No. 201710386468.2 Office Action Report dated Oct. 14, 2020; (pp. 1-10—With Machine Translation).
Chinese Office Action for Chinese Application No. 201711191722.X; Office Action Report dated Jun. 28, 2021; (pp. 1-9—With Machine Translation).
Chinese Office Action for Chinese Application No. 201711191722.X; Office Action Report dated Dec. 31, 2020; (pp. 1-15—With Machine Translation).
Chinese Office Action for Chinese Application No. 201711337861.9; Office Action Report dated Oct. 15, 2021; (pp. 1-12—With Machine Translation).
Chinese Office Action for Chinese Application No. 201711337861.9; Office Action Report dated Mar. 31, 2021; (pp. 1-14—With Machine Translation).
Chinese Office Action for Chinese Application No. 201810420045.2; Office Action Report dated Jan. 10, 2023; (pp. 1-14—With Machine Translation).
Chinese Office Action for Chinese Application No. 201810420045.2; Office Action Report dated Feb. 21, 2022; (pp. 1-13—With Machine Translation).
Chinese Office Action for Chinese Application No. 201810420045.2; Office Action Report dated Apr. 23, 2021; (pp. 1-17—With Machine Translation).
Chinese Office Action for Chinese Application No. 2019-080968; Office Action Report dated Jul. 11, 2022; (pp. 1-17—With Machine Translation).
Chinese Office Action for Chinese Application No. 202010202922.6; Office Action Report dated Nov. 2, 2022; (pp. 1-11—With Machine Translation).
Chinese Office Action for Chinese Application No. 201580010596.6; Office Action Report dated Apr. 27, 2023; (pp. 1-9—With Machine Translation).
European Appeal Decision Issued for European Application No. 15729600.5, Report dated Jul. 24, 2023.
European Notice of Opposition for European Application No. 15729600.5; Report dated Sep. 23, 2021 (23 Pages).
European Office Action for European Application No. 20 181 435.7; Office Action Report dated Jul. 14, 2023; (pp. 1-6).
European Summons to Attend Oral Hearing for European Application No. 15729600.5; Report dated Sep. 30, 2022 (pp. 1-20).
Final Office Action for U.S. Appl. No. 15/311,962; Application filing date Nov. 17, 2016; Report dated Mar. 7, 2023 (16 Pages).
Indian Office Action for Indian Application No. 202348000131; Office Action Report dated Apr. 11, 2023; (pp. 1-3).
Indian Office Action for Indian Patent Application No. 201948021226, Office Action Report dated Jul. 12, 2022 (pp. 1-5).
Japanese Office Action for Japanese Application No. 2019-080968; Office Action Report dated Dec. 9, 2021; (pp. 1-8—With Machine Translation).
Japanese Office Action for Japanese Application No. 2021-119486; Office Action Report dated Jan. 5, 2023 (pp. 1-4—With Machine Translation).
Japanese Office Action for Japanese Application No. 2021-119486; Office Action Report dated Jun. 14, 2022; (pp. 1-2—With Machine Translation).

(56) References Cited

OTHER PUBLICATIONS

Japanese Office Action; International Application No. 2019-080968; International Filing Date: Apr. 2, 2016; dated Jan. 20, 2021; (pp. 1-7—With Machine Translation).
Mexican Office Action for Mexican Application No. MX/a/2014/000795; Office Action Report dated Dec. 7, 2020; (pp. 1-40—With Machine Translation).
Mexican Office Action for Mexican Application No. MX/a/2016/015009; Office Action Report dated Jul. 12, 2021; (pp. 1-6—With Machine Translation).
Mexican Office Action for Mexican Application No. MX/a/2018/009635; Office Action Report dated Jul. 11, 2022; (pp. 1-10—With Machine Translation), Mexican Office Action for Mexican Application No. MX/a/2018/009635; Office Action Report dated Jul. 11, 2022; (pp. 1-10—With Machine Translation).
Mexican Office Action for Mexican Application No. MX/a/2018/009635; Office Action Report dated Jan. 3, 2023; (pp. 1-9).
Mexican Office Action for Mexican Application No. MX/a/2019/001451; Office Action Report dated Nov. 25, 2022; (pp. 1-6—With Machine Translation).
Chinese Office Action for Chinese Application No. 201580024617.X; Office Action Report dated Mar. 4, 2019; (pp. 1-13—With Machine Translation).
Chinese Office Action for Chinese Application No. 201580024617.X; Office Action Report dated Aug. 23, 2019; (pp. 1-7—With Machine Translation).
Chinese Office Action for Chinese Application No. 201580024617.X; Office Action Report dated Jan. 8, 2020; (pp. 1-8—With Machine Translation).
European Office Action for European Application No. 15729600.5; Office Action Report dated Nov. 4, 2019 (pp. 1-6).
Mexican Office Action for Mexican Application No. MX/a/2019/000267; Office Action Report dated Sep. 21, 2023; (9 Pages; with partial translation).
Mexican Office Action for Mexican Application No. MX/a/2023/011965; Office Action Report dated Oct. 18, 2023; (22 Pages; with translation).
Mexican Office Action for Mexican Application No. MX/a/2023/011967; Office Action Report dated Oct. 18, 2023; (22 Pages; with translation).

* cited by examiner

SYSTEM AND METHOD OF FORMING MULTILAYER CONFECTIONERY

CROSS-REFERENCE TO RELATED APPLICATIONS

This application is a Divisional of U.S. application Ser. No. 14/004,343 filed Sep. 10, 2013, which is a National Stage Application of PCT/US2012/028232 filed Mar. 8, 2012, which claims the benefit of U.S. Provisional Application No. 61/451,805 filed Mar. 11, 2011, the disclosures of which are incorporated herein by reference in their entirety.

FIELD OF THE INVENTION

The present invention relates to manufacturing systems and methods for multilayer confectionery products and more particularly relates to forming systems and methods and/or temperature altering systems and methods for multilayer confectionery products including at least two confectionery layers.

BACKGROUND OF THE INVENTION

Some confectionery products available in the market include multiple different confectionery compositions, but not all of the different compositions of the confectionery products are visible to a consumer. An example of such confectionery product includes a chewing gum center-filled candy that includes a hard candy outer-shell encasing the chewing gum center. Unfortunately, such confectionery products do not provide the consumer with visual benefits of being provided with two different confectionery compositions at the same time.

Recently, the assignee of the present application has launched a multilayer confectionery product including a chewy candy layer and two chewing gum layers. This multilayer confectionery product presents three visibly distinct confectionery layers and allows the consumer to simultaneously enjoy the flavor and sensorial benefits of the different confectionery compositions.

However, manufacturing of such multilayer confectionery products poses unique challenges. For example, when laminating several layers of different confectionery compositions having different characteristics, the layer having a lower viscosity than other layers may ooze, or the layers may not adhere to each other sufficiently and may slide against each other.

Further, manufacturing of a multilayer confectionery product including a chewing gum layer can introduce additional processing challenges as the gum making process is typically time-consuming and involves a significant amount of machinery. The conventional gum making/forming can include mixing and producing a finished gum as a non-uniform output, extruding and forming the finished gum into loaves, conditioning the loaves of the finished gum, extruding the loaves into a continuous thin sheet of the finished gum, rolling the continuous sheet through a series of rollers to a uniform reduced thickness, scoring and dividing sheets into individual scored sheets, and conditioning the individual sheets in a conditioning room. Such processes of making and forming gum products are disclosed in U.S. Pat. Nos. 4,882,175; 6,254,373 and 7,112,345; which are assigned to the predecessor of interest of the present assignee; and U.S. patent application Ser. No. 12/352,110 assigned to the present assignee; the teachings and disclosures of which are hereby incorporated by reference in their entireties to the extent not inconsistent with the present disclosure.

Traditional gum sizing machineries include a sizing extruder that forces the chewing gum through a small rectangular orifice (e.g. a rectangular orifice having dimensions of about 25 mm by 457 mm). A relatively sizeable amount of force is required as the orifice size gets smaller. Typically, the product exiting the sizing extruder is still much too thick. As a result, many prior systems will typically employ a series of sizing rollers arranged in sequence over a conveyor belt to progressively reduce the thickness of gum from around 25 millimeters to typically about 2-6 millimeters, such as the multiple sizing rollers in traditional rolling and scoring systems. Further, to prevent sticking of gum to the rollers, dusting with a suitable powder agent is typically employed. Thereafter, a scoring roll and dividing roll may be used to generate thin sticks, or somewhat shorter and fatter slabs of gum, or pellets. Such traditional lines also typically will necessitate a fair amount of subsequent cooling and/or conditioning prior to packaging as warm pliable product does not package well. Further, cleaning of such traditional lines is labor intensive and can last hours, for example, up to 10 hours.

The present invention therefore relates to improvements in systems and methods of forming and/or cooling multilayer confectionery products.

BRIEF SUMMARY OF THE INVENTION

In view of the above, embodiments of the present invention provide new and improved systems and methods of making multilayer confectionery products that overcome one or more of the problems existing in the art. More particularly, embodiments of the present invention provide systems and methods for separately forming each layer, and/or separately altering a temperature of each layer, and laminating the layers to form a multilayer confectionery product. Since process parameters can be independently controlled for each layer, the systems and methods are particularly advantageous for making multilayer confectionery products including multiple different confectionery compositions having different characteristics. Further, the systems and methods can provide additional advantages for multilayer confectionery products including at least one chewing gum layer by providing an improved alternative to traditional gum forming and sizing systems. Thus, whole new ranges of multilayer confectionery process capabilities are provided with several inventive aspects, which may be used independently or in combination, such as those summarized below and/or set forth throughout this disclosure.

One inventive aspect is directed toward an apparatus and method for forming a multilayer confectionery product using multiple sets of forming drums. The forming drums of each set have a gap therebetween that is adapted to generate a sheet of a confectionery composition having a generally uniform thickness that corresponds to the gap.

Several processing arrangements with advantages may be realized. For example, in some embodiments, each set of the forming drums can be configured to generate a desired thickness of the confectionery sheet, which may be same or different than other layers. Further, some or all of the forming drums may be heat transfer drums to heat or cool confectionery compositions as they are formed into layers. In such embodiments, each layer of the confectionery compositions can be cooled or heated independently according to its characteristics to obtain an optimal viscosity of each confectionery composition layer to avoid or minimize oozing, slipping, and other process challenges of forming and laminating multiple layers of confectionery compositions having different properties.

Further, for multilayer confectionery products including at least one chewing gum layer, the forming drums can be used to generate a desired chewing gum thickness in one one forming step. As such, a series of rollers and progressive thickness reduction rolling operation may be eliminated from the gum forming process. In one embodiment, the spacing between the forming drums is set at between 1 and 6 millimeters, which can substantially correspond (same or near) to the final chewing gum thickness that is desired. Once passing through the forming drums, the gum has a generally uniform thickness with a thickness variance of less than 20%, more typically less than 10%, and preferably about 5% or less. Similarly, other confectioneries can be formed using the forming drums to produce a layer of confectionery composition having a desired thickness.

Preferably, a downstream compression roller is employed to smooth out any surface irregularities in the multilayer confectionery sheet due to various compositional and process variables. The downstream compression roller can also enhance adhesion between the multiple layers. The compression roller can be arranged on a conveyor belt with a spacing therebetween corresponding to a desired total thickness of the multilayer confectionery product or slightly greater or less (e.g. 0.0-0.3 millimeter variance). Preferably, the compression roller is a heat transfer roller that can heat or cool the multilayer confectionery products. In some embodiments, the temperature of the compression roller is an important variable in controlling the surface quality and thickness of the multilayer confectionery products. The compression roller may also or alternatively serve the purpose of pressing candy sprinkles or other confectionary ingredient into the top surface of the multilayer confectionery product.

Another inventive aspect is that the forming drums according to some embodiments can replace high shear sizing type pre-extruders in conventional gum manufacturing lines. In traditional gum manufacturing lines, a pre-extruder is typically used to generate a relatively thin continuous ribbon (e.g. about 1 inch thick by 18 inches wide). The present invention contemplates using the forming drums instead of a sizing type pre-extruder and downstream multiple size reduction rolling rollers. An advantage of such embodiments is that significantly less shear force is exerted on the chewing gum. As a result, certain shear sensitive ingredients are likely to remain much more intact, such that either the resulting product may contain more shear sensitive ingredient intact in the final product, or a smaller quantity of shear sensitive ingredients need to be added during gum mixing operations to accomplish a gum with a final ingredient content make-up, thereby invoking a potential for costs savings.

Further, much wider width layers, at least 24 inches wide and easily up to 36 to 50 inches wide or perhaps wider if desired, can be formed using the forming drums (150%-300% or more wider than conventional sizing type pre-extruders). Such a wider laminated confectionery layers can substantially improve production efficiency.

A separate advantage of the system according to embodiments of the present invention that the system is a low energy system, specially when compared to conventional gum lines including the sizing type pre-extruder and downstream multiple size reduction rolling rollers (60%-80% reduction in energy input.)

In one embodiment of the present invention, a method of forming a multilayer confectionery sheet is provided. The method includes steps of forming a first confectionery sheet having an average thickness between about 0.3 mm and 10 mm using a first set of forming drums; forming a second confectionery sheet having an average thickness between about 0.3 mm and 10 mm using a second set of forming drums; and laminating the first confectionery sheet and the second confectionery sheet to form a multilayer confectionery sheet.

In another embodiment of the present invention, a method of forming a multilayer confectionery while controlling viscosities of each confectionery layers is provided. The method includes steps of forming a first confectionery into a first confectionery sheet having a generally uniform thickness using a first set of forming drums; forming a second confectionery into a second confectionery sheet having a generally uniform thickness using a second set of forming drums; controlling a viscosity of at least one of the first and second confectioneries using the first or second set of forming drums to provide a sufficient adhesion between the first and second confectionery sheets while minimizing oozing; and laminating the first confectionery sheet and the second confectionery sheet to form a multilayer confectionery sheet.

In yet another embodiment of the present invention, an apparatus for forming a multilayered confectionery is provided. The apparatus includes at least two sets of forming drums arranged in a series. Each set of forming drums includes at least two forming drums arranged with a gap therebetween and a gap setting device for adjusting a position of at least one of the forming drums to set the gap at between to about 0.3 mm and 10 mm. Each set of forming drums forms a confectionery sheet having an average thickness between about 0.3 mm and 10 mm, and at least one of the forming drums laminates the confectionery sheets on a conveyor belt to form a multilayer confectionery sheet.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
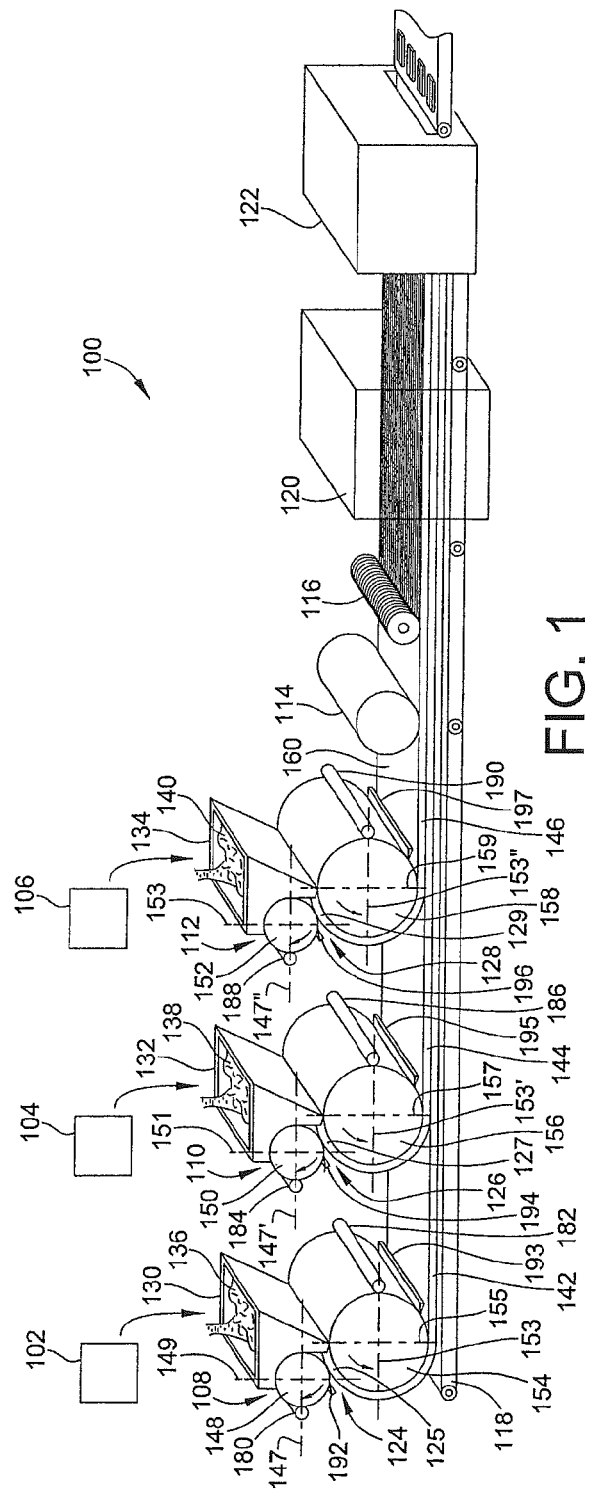
FIG. 1 is a partly schematic and partly perspective illustration of a multilayer confectionery product manufacturing system according to an embodiment of the present invention including three confectionery forming stations to produce a three-layer confectionery composition.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The multilayer confectionery products, particularly those including visibly distinct layers, provide unique visual enjoyments to consumers. Further, multilayer confectionery products can provide new and improved sensorial enjoyments that may not be available via a single component confectionery products. For example, a multilayer confectionery product can be formulated to include at least one chewing gum layer to provide a prolonged and lasting flavor profile and at least one candy type confectionery layer to provide a faster release of flavor for an initial burst of flavor or sweetness. Further, layers of the multilayer confectionery product can be formulated to include new textural features, such as matching or mismatched textures, to provide new sensorial enjoyments to consumers.

Therefore, there is a need in the market to develop various multilayer confectionery products including different confectionery components. However, manufacturing of such multilayer confectionery products can pose unique process challenges, as discussed above, specially for those products including multiple confectionery compositions having different characteristics that require different process parameters. Further, conventional confectionery manufacturing equipment and processes can limit the range of confectionery formulations that can be used to make the multilayer confectionery products.

The present invention provides new and improved systems and methods for making multilayer confectionery products that address those challenges and limitations of existing manufacturing systems and processes. The systems and methods according to embodiments of the present invention include multiple sets of forming drums that form each confectionery layer separately, and laminate the layers to form the multilayer confectionery product.

As each layer is formed using a separate set of forming drums, process parameters of the set of forming drums can be independently controlled according to compositional characteristics of each confectionery layer for optimum forming of the layer. Further, a temperature of each layer can also be independently adjusted using the same forming drums or using separate heat transfer drums. The forming drums are also referred to as sizing drums, laminating drums, forming rollers, sizing rollers, or other similar terms.

The systems that include the forming drums according to various embodiments of the present invention can provide many advantages over other conventional confectionery manufacturing systems. A set of forming drums can generally form and size a confectionery layer to a desired thickness and width in a single step, thus can replace equipment heavy and lengthy process steps such as forming extruder and/or rolling rollers of conventional gum making systems. Thus, such systems and methods are particularly advantageous for forming a multilayer confectionery products including at least one chewing gum layer, as the forming drums can provide a single step low shear formation of a gum layer having a desired thickness and width, thereby replacing the high shear sizing type pre-extruder (also referred to as a forming extruder) and multiple size reduction rolling rollers in conventional gum lines.

Further, the forming drums provide for a low energy and low shear system. In some embodiments, the energy input to the system can be reduced by 60%-80% when compared to some conventional gum manufacturing systems. Further, the low shear system can preserves integrity of shear sensitive ingredients and/or actives such as long lasting sweeteners. The range of confectionery formulations that can be used to form the multilayer confectionery products can also be improved. For example, the system can handle low elasticity binder formulations as well as elastic gum formulations with minor process parameter changes.

The forming drums can be lubricated using non-powder release agents such as a vegetable or mineral oil, thereby eliminating expensive dust collection equipment required in conventional systems that use powder release agents. By eliminating the powder release agent, new confectionery products without a powdery appearance can be produced, which may also provide enhanced taste. Further, lack of the use of powder release agents and simplified equipment requirement due to the single step forming by the forming drums, a change over time between confectionery compositions or flavors is greatly reduced with minimal cleaning requirement. In one embodiment, the change over time between flavors is reduce down to 5-10 minutes, which is an extraordinary reduction when compared to change over times of conventional gum manufacturing lines which can take up to hours.

In some embodiments, the forming stations can form a core confectionery layer and compressively laminate a coating layer on one or both sides of the core confectionery layer. For example, a dough-like coating material can be compressed onto a chewing gum layer to form a desirable coating, which may be hard or soft, in as little as a single application. Such a coating process may take seconds or minutes. This novel coating process departs from the conventional panning coating technology that applies numerous thin layers of sugar syrup coating material to the core, which typically takes several hours. By compressively laminating the coating layers using the forming drums, the embodiments of the present application do not only provide time and cost savings, but also provide greater flexibility in product format. For example, soft confectionery cores can be used, different coating on different surface of the core can be formed, and/or different shape products can be made, etc. Further, the coating formed by the forming rollers can produce superior surface uniformity, smoothness, and appearance compared to other systems such as extrusion coating processes.

General Overview of Forming Systems and Methods

The systems and methods according to various embodiments of the present invention solve the challenges in making such multilayer confectionery products by providing multiple forming stations, each of which includes a set of forming drums that forms and/or conditions each layer of confectionery component separately and laminate the layers together. As such, each layer of confectionery component can be formed to a desired thickness and width, and/or adjusted to a desired temperature according to its physical properties.

One embodiment of the system for making a multilayer confectionery product is illustrated in FIG. 1. A manufacturing system 100 is configured to form a three-layer confectionery product. As shown, the system 100 generally includes three upstream mixing systems 102, 104, 106 for preparing each of the confectionery layers, three confectionery forming stations 108, 110, 112, a compression roller 114, a scoring roller 116, a conveyor belt 118, a cooling tunnel 120 and a packaging station 122.

Each of the upstream mixing systems 102, 104, 106 is schematically illustrated as a box in FIG. 1. Each the upstream mixing systems 102, 104, 106 includes equipments needed to prepare a selected confectionery. For example, each of the upstream mixing system 102, 104, 106 may include a mixer (a batch mixer and/or a continuous mixer), a cooker, and/or other equipments according to the desired confectionery. Each of the upstream mixing system 102, 104, 106 may prepare a same confectionery composition or different confectionery compositions. Each of the upstream mixing system 102, 104, 106 feeds the corresponding forming station 108, 110, 112. Each of the forming station includes a set of forming drums 124, 126, 128 and a hopper 130, 132, 134.

Each set of forming drums 124, 126, 128 includes two forming drums. Each set of forming drums 124, 126, 128 can form a confectionery sheet having a thickness between about 0.3 mm and 25 mm, typically between about 0.3 mm and 15 mm, and preferably between about 0.3 and 10 mm, and more preferably between about 2 mm and 6 mm, with a coefficient of variation of thickness of less than about 25%, more typically less than about 20%, and preferably less than about 10%, 5%, 3% or 1%. The set of forming drums 124 forms a first confectionery layer 142 having a desired width and thickness using the forming drums 148, 154. A second confectionery layer 144 is formed and sized by the forming drums 150, 156 of the set of forming drums 126. The second confectionery layer 144 is laminated on top the first confectionery layer 142 via the bottom forming drum 156. Similarly, a third confection layer 146 is formed and sized by the forming drums 152, 158, and laminated on the top surface of the second confectionery layer 144. The compression roller 114 can smooth out any surface irregularities, and/or further reduce a thickness of the multilayer confectionery, and/or enhance adhesion between confectionery layers 142, 144, 146.

Before turning to more detailed discussions of embodiments, some non-limiting compositional information and characteristics of chewing gum and candy, which can be used to form various multilayer confectionery products will be provided.

Chewing Gum

Chewing gum comprises in large part of components that are usually never swallowed, gum base, which is the rubber-like chewing component. Chewing gum also comprises a consumed portion including sweeteners, flavors and the like, and may also include other candy or food product integrated therewith in layers or as ingredients. The gum base is relatively unique in food processing in that it introduces the material with a resiliency and elasticity relative to processing and also provides a relatively non-conductive or insulating material that does not transfer heat very well. This provides unique processing difficulties. Relative to processing, the temperature of the processed gum greatly affects viscosity as well as other processing characteristics such as elasticity and resiliency.

Further, different types of gum recipes will also alter processing considerations, and there generally is a desire to run different gum recipes on the same equipment or lines. Some of the ingredients handle processing quite well. Other ingredients such as flavors may be subject to flash off due to heat, thereby diminishing the amount of flavor in the final consumable product. Other ingredients such as encapsulated sweeteners, are sensitive to shear forces (e.g. due to substantial pressure, intense mixing, processing force and the like) and thus can be damaged during processing. These factors all provide different challenges relative to forming and sizing the gum and laminating with other confectionery components to make multilayer products. For purpose of understanding, some lexicography and typical gum composition components will be discussed below.

As used herein, "gum structure" includes, but is not limited to, compositions ranging from and inclusive of compounded elastomer to finished gum, which may include compounded elastomer in addition to some compounding aids, master batch gum base, compounded elastomer in addition to some subsequent gum ingredients, compounded elastomer in addition to some gum base ingredients and some subsequent gum ingredients, gum base, gum base in addition to some subsequent gum ingredients, master batch finished gum, and finished gum.

A "finished gum", as used herein, refers to a gum structure that is generally ready for preparation to distribute the product to the consumer. As such, a finished gum may still require temperature conditioning, forming, shaping, coating and packaging. However, the gum composition itself is generally ready for user consumption. Not all finished gums have the same ingredients or the same amounts of individual ingredients. By varying the ingredients and amounts of ingredients, textures, flavor and sensations, among other things, can be varied to provide differing characteristics to meet the needs of users. As is generally well known, a finished gum generally includes a water soluble bulk portion, a water insoluble gum base portion, and one or more flavoring agents. The water soluble portion dissipates over a period of time during chewing. The gum base portion is retained in the mouth throughout the chewing process.

A "finished gum base", as used herein, refers to a gum structure that includes a sufficient combination of gum base ingredients that need only be combined with subsequent gum ingredients to form a finished gum. A finished gum base is a chewable visco-elastic material that includes at least a viscous component, an elastic component, and a softener component. For example, a typical gum base may include elastomer, at least some of the filler, resin and/or plasticizer, polyvinyl acetate, and a softener (such as an oil, fat or wax). Merely compounded elastomer without the addition of any softener, for example, would not be a finished gum base because it would not be considered useable in a finished gum structure because of its difficulty, if not impossibility, to chew.

Ingredients

Gum structures may include a vast number of ingredients in various categories. Gum mixing systems and methods according to various embodiments of the present invention may be used to mix any and all known ingredients including, but not limited to, ingredients in the following ingredient categories: elastomers, bulking agents, elastomer plasticizers (which includes resins), elastomer solvents, plasticizers, fats, waxes, fillers, antioxidants, sweeteners (e.g. bulk sweeteners and high intensity sweeteners), syrups/fluids, flavors, sensates, potentiators, acids, emulsifiers, colors, and functional ingredients.

The insoluble gum base generally includes ingredients falling under the following categories: elastomers, elastomer plasticizers (resins or solvents), plasticizers, fats, oils, waxes, softeners and fillers. Further discussion of representative ingredients within each category will be provided later on. The gum base may constitute between 5-95% by weight of a finished gum, more typically 10-50% by weight of the finished gum, and most commonly 20-30% by weight of the finished gum.

The water soluble portion of finished gum may includes subsequent gum ingredients falling under the following categories: softeners, bulk sweeteners, high intensity sweeteners, flavoring agents, acids, additional fillers, functional ingredients and combinations thereof. Softeners are added to the gum in order to optimize the chewability and mouth feel of the gum. The softeners, which are also known as plasticizers, plasticizing agents or emulsifiers, generally constitute between about 0.5-15% by weight of the gum structure. Bulk sweeteners constitute between 5-95% by weight of the gum structure, more typically 20-80% by weight of the gum and most commonly 30-60% by weight of the gum. High intensity sweeteners may also be present and are commonly used with sugarless sweeteners. When used, high intensity sweeteners typically constitute between 0.001-5% by weight of the gum structure, preferably between 0.01-3% by weight of the chewing gum. Typically, high intensity sweeteners are at least 20 times sweeter than sucrose.

Flavor should generally be present in the gum in an amount within the range of about 0.1-15% by weight of the chewing gum, preferably between about 0.2-5% by weight of the gum, most preferably between about 0.5-3% by weight of the gum. Natural and artificial flavoring agents may be used and combined in any sensorially acceptable fashion.

When included, acids typically constitute between about 0.001-5% by weight of the gum structure.

Optional ingredients such as colors, functional ingredients and additional flavoring agents may also be included in gum structures.

Now that a more general overview has been provided as to general common ingredients, more details about individual categories of ingredients and examples of specific ingredients with in various categories will be provided below.

Elastomers

The elastomers employed in the gum structure will vary greatly depending upon various factors such as the type of gum structure desired, the consistency of gum structure desired and the other components used in the gum structure. The elastomer may be any water-insoluble polymer known in the art, and includes those polymers utilized for chewing gums and bubble gums. Illustrative examples of suitable polymers in gum structures, and particularly gum bases, include both natural and synthetic elastomers. For example, those polymers which are suitable in gum structures include, without limitation, natural substances (of vegetable origin) such as caspi, chicle, natural rubber, crown gum, nispero, rosidinha, jelutong, guayule, perillo, niger gutta, tunu, balata, guttapercha, lechi capsi, sorva, gutta kay, and the like, and combinations thereof. Examples of synthetic elastomers include, without limitation, styrene-butadiene copolymers (SBR), polyisobutylene, isobutylene-isoprene copolymers, polyethylene, polyvinyl acetate and the like, and combinations thereof. Elastomers constitute between about 10% to about 60% by weight and more commonly between about 35-40% by weight of the gum structure.

Additional useful polymers include: crosslinked polyvinyl pyrrolidone, polymethylmethacrylate; copolymers of lactic acid, polyhydroxyalkanoates, plasticized ethylcellulose, polyvinyl acetatephthalate and combinations thereof.

Elastomer Plasticizers

The gum structure may contain elastomer solvents, also referred to herein as elastomer plasticizers, to aid in softening the elastomeric materials. Such elastomer solvents may include those elastomer solvents known in the art, for example, terpinene resins such as polymers of alpha-pinene, beta-pinene or d-limonene, methyl, glycerol and pentaerythritol esters of rosins and modified rosins and gums such as hydrogenated, dimerized and polymerized rosins, and mixtures thereof. Examples of elastomer solvents suitable for use herein may include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum structure in amounts from about 2% to about 15%, and preferably from about 7% to about 11%, by weight of the gum structure.

Plasticizers

The gum structure may also include plasticizers or softeners, which also fall under the wax category described below, to provide a variety of desirable textures and consistency properties. Because of the low molecular weight of these ingredients, the plasticizers and softeners are able to penetrate the fundamental structure of the gum structure making it plastic and less viscous. Useful plasticizers and softeners include triacetin, medium chain triglycerides of non-hydrogenated, partially hydrogenated cotton seed oil, soybean oil, palm oil, palm kernel oil, coconut oil, safflower oil, tallow oil, cocoa butter, terpene resins derived from alpha-pinene, lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, sorbitan monostearate, tallow, propylene glycol, mixtures thereof, and the like, may also be incorporated into the gum structure. The plasticizers and softeners are generally employed in the gum structure in amounts up to about 20% by weight of the gum structure, and more specifically in amounts from about 9% to about 17%, by weight of the gum structure.

Plasticizers may also include hydrogenated vegetable oils, soybean oil and cottonseed oil which may be employed alone or in combination. These plasticizers provide the gum structure with good texture and soft chew characteristics. These plasticizers and softeners are generally employed in amounts from about 5% to about 14%, and more specifically in amounts from about 5% to about 13.5%, by weight of the gum structure.

Fats

Suitable oils and fats include partially hydrogenated vegetable or animal fats, such as coconut oil, palm kernel oil, beef tallow, and lard, among others. These ingredients when used are generally present in amounts up to about 7%, and preferably up to about 3.5%, by weight of the gum structure.

Waxes

In some embodiments, the gum structure may include wax. Waxes that are used may include synthetic waxes such as waxes containing branched alkanes and copolymerized with monomers such as, but not limited to, polypropylene and polyethylene and Fischer-Tropsch type waxes, petroleum waxes such as paraffin, and microcrystalline wax, and natural waxes such as beeswax, candellia, carnauba, and polyethylene wax, rice bran and petroleum.

It softens the polymeric mixture and improves the elasticity of the gum structure. When present, the waxes employed will have a melting point below about 60° C., and preferably between about 45° C. and about 55° C. The low melting wax may be a paraffin wax. The wax may be present in the gum structure in an amount from about 6% to about 10%, and preferably from about 7% to about 9.5%, by weight of the gum structure.

In addition to the low melting point waxes, waxes having a higher melting point may be used in the gum structure in amounts up to about 5%, by weight of the gum structure. Such high melting waxes include beeswax, vegetable wax, candelilla wax, carnuba wax, most petroleum waxes, and the like, and mixtures thereof.

Fillers

In some embodiments, gum structures formed using the systems and methods according to the teachings of the invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, clay, titanium oxide, ground limestone, monocalcium phosphate, tricalcium phosphate, dicalcium phosphate, calcium sulfate and the like, and mixtures thereof. These fillers or adjuvants may be used in the gum structure in various amounts. The amount of filler, may be present in an amount from about zero to about 40%, and more specifically from about zero to about 30%, by weight of the gum structure. In some embodiments, the amount of filler will be from about zero to about 15%, more specifically from about 3% to about 11%.

Antioxidants

Antioxidants can include materials that scavenge free radicals. In some embodiments, antioxidants can include but are not limited to ascorbic acid, citric acid (citric acid may be encapsulated), rosemary oil, vitamin A, vitamin E, vitamin E phosphate, butylated hydroxytoluene (BHT), butylated hydroxyanisole (BHA), propyl gallate, tocopherols, di-alpha-tocopheryl phosphate, tocotrienols, alpha lipoic acid, dihydrolipoic acid, xanthophylls, beta cryptoxanthin, lycopene, lutein, zeaxanthin, astaxanthin, beta-carotene, carotenes, mixed carotenoids, polyphenols, flavonoids, and combinations thereof.

Subsequent Ingredients

The gum structure may also include amounts of conventional additives selected from the group consisting of sweetening agents (bulk and high intensity sweeteners), softeners, emulsifiers, fillers, bulking agents (carriers, extenders, bulk sweeteners), flavoring agents (flavors, flavorings), coloring agents (colorants, colorings), functional ingredients, and the like, and mixtures thereof. Some of these additives may serve more than one purpose. For example, in sugarless gum structure, a sweetener, such as maltitol or other sugar alcohol, may also function as a bulking agent and particularly a water soluble bulking agent.

Bulk Sweeteners

Suitable Bulk Sweeteners include monosaccharides, disaccharides and polysaccharides such as xylose, ribulose, glucose (dextrose), lactose, mannose, galactose, fructose (levulose), sucrose (sugar), maltose, invert sugar, partially hydrolyzed starch and corn syrup solids, sugar alcohols, randomly bonded glucose polymers such as those polymers distributed under the tradename Litesse™ which is the brand name for polydextrose and is manufactured by Danisco Sweeteners, Ltd. of 41-51 Brighton Road, Redhill, Surryey, RH1 6YS, United Kingdom; isomalt (a racemic mixture of alpha-D-glucopyranosyl-1,6-mannitol and alpha-D-glucopyranosyl-1,6-sorbitol manufactured under the tradename PALATINIT™ by Palatinit Sussungsmittel GmbH of Gotlieb-Daimler-Strause 12 a, 68165 Mannheim, Germany); maltodextrins; hydrogenated starch hydrolysates; hydrogenated hexoses; hydrogenated disaccharides; minerals, such as calcium carbonate, talc, titanium dioxide, dicalcium phosphate; celluloses; and mixtures thereof.

Suitable sugarless bulk sweeteners include sorbitol, xylitol, mannitol, galactitol, lactitol, maltitol, erythritol, isomalt and mixtures thereof. Suitable hydrogenated starch hydrolysates include those disclosed in U.S. Pat. No. 4,279,931 and various hydrogenated glucose syrups and/or powders which contain sorbitol, maltitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a commercially available product manufactured by Roquette Freres of France, and HYSTAR®, a commercially available product manufactured by SPI Polyols, Inc. of New Castle, Delaware, are also useful.

In some embodiments, the gum structure may include a specific polyol composition including at least one polyol which is from about 30% to about 80% by weight of said gum structure, and specifically from 50% to about 60%. In some embodiments, such gum structures may have low hygroscopicity. The polyol composition may include any polyol known in the art including, but not limited to maltitol, sorbitol, erythritol, xylitol, mannitol, isomalt, lactitol and combinations thereof. Lycasin™ which is a hydrogenated starch hydrolysate including sorbitol and maltitol, may also be used.

The amount of the polyol composition or combination of polyols used in the gum structure will depend on many factors including the type of elastomers used in the gum structure and the particular polyols used. For example, wherein the total amount of the polyol composition is in the range of about 40% to about 65% based on the weight of the gum structure, the amount of isomalt may be from about 40% to about 60% in addition to an amount of sorbitol from about 0 up to about 10%, more specifically, an amount of isomalt may be from about 45% to about 55% in combination with sorbitol from about 5% to about 10% based on the weight of the gum structure.

The polyol composition which may include one or more different polyols which may be derived from a genetically modified organism ("GMO") or GMO free source. For example, the maltitol may be GMO free maltitol or provided by a hydrogenated starch hydrolysate. For the purposes of this invention, the term "GMO-free" refers to a composition that has been derived from process in which genetically modified organisms are not utilized.

The sweetening agents which may be included in some gum structures formed using systems and methods according to the teachings of the present invention may be any of a variety of sweeteners known in the art and may be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and mixtures thereof.

High Intensity Sweeteners

Desirably, the sweetener is a high intensity sweetener such as aspartame, neotame, sucralose, monatin, and acesulfame potassium (Ace-K). The high intensity sweetener can be in an encapsulated form, a free form, or both.

In general, an effective amount of sweetener may be utilized to provide the level of sweetness desired, and this amount may vary with the sweetener selected. In some embodiments the amount of sweetener may be present in amounts from about 0.001% to about 3%, by weight of the gum, depending upon the sweetener or combination of sweeteners used. The exact range of amounts for each type of sweetener may be selected by those skilled in the art.

The sweeteners involved may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include:

(a) water-soluble sweetening agents such as dihydrochalcones, monellin, steviosides, lo han quo, lo han quo derivatives, glycyrrhizin, dihydroflavenol, and sugar alcohols such as sorbitol, mannitol, maltitol, xylitol, erythritol, and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame), N—[N-(3,3-dimethylbutyl)-L-α-aspartyl]-L-phenylalanine 1-methyl ester (Neotame), and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and mixtures thereof.

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-f uranoside, or 4,1'-dichloro-4,1'-dideoxygalactosucrose; 1',6'-dichloro1',6'-dideoxy sucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-dideox y-beta-D-fructofuranoside, or 4,6,1',6'-tetrachloro4,6,1',6'-tetradeoxygalacto-sucrose; and 4,6,1',6'-tetradeoxy-sucrose, and mixtures thereof;

(e) protein based sweeteners such as thaumaoccous danielli (Thaumatin I and II) and talin; and (f) the sweetener monatin (2-hydroxy-2-(indol-3-ylmethyl)-4-aminoglutaric acid) and its derivatives.

The intense sweetening agents may be used in many distinct physical forms well-known in the art to provide an initial burst of sweetness and/or a prolonged sensation of sweetness. Without being limited thereto, such physical forms include free forms, spray dried forms, powdered forms, beaded forms, encapsulated forms, and mixtures thereof. In one embodiment, the sweetener is a high intensity sweetener such as aspartame, sucralose, and acesulfame potassium (e.g., Ace-K or acesulfame-K). Several representative forms of encapsulated sweeteners and methods of encapsulating sweeteners are illustrated in U.S. Pat. Nos. 7,244,454; 7,022,352; 6,759,066; 5,217,735; 5,192,561; 5,164,210; 4,997,659 and 4,981,698 as well as U.S. Patent Application Publication Nos. 2007/0231424; 2004/0096544; 2005/0112236; and 2005/0220867, the teachings and disclosure of which are hereby incorporated in their entireties by reference thereto.

The active component (e.g., sweetener), which is part of the delivery system, may be used in amounts necessary to impart the desired effect associated with use of the active component (e.g., sweetness). In general, an effective amount of intense sweetener may be utilized to provide the level of sweetness desired, and this amount may vary with the sweetener selected. The intense sweetener may be present in amounts from about 0.001% to about 3%, by weight of the composition, depending upon the sweetener or combination of sweeteners used. The exact range of amounts for each type of sweetener may be selected by those skilled in the art.

Syrups

Anhydrous glycerin may also be employed as a softening agent, such as the commercially available United States Pharmacopeia (USP) grade. Glycerin is a syrupy liquid with a sweet warm taste and has a sweetness of about 60% of that of cane sugar. Because glycerin is hygroscopic, the anhydrous glycerin may be maintained under anhydrous conditions throughout the preparation of the gum structure. Other syrups may include corn syrup and maltitol syrup.

Flavorants

In some embodiments, flavorants may include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, pineapple, apricot, banana, melon, apricot, ume, cherry, raspberry, blackberry, tropical fruit, mango, mangosteen, pomegranate, papaya and so forth. Other potential flavors whose release profiles can be managed include a milk flavor, a butter flavor, a cheese flavor, a cream flavor, and a yogurt flavor; a vanilla flavor; tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a camomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavoring agents may be used in liquid or solid form and may be used individually or in admixture. Commonly used flavors include mints such as peppermint, menthol, spearmint, artificial vanilla, cinnamon derivatives, and various fruit flavors, whether employed individually or in admixture. Flavors may also provide breath freshening properties, particularly the mint flavors when used in combination with the cooling agents, described herein below. In some embodiments, flavorants may chose from geraniol, linalool, nerol, nerolidal, citronellol, heliotropine, methyl cyclopentelone, ethyl vanillin, maltol, ethyl maltol, furaneol, alliaceous compounds, rose type compounds such as phenethanol, phenylacetic acid, nerol, linalyl esters, jasmine, sandlewood, patchouli, and/or cedarwood.

In some embodiments, other flavorings include aldehydes and esters such as cinnamyl acetate, cinnamaldehyde, citral diethylacetal, dihydrocarvyl acetate, eugenyl formate, p methylamisol, and so forth may be used. Generally any flavoring or food additive such as those described in Chemicals Used in Food Processing, publication 1274, pages 63 258, by the National Academy of Sciences, may be used. This publication is incorporated herein by reference. These may include natural as well as synthetic flavors.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha citral (lemon, lime), neral, i.e., beta citral (lemon, lime), decanal (orange, lemon), ethyl vanillin (vanilla, cream), heliotrope, i.e., piperonal (vanilla, cream), vanillin (vanilla, cream), alpha amyl cinnamaldehyde (spicy fruity flavors), butyraldehyde (butter, cheese), valeraldehyde (butter, cheese), citronellal (modifies, many types), decanal (citrus fruits), aldehyde C 8 (citrus fruits), aldehyde C 9 (citrus fruits), aldehyde C 12 (citrus fruits), 2 ethyl butyraldehyde (berry fruits), hexenal, i.e., trans 2 (berry fruits), tolyl aldehyde (cherry, almond), veratraldehyde (vanilla), 2,6 dimethyl 5 heptenal, .e., melonal (melon), 2,6 dimethyloctanal (green fruit), and 2 dodecenal (citrus, mandarin), cherry, grape, blueberry, blackberry, strawberry shortcake, and mixtures thereof.

In some embodiments, flavoring agents are used at levels that provide a perceptible sensory experience i.e. at or above their threshold levels. In other embodiments, flavoring agents are used at levels below their threshold levels such that they do not provide an independent perceptible sensory experience. At subthreshold levels, the flavoring agents may provide an ancillary benefit such as flavor enhancement or potentiation.

In some embodiments, a flavoring agent may be employed in either liquid form and/or dried form. When employed in the latter form, suitable drying means such as spray drying the liquid may be used. Alternatively, the flavoring agent may be absorbed onto water soluble materials, such as cellulose, starch, sugar, maltodextrin, gum arabic and so forth or may be encapsulated. In still other embodiments, the flavoring agent may be adsorbed onto silicas, zeolites, and the like.

In some embodiments, the flavoring agents may be used in many distinct physical forms. Without being limited thereto, such physical forms include free forms, such as spray dried, powdered, beaded forms, encapsulated forms, and mixtures thereof.

Illustrations of the encapsulation of flavors as well as other additional components can be found in the examples provided herein. Typically, encapsulation of a component will result in a delay in the release of the predominant amount of the component during consumption of a gum structure that includes the encapsulated component (e.g., as part of a delivery system added as an ingredient to the gum structure). In some embodiments, the release profile of the ingredient (e.g., the flavor, sweetener, etc.) can be managed by managing various characteristics of the ingredient, delivery system containing the ingredient, and/or the gum structure containing the delivery system and/or how the delivery system is made. For example, characteristics might include one or more of the following: tensile strength of the delivery system, water solubility of the ingredient, water solubility of the encapsulating material, water solubility of the delivery system, ratio of ingredient to encapsulating material in the delivery system, average or maximum particle size of ingredient, average or maximum particle size of ground delivery system, the amount of the ingredient or the delivery system in the gum structure, ratio of different polymers used to encapsulate one or more ingredients, hydrophobicity of one or more polymers used to encapsulate one or more ingredients, hydrophobicity of the delivery system, the type or amount of coating on the delivery system, the type or amount of coating on an ingredient prior to the ingredient being encapsulated, etc.

Sensate Ingredients

Sensate compounds can include cooling agents, warming agents, tingling agents, effervescent agents, and combinations thereof. A variety of well known cooling agents may be employed. For example, among the useful cooling agents are included xylitol, erythritol, dextrose, sorbitol, menthane, menthone, ketals, menthone ketals, menthone glycerol ketals, substituted p menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p menthane, 2 mercapto cyclo decanone, hydroxycarboxylic acids with 2 6 carbon atoms, cyclohexanamides, menthyl acetate, menthyl salicylate, N,2,3 trimethyl 2 isopropyl butanamide (WS 23), N ethyl p menthane 3 carboxamide (WS 3), isopulegol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, Japanese mint oil, peppermint oil, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthanecarboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehtha-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; and Menthol methyl ether, and menthyl pyrrolidone carboxylate among others. These and other suitable cooling agents are further described in the following U.S. patents, all of which are incorporated in their entirety by reference hereto: U.S. Pat. Nos. 4,230,688; 4,032,661; 4,459,425; 4,136,163; 5,266,592; 6,627,233.

In some embodiments, warming components may be selected from a wide variety of compounds known to provide the sensory signal of warming to the user. These compounds offer the perceived sensation of warmth, particularly in the oral cavity, and often enhance the perception of flavors, sweeteners and other organoleptic components. In some embodiments, useful warming compounds can include vanillyl alcohol n butylether (TK 1000) supplied by Takasago Perfumary Company Limited, Tokyo, Japan, vanillyl alcohol n propylether, vanillyl alcohol isopropylether, vanillyl alcohol isobutylether, vanillyl alcohol n aminoether, vanillyl alcohol isoamyleather, vanillyl alcohol n hexyleather, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropyl alcohol, iso amylalcohol, benzyl alcohol, glycerine, and combinations thereof.

In some embodiments, a tingling sensation can be provided. One such tingling sensation is provided by adding jambu, oleoresin, or spilanthol to some examples. In some embodiments, alkylamides extracted from materials such as jambu or sanshool can be included. Additionally, in some embodiments, a sensation is created due to effervescence. Such effervescence is created by combining an alkaline material with an acidic material. In some embodiments, an alkaline material can include alkali metal carbonates, alkali metal bicarbonates, alkaline earth metal carbonates, alkaline earth metal bicarbonates and mixtures thereof. In some embodiments, an acidic material can include acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof. Examples of "tingling" type sensates can be found in U.S. Pat. No. 6,780,443, the entire contents of which are incorporated herein by reference for all purposes.

Sensate components may also be referred to as "trigeminal stimulants" such as those disclosed in U.S. Patent Application No. 205/0202118, which is incorporated herein by reference. Trigeminal stimulants are defined as an orally consumed product or agent that stimulates the trigeminal nerve. Examples of cooling agents which are trigeminal stimulants include menthol, WS-3, N-substituted p-menthane carboxamide, acyclic carboxamides including WS-23, methyl succinate, menthone glycerol ketals, bulk sweeteners such as xylitol, erythritol, dextrose, and sorbitol, and combinations thereof. Trigeminal stimulants can also include flavors, tingling agents, Jambu extract, vanillyl alkyl ethers, such as vanillyl n-butyl ether, spilanthol, Echinacea extract, Northern Prickly Ash extract, capsaicin, capsicum oleoresin, red pepper oleoresin, black pepper oleoresin, piperine, ginger oleoresin, gingerol, shoagol, cinnamon oleoresin, cassia oleoresin, cinnamic aldehyde, eugenol, cyclic acetal of vanillin and menthol glycerin ether, unsaturated amides, and combinations thereof.

In some embodiments, sensate components are used at levels that provide a perceptible sensory experience i.e. at or above their threshold levels. In other embodiments, sensate components are used at levels below their threshold levels such that they do not provide an independent perceptible sensory experience. At subthreshold levels, the sensates may provide an ancillary benefit such as flavor or sweetness enhancement or potentiation.

Potentiator Ingredients

Potentiators can include of materials that may intensify, supplement, modify or enhance the taste and/or aroma perception of an original material without introducing a characteristic taste and/or aroma perception of their own. In some embodiments, potentiators designed to intensify, supplement, modify, or enhance the perception of flavor, sweetness, tartness, umami, kokumi, saltiness and combinations thereof can be included.

In some embodiments, examples of suitable potentiators, also known as taste potentiators include, but are not limited to, neohesperidin dihydrochalcone, chlorogenic acid, alapyridaine, cynarin, miraculin, glupyridaine, pyridinium-betain compounds, glutamates, such as monosodium glutamate and monopotassium glutamate, neotame, thaumatin, tagatose, trehalose, salts, such as sodium chloride, monoammonium glycyrrhizinate, vanilla extract (in ethyl alcohol), sugar acids, potassium chloride, sodium acid sulfate, hydrolyzed vegetable proteins, hydrolyzed animal proteins, yeast extracts, adenosine monophosphate (AMP), glutathione, nucleotides, such as inosine monophosphate, disodium inosinate, xanthosine monophosphate, guanylate monophosphate, alapyridaine (N-(1-carboxyethyl)-6-(hydroxymethyl)pyridinium-3-ol inner salt, sugar beet extract (alcoholic extract), sugarcane leaf essence (alcoholic extract), curculin, strogin, mabinlin, gymnemic acid, hydroxybenzoic acids, 3-hydrobenzoic acid, 2,4-dihydrobenzoic acid, citrus aurantium, vanilla oleoresin, sugarcane leaf essence, maltol, ethyl maltol, vanillin, licorice glycyrrhizinates, compounds that respond to G-protein coupled receptors (T2Rs and T1Rs) and taste potentiator compositions that impart kokumi, as disclosed in U.S. Pat. No. 5,679,397 to Kuroda et al., which is incorporated in its entirety herein by reference. "Kokumi" refers to materials that impart "mouthfulness" and "good body".

Sweetener potentiators, which are a type of taste potentiator, enhance the taste of sweetness. In some embodiments, exemplary sweetener potentiators include, but are not limited to, monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, sugar beet extract, neotame, thaumatin, neohesperidin dihydrochalcone, hydroxybenzoic acids, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs) and combinations thereof.

Additional examples of potentiators for the enhancement of salt taste include acidic peptides, such as those disclosed in U.S. Pat. No. 6,974,597, herein incorporated by reference. Acidic peptides include peptides having a larger number of acidic amino acids, such as aspartic acid and glutamic acid, than basic amino acids, such as lysine, arginine and histidine. The acidic peptides are obtained by peptide synthesis or by subjecting proteins to hydrolysis using endopeptidase, and if necessary, to deamidation. Suitable proteins for use in the production of the acidic peptides or the peptides obtained by subjecting a protein to hydrolysis and deamidation include plant proteins, (e.g. wheat gluten, corn protein (e.g., zein and gluten meal), soybean protein isolate), animal proteins (e.g., milk proteins such as milk casein and milk whey protein, muscle proteins such as meat protein and fish meat protein, egg white protein and collagen), and microbial proteins (e.g., microbial cell protein and polypeptides produced by microorganisms).

The sensation of warming or cooling effects may also be prolonged with the use of a hydrophobic sweetener as described in U.S. Patent Application Publication 2003/0072842 A1 which is incorporated in its entirety herein by reference.

Food Acid Ingredients

Acids can include, but are not limited to acetic acid, adipic acid, ascorbic acid, butyric acid, citric acid, formic acid, fumaric acid, glyconic acid, lactic acid, phosphoric acid, malic acid, oxalic acid, succinic acid, tartaric acid, aspartic acid, benzoic acid, caffeotannic acid, iso-citric acid, citramalic acid, galacturonic acid, glucuronic acid, glyceric acid, glycolic acid, ketoglutaric acid, a-ketoglutaric acid, lactoisocitric acid, oxalacetic acid, pyruvic acid, quinic acid, shikimic acid, succinic acid, tannic acid, hydroxyacetic acid, suberic acid, sebacic acid, azelaic acid, pimelic acid, capric acid and combinations thereof.

Emulsifiers

The gum structure may also include emulsifiers which aid in dispersing the immiscible components into a single stable system. The emulsifiers useful in this invention include glyceryl monostearate, lecithin, fatty acid monoglycerides, diglycerides, propylene glycol monostearate, methyl cellulose, alginates, carrageenan, xanthan gum, gelatin, carob, tragacanth, locust bean gum, pectin, alginates, galactomannans such as guar gum, carob bean gum, glucomannan, gelatin, starch, starch derivatives, dextrins and cellulose derivatives such as carboxy methyl cellulose, acidulants such as malic acid, adipic acid, citric acid, tartaric acid, fumaric acid, and the like, used alone and mixtures thereof. The emulsifier may be employed in amounts from about 2% to about 15%, and more specifically, from about 7% to about 11%, by weight of the gum structure.

Colors

Coloring agents may be used in amounts effective to produce the desired color. The coloring agents may include pigments which may be incorporated in amounts up to about 6%, by weight of the gum. For example, titanium dioxide may be incorporated in amounts up to about 2%, and preferably less than about 1%, by weight of the gum structure. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No. 2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino) diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

As classified by the United States Food, Drug, and Cosmetic Act (21 C.F.R. 73), colors can include exempt from certification colors (sometimes referred to as natural even though they can be synthetically manufactured) and certified colors (sometimes referred to as artificial), or combinations thereof. In some embodiments, exempt from certification or natural colors can include, but are not limited to annatto extract, (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E1610, caramel (E150(a-d)), β-apo-8'-carotenal (E160e), β-carotene (E160a), alpha carotene, gamma carotene, ethyl ester of beta-apo-8 carotenal (E1600, flavoxanthin (E161a), lutein (E161b), cochineal extract (E120); carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), and combinations thereof.

In some embodiments, certified colors can include, but are not limited to, FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), and combinations thereof. In some embodiments, certified colors can include FD&C aluminum lakes. These include of the aluminum salts of FD&C dyes extended on an insoluble substrate of alumina hydrate. Additionally, in some embodiments, certified colors can be included as calcium salts.

Functional Ingredients

Additional additives including functional ingredients include physiological cooling agents, throat-soothing agents, spices, warming agents, tooth-whitening agents or other dental care ingredients, breath-freshening agents, vitamins, nutraceuticals, phytochemicals, polyphenols, antioxidants, active ingredients, minerals, caffeine, drugs and other actives may also be included in the gum composition. Such components may be used in amounts sufficient to achieve their intended effects and will be more fully discussed below.

Breath Freshening Ingredients

Breath fresheners can include essential oils as well as various aldehydes, alcohols, and similar materials. In some embodiments, essential oils can include oils of spearmint, peppermint, wintergreen, sassafras, chlorophyll, citral, geraniol, cardamom, clove, sage, carvacrol, eucalyptus, cardamom, magnolia bark extract, marjoram, cinnamon, lemon, lime, grapefruit, and orange. In some embodiments, aldehydes such as cinnamic aldehyde and salicylaldehyde can be used. Additionally, chemicals such as menthol, carvone, iso-garrigol, and anethole can function as breath fresheners. Of these, the most commonly employed are oils of peppermint, spearmint and chlorophyll.

In addition to essential oils and chemicals derived from them, in some embodiments breath fresheners can include but are not limited to zinc citrate, zinc acetate, zinc fluoride, zinc ammonium sulfate, zinc bromide, zinc iodide, zinc chloride, zinc nitrate, zinc flurosilicate, zinc gluconate, zinc tartarate, zinc succinate, zinc formate, zinc chromate, zinc phenol sulfonate, zinc dithionate, zinc sulfate, silver nitrate, zinc salicylate, zinc glycerophosphate, copper nitrate, chlorophyll, copper chlorophyll, chlorophyllin, hydrogenated cottonseed oil, chlorine dioxide, beta cyclodextrin, zeolite, silica-based materials, carbon-based materials, enzymes such as laccase, and combinations thereof.

In some embodiments, the release profiles of probiotics can be managed for a gum structure including, but not limited to lactic acid producing microorganisms such as *Bacillus coagulans, Bacillus subtilis, Bacillus laterosporus, Bacillus laevolacticus, Sporolactobacillus inulinus, Lactobacillus acidophilus, Lactobacillus curvatus, Lactobacillus plantarum, Lactobacillus jenseni, Lactobacillus casei, Lactobacillus fermentum, Lactococcus lactis, Pedioccocus acidilacti, Pedioccocus pentosaceus, Pedioccocus urinae, Leuconostoc mesenteroides, Bacillus coagulans, Bacillus subtilis, Bacillus laterosporus, Bacillus laevolacticus, Sporolactobacillus inulinus* and mixtures thereof. Breath fresheners are also known by the following trade names: Retsyn,™ Actizol,™ and Nutrazin.™ Examples of malodor-controlling compositions are also included in U.S. Pat. No. 5,300,305 to Stapler et al. and in U.S. Patent Application Publication Nos. 2003/0215417 and 2004/0081713 which are incorporated in their entirety herein by reference for all purposes.

Dental Care Ingredients

Dental care ingredients (also known as oral care ingredients) may include but are not limited to tooth whiteners, stain removers, oral cleaning, bleaching agents, desensitizing agents, dental remineralization agents, antibacterial agents, anticaries agents, plaque acid buffering agents, surfactants and anticalculus agents. Non-limiting examples of such ingredients can include, hydrolytic agents including proteolytic enzymes, abrasives such as hydrated silica, calcium carbonate, sodium bicarbonate and alumina, other active stain-removing components such as surface-active agents, including, but not limited to anionic surfactants such as sodium stearate, sodium palminate, sulfated butyl oleate, sodium oleate, salts of fumaric acid, glycerol, hydroxylated lecithin, sodium lauryl sulfate and chelators such as polyphosphates, which are typically employed as tartar control ingredients. In some embodiments, dental care ingredients can also include tetrasodium pyrophosphate and sodium tri-polyphosphate, sodium bicarbonate, sodium acid pyrophosphate, sodium tripolyphosphate, xylitol, sodium hexametaphosphate.

In some embodiments, peroxides such as carbamide peroxide, calcium peroxide, magnesium peroxide, sodium peroxide, hydrogen peroxide, and peroxydiphospate are included. In some embodiments, potassium nitrate and potassium citrate are included. Other examples can include casein glycomacropeptide, calcium casein peptone-calcium phosphate, casein phosphopeptides, casein phosphopeptide-amorphous calcium phosphate (CPP-ACP), and amorphous calcium phosphate. Still other examples can include papaine, krillase, pepsin, trypsin, lysozyme, dextranase, mutanase, glycoamylase, amylase, glucose oxidase, and combinations thereof.

Further examples can include surfactants such as sodium stearate, sodium ricinoleate, and sodium lauryl sulfate surfactants for use in some embodiments to achieve increased prophylactic action and to render the dental care ingredients more cosmetically acceptable. Surfactants can preferably be detersive materials which impart to the composition detersive and foaming properties. Suitable examples of surfactants are water-soluble salts of higher fatty acid monoglyceride monosulfates, such as the sodium salt of the monosulfated monoglyceride of hydgrogenated coconut oil fatty acids, higher alkyl sulfates such as sodium lauryl sulfate, alkyl aryl sulfonates such as sodium dodecyl benzene sulfonate, higher alkyl sulfoacetates, sodium lauryl sulfoacetate, higher fatty acid esters of 1,2-dihydroxy propane sulfonate, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the sodium, potassium, and ethanolamine salts of N-lauroyl, N-myristoyl, or N-palmitoyl sarcosine.

In addition to surfactants, dental care ingredients can include antibacterial agents such as, but not limited to, triclosan, chlorhexidine, zinc citrate, silver nitrate, copper, limonene, and cetyl pyridinium chloride. In some embodiments, additional anticaries agents can include fluoride ions or fluorine-providing components such as inorganic fluoride salts. In some embodiments, soluble alkali metal salts, for example, sodium fluoride, potassium fluoride, sodium fluorosilicate, ammonium fluorosilicate, sodium monofluorophosphate, as well as tin fluorides, such as stannous fluoride and stannous chloride can be included. In some embodiments, a fluorine-containing compound having a beneficial effect on the care and hygiene of the oral cavity, e.g., diminution of enamel solubility in acid and protection of the teeth against decay may also be included as an ingredient. Examples thereof include sodium fluoride, stannous fluoride, potassium fluoride, potassium stannous fluoride (SnF.sub.2-KF), sodium hexafluorostannate, stannous chlorofluoride, sodium fluorozirconate, and sodium monofluorophosphate. In some embodiments, urea is included.

Further examples are included in the following U.S. patents and U.S. published patent applications, the contents of all of which are incorporated in their entirety herein by reference for all purposes: U.S. Pat. No. 5,227,154 to Reynolds, U.S. Pat. No. 5,378,131 to Greenberg, U.S. Pat. No. 6,846,500 to Luo et al., U.S. Pat. No. 6,733,818 to Luo et al., U.S. Pat. No. 6,696,044 to Luo et al., U.S. Pat. No. 6,685,916 to Holme et al., U.S. Pat. No. 6,485,739 to Luo et al., U.S. Pat. No. 6,479,071 to Holme et al., U.S. Pat. No. 6,471,945 to Luo et al., U.S. Patent Publication Nos. 20050025721 to Holme et al., 2005008732 to Gebreselassie et al., and 20040136928 to Holme et al.

Active Ingredients

Actives generally refer to those ingredients that are included in a delivery system and/or gum structure for the desired end benefit they provide to the user. In some embodiments, actives can include medicaments, nutrients, nutraceuticals, herbals, nutritional supplements, pharmaceuticals, drugs, and the like and combinations thereof.

Examples of useful drugs include ace-inhibitors, antianginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, which is currently marketed as Viagra™, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids such as bromocryptine or nicotine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof.

Examples of active ingredients contemplated for use in some embodiments can include antacids, H2-antagonists, and analgesics. For example, antacid dosages can be prepared using the ingredients calcium carbonate alone or in combination with magnesium hydroxide, and/or aluminum hydroxide. Moreover, antacids can be used in combination with H2-antagonists.

Analgesics include opiates and opiate derivatives, such as Oxycontin™ ibuprofen, aspirin, acetaminophen, and combinations thereof that may optionally include caffeine.

Other drug active ingredients for use in embodiments can include anti-diarrheals such as Immodium™ AD, anti-histamines, anti-tussives, decongestants, vitamins, and breath fresheners. Also contemplated for use herein are anxiolytics such as Xanax™; anti-psychotics such as Clozaril™ and Haldol™; non-steroidal anti-inflammatories (NSAID's) such as ibuprofen, naproxen sodium, Voltaren™ and Lodine™, anti-histamines such as Claritin™, Hismanal™, Relafen™, and Tavist™; anti-emetics such as Kytril™ and Cesamet™; bronchodilators such as Bentolin™, Proventil™; anti-depressants such as Prozac™, Zoloft™, and Paxil™; anti-migraines such as Imigra™, ACE-inhibitors such as Vasotec™, Capoten™ and Zestril™; anti-Alzheimer's agents, such as Nicergoline™; and CaH-antagonists such as Procardia™, Adalat™, and Calan™.

The popular H2-antagonists which are contemplated for use in the present invention include cimetidine, ranitidine hydrochloride, famotidine, nizatidien, ebrotidine, mifentidine, roxatidine, pisatidine and aceroxatidine.

Active antacid ingredients can include, but are not limited to, the following: aluminum hydroxide, dihydroxyaluminum aminoacetate, aminoacetic acid, aluminum phosphate, dihydroxyaluminum sodium carbonate, bicarbonate, bismuth aluminate, bismuth carbonate, bismuth subcarbonate, bismuth subgallate, bismuth subnitrate, bismuth subsilysilate, calcium carbonate, calcium phosphate, citrate ion (acid or salt), amino acetic acid, hydrate magnesium aluminate sulfate, magaldrate, magnesium aluminosilicate, magnesium carbonate, magnesium glycinate, magnesium hydroxide, magnesium oxide, magnesium trisilicate, milk solids, aluminum mono-ordibasic calcium phosphate, tricalcium phosphate, potassium bicarbonate, sodium tartrate, sodium bicarbonate, magnesium aluminosilicates, tartaric acids and salts.

A variety of nutritional supplements may also be used as active ingredients including virtually any vitamin or mineral. For example, vitamin A, vitamin C, vitamin D, vitamin E, vitamin K, vitamin B6, vitamin B12, thiamine, riboflavin, biotin, folic acid, niacin, pantothenic acid, sodium, potassium, calcium, magnesium, phosphorus, sulfur, chlorine, iron, copper, iodine, zinc, selenium, manganese, choline, chromium, molybdenum, fluorine, cobalt and combinations thereof, may be used.

Examples of nutritional supplements that can be used as active ingredients are set forth in U.S. Patent Application Publication Nos. 2003/0157213 A1, 2003/0206993 and 2003/0099741 A1 which are incorporated in their entirety herein by reference for all purposes.

Various herbals may also be used as active ingredients such as those with various medicinal or dietary supplement properties. Herbals are generally aromatic plants or plant parts and or extracts thereof that can be used medicinally or for flavoring. Suitable herbals can be used singly or in various mixtures. Commonly used herbs include Echinacea, Goldenseal, Calendula, Rosemary, Thyme, Kava Kava, Aloe, Blood Root, Grapefruit Seed Extract, Black Cohosh, Ginseng, Guarana, Cranberry, Gingko Biloba, St. John's Wort, Evening Primrose Oil, Yohimbe Bark, Green Tea, Ma Huang, Maca, Bilberry, Lutein, and combinations thereof.

Effervescing System Ingredients

An effervescent system may include one or more edible acids and one or more edible alkaline materials. The edible acid(s) and the edible alkaline material(s) may react together to generate effervescence.

In some embodiments, the alkaline material(s) may be selected from, but is not limited to, alkali metal carbonates, alkali metal bicarbonates, alkaline earth metal carbonates, alkaline earth metal bicarbonates, and combinations thereof. The edible acid(s) may be selected from, but is not limited to, citric acid, phosphoric acid, tartaric acid, malic acid, ascorbic acid, and combinations thereof. In some embodiments, an effervescing system may include one or more other ingredients such as, for example, carbon dioxide, oral care ingredients, flavorants, etc.

For examples of use of an effervescing system in a gum, refer to U.S. Provisional Patent No. 60/618,222 filed Oct. 13, 2004, and entitled "Effervescent Pressed Confectionery Tablet Compositions," the contents of which are incorporated herein by reference for all purposes. Other examples can be found in U.S. Pat. No. 6,235,318, the contents of which are incorporated herein by reference for all purposes.

Appetite Suppressor Ingredients

Appetite suppressors can be ingredients such as fiber and protein that function to depress the desire to consume food. Appetite suppressors can also include benzphetamine, diethylpropion, mazindol, phendimetrazine, phentermine, hoodia (P57), Olibra™, ephedra, caffeine and combinations thereof. Appetite suppressors are also known by the following trade names: Adipex™, Adipost™, Bontril™ PDM, Bontril™ Slow Release, Didrex™, Fastin™, Ionamin™, Mazanor™, Melfiat™, Obenix™, Phendiet™ Phendiet-105™, Phentercot™, Phentride™, Plegine™, Prelu-2™, Pro-Fast™, PT 105™, Sanorex™, Tenuate™, Sanorex™, Tenuate™, Tenuate Dospan™, Tepanil Ten-Tab™, Teramine™, and Zantryl™. These and other suitable appetite suppressors are further described in the following U.S. patents, all of which are incorporated in their entirety by reference hereto: U.S. Pat. No. 6,838,431 to Portman, U.S. Pat. No. 6,716,815 to Portman, U.S. Pat. No. 6,558,690 to Portman, U.S. Pat. No. 6,468,962 to Portman, U.S. Pat. No. 6,436,899 to Portman.

Micronutrient Ingredients

Micronutrients can include materials that have an impact on the nutritional well being of an organism even though the quantity required by the organism to have the desired effect is small relative to macronutrients such as protein, carbohydrate, and fat. Micronutrients can include, but are not limited to vitamins, minerals, enzymes, phytochemicals, antioxidants, and combinations thereof.

In some embodiments, vitamins can include fat soluble vitamins such as vitamin A, vitamin D, vitamin E, and vitamin K and combinations thereof. In some embodiments, vitamins can include water soluble vitamins such as vitamin C (ascorbic acid), the B vitamins (thiamine or B1, riboflavoin or B2, niacin or B3, pyridoxine or B6, folic acid or B9, cyanocobalimin or B12, pantothenic acid, biotin), and combinations thereof.

In some embodiments minerals can include but are not limited to sodium, magnesium, chromium, iodine, iron, manganese, calcium, copper, fluoride, potassium, phosphorous, molybdenum, selenium, zinc, and combinations thereof.

In some embodiments micronutrients can include but are not limited to L-carnitine, choline, coenzyme Q10, alpha-lipoic acid, omega-3-fatty acids, pepsin, phytase, trypsin, lipases, proteases, cellulases, and combinations thereof.

In some embodiments phytochemicals can include but are not limited to cartotenoids, chlorophyll, chlorophyllin, fiber, flavanoids, anthocyanins, cyaniding, delphinidin, malvidin, pelargonidin, peonidin, petunidin, flavanols, catechin, epicatechin, epigallocatechin, epigallocatechingallate (EGCG), theaflavins, thearubigins, proanthocyanins, flavonols, quercetin, kaempferol, myricetin, isorhamnetin, flavononeshesperetin, naringenin, eriodictyol, tangeretin, flavones, apigenin, luteolin, lignans, phytoestrogens, resveratrol, isoflavones, daidzein, genistein, glycitein, soy isoflavones, and combinations thereof.

Mouth Moistening Ingredients

Mouth moisteners can include, but are not limited to, saliva stimulators such as acids and salts and combinations thereof. In some embodiments, acids can include acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof. In some embodiments, salts can include sodium chloride, calcium chloride, potassium chloride, magnesium chloride, sea salt, sodium citrate, and combinations thereof.

Mouth moisteners can also include hydrocolloid materials that hydrate and may adhere to oral surface to provide a sensation of mouth moistening. Hydrocolloid materials can include naturally occurring materials such as plant exudates, seed confectionerys, and seaweed extracts or they can be chemically modified materials such as cellulose, starch, or natural confectionery derivatives. In some embodiments, hydrocolloid materials can include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, bacterial gums, and combinations thereof. Additionally, in some embodiments, modified natural gums such as propylene glycol alginate, carboxymethyl locust bean gum, low methoxyl pectin, and their combinations can be included. In some embodiments, modified celluloses can be included such as microcrystalline cellulose, carboxymethlcellulose (CMC), methylcellulose (MC), hydroxypropylmethylcellulose (HPCM), and hydroxypropylcellulose (MPC), and combinations thereof.

Similarly, humectants which can provide a perception of mouth hydration can be included. Such humectants can include, but are not limited to glycerol, sorbitol, polyethylene glycol, erythritol, and xylitol. Additionally, in some embodiments, fats can provide a perception of mouth moistening. Such fats can include medium chain triglycerides, vegetable oils, fish oils, mineral oils, and combinations thereof.

Throat Care Ingredients

Throat soothing ingredients can include analgesics, anesthetics, demulcents, antiseptic, and combinations thereof. In some embodiments, analgesics/anesthetics can include menthol, phenol, hexylresorcinol, benzocaine, dyclonine hydrochloride, benzyl alcohol, salicyl alcohol, and combinations thereof. In some embodiments, demulcents can include but are not limited to slippery elm bark, pectin, gelatin, and combinations thereof. In some embodiments, antiseptic ingredients can include cetylpyridinium chloride, domiphen bromide, dequalinium chloride, and combinations thereof.

In some embodiments, antitussive ingredients such as chlophedianol hydrochloride, codeine, codeine phosphate, codeine sulfate, dextromethorphan, dextromethorphan hydrobromide, diphenhydramine citrate, and diphenhydramine hydrochloride, and combinations thereof can be included.

In some embodiments, throat soothing agents such as honey, propolis, aloe vera, glycerine, menthol and combinations thereof can be included. In still other embodiments, cough suppressants can be included. Such cough suppressants can fall into two groups: those that alter the consistency or production of phlegm such as mucolytics and expectorants; and those that suppress the coughing reflex such as codeine (narcotic cough suppressants), antihistamines, dextromethorphan and isoproterenol (non-narcotic cough suppressants). In some embodiments, ingredients from either or both groups can be included.

In still other embodiments, antitussives can include, but are not limited to, the group consisting of codeine, dextromethorphan, dextrorphan, diphenhydramine, hydrocodone, noscapine, oxycodone, pentoxyverine and combinations thereof. In some embodiments, antihistamines can include, but are not limited to, acrivastine, azatadine, brompheniramine, chlorpheniramine, clemastine, cyproheptadine, dexbrompheniramine, dimenhydrinate, diphenhydramine, doxylamine, hydroxyzine, meclizine, phenindamine, phenyltoloxamine, promethazine, pyrilamine, tripelennamine, triprolidine and combinations thereof. In some embodiments, non-sedating antihistamines can include, but are not limited to, astemizole, cetirizine, ebastine, fexofenadine, loratidine, terfenadine, and combinations thereof.

In some embodiments, expectorants can include, but are not limited to, ammonium chloride, guaifenesin, ipecac fluid extract, potassium iodide and combinations thereof. In some embodiments, mucolytics can include, but are not limited to, acetylcycsteine, ambroxol, bromhexine and combinations thereof. In some embodiments, analgesic, antipyretic and anti-inflammatory agents can include, but are not limited to, acetaminophen, aspirin, diclofenac, diflunisal, etodolac, fenoprofen, flurbiprofen, ibuprofen, ketoprofen, ketorolac, nabumetone, naproxen, piroxicam, caffeine and mixtures thereof. In some embodiments, local anesthetics can include, but are not limited to, lidocaine, benzocaine, phenol, dyclonine, benzonotate and mixtures thereof.

In some embodiments nasal decongestants and ingredients that provide the perception of nasal clearing can be included. In some embodiments, nasal decongestants can include but are not limited to phenylpropanolamine, pseudoephedrine, ephedrine, phenylephrine, oxymetazoline, and combinations thereof. In some embodiments ingredients that provide a perception of nasal clearing can include but are not limited to menthol, camphor, borneol, ephedrine, eucalyptus oil, peppermint oil, methyl salicylate, bornyl acetate, lavender oil, wasabi extracts, horseradish extracts, and combinations thereof. In some embodiments, a perception of nasal clearing can be provided by odoriferous essential oils, extracts from woods, confectioneries, flowers and other botanicals, resins, animal secretions, and synthetic aromatic materials.

In some embodiments, optional or functional ingredients can include breath fresheners, dental care components, actives, herbals, effervescing systems, appetite suppressors, vitamins, micronutrients, mouth moistening components, throat care components, energy boosting agents, concentration boosting agents, and combinations thereof.

In some embodiments, the modified release component includes at least one ingredient selected from the group comprising flavors, sweeteners, sensates, breath fresheners, dental care components, actives, herbals, effervescing systems, appetite suppressors, potentiators, food acids, micronutrients, mouth moistening components, throat care components, and combinations thereof. These ingredients can be in encapsulated form, in free form, or both.

Examples of Finished Chewing Gum Compositions

TABLE 1

Chewing Gum Composition

| | % by weight | | | | | | | |
|---|---|---|---|---|---|---|---|---|
| Component | Formula 1 | Formula 2 | Formula 3 | Formula 4 | Formula 5 | Formula 6 | Formula 7 | Formula 8 |
| Gum base* | 28-42 | 28-42 | 28-42 | 28-42 | 28-42 | 28-42 | 28-42 | 28-42 |
| Lecithin | 0.25 | 0.25 | 0.05 | 0.05 | 0.05 | 0.05 | 0.05 | 0.05 |
| Maltitol | 52-55 | 45-50 | 0 | 50-54 | 52-57 | 45-55 | 47-52 | 0 |
| Sorbitol | 0 | 0-10 | 0 | 0-5 | 0-5 | 5-10 | 0-5 | 0 |
| Lycasin ™ | 0 | 0 | 0 | 0.25 | 0.25 | 0.25 | 0.25 | 0 |
| Erythritol | 0 | 0 | 15-30 | 0 | 0 | 0 | 0 | 0 |
| Sugar | 0 | 0 | 20-40 | 0 | 0 | 0 | 0 | 30-55 |
| Corn Syrup | 0 | 0 | 2-15 | 0 | 0 | 0 | 0 | 2-15 |
| Flavors | 2.50 | 2.50 | 2.26 | 2.26 | 2.26 | 2.50 | 2.50 | 2.50 |
| Cooling agent | 0.08 | 0.08 | 0 | 0 | 0 | 0.08 | 0.08 | 0.08 |
| Acidulants | 1.2 | 1.2 | 0 | 0 | 0 | 1.2 | 1.2 | 1.2 |
| Intense sweetener | 3.40 | 3.40 | 1.70 | 3.40 | 3.40 | 3.40 | 3.40 | 0 |

*gum base may include 3% to 11% by weight of a filler such as, for example, talc, dicalcium phosphate, and calcium carbonate (the amount of filler in the gum base is based on the weight percent of the gum region composition, for example, in the above compositions, if a gum region composition includes 5% filler, the amount of gum base will be 5% less than the range recited in the table, i.e., from 23-37%.)

The compositions for the chewing gums are prepared by first combining talc, where present, with the gum base under heat at about 85° C. This combination is then mixed with the bulk sweeteners, lecithin, and sweetener syrups for six minutes. The flavor blends which include a pre-mix of the flavors and cooling agents are added and mixed for 1 minute. Finally, the acids and intense sweeteners are added and mixed for 5 minutes.

Candy

The candy type confectionery composition may include a chewy candy, a crunchy candy, a low boiled candy, a hard boiled candy, a fondant, a caramel, a jelly, a gummy, a nougat, and combination thereof. In several embodiments, the candy layer is prepared from the confectionery compositions containing fondant as disclosed herein.

As used herein, the term "candy" includes confectionery compositions that includes a sugar or sugar free confectionery compositions including a sugar polyol and other optional ingredients, which are free of an elastomer component. The candy can sometimes be referred to as a "candy portion", "candy component", or "candy composition". Sugar polyols are known to not metabolize by bacteria in the mouth, so they do not contribute to tooth decay. Thus, sugar free candy compositions including sugar polyols can be desirable for multilayer confectionery products including a gum component. Details of sugar free compositions will be provided below. However, the multilayer confectionery products according to various embodiments of the present invention can be formed to contain many traditional confectioneries including a sugar.

In some embodiments, the candy composition can be prepared to be chewy in texture while at the same time containing a degree of crystallization (also sometimes referred to as an amount of graining) so that it has a short texture. The graining allows for a soft initial bite to match the soft bite experienced with the chewing gum layer. Graining can be effected by allowing a polyol in the candy composition to crystallize. In an embodiment, the tendency of the polyol to crystallize can be exploited by seeding the polyol containing portion so that it will crystallize over time to adjust the texture from a harder texture during manufacture to a softer texture at the time of consumption. In another embodiment, the graining is carried out using mechanical agitation during the process of preparing the candy composition, for example, by controlling the mechanical mixing speeds and/or shear during processing, controlling mixing times, or controlling the tempering process.

In one embodiment, the candy composition can include base portion comprising a sugar polyol and a fondant portion comprising a sugar polyol, wherein the base portion and the fondant portion are mixed to form a sugar-free candy composition.

The base portion of the candy composition can be generally prepared from one or more sugar polyols and water. In one embodiment, the base portion is a cooked mixture of one or more sugar polyols and water. The types and amounts of sugar polyols for use in the base portion are described in further detail below. Further, the base portion may optionally contain additional base portion ingredients as described below.

The fondant portion of the candy composition is provided to impart a textural aspect to the candy composition. The fondant can be prepared to contain crystalline particles of sugar polyol that modulate the graining of the candy composition and thus modulate the texture of the candy composition. In one embodiment, the fondant comprises crystalline particles of sugar polyol having an average particle size of less than 50 micrometers, specifically about 1 to about 45 micrometers to provide a smooth mouthfeel when the candy composition is chewed. In another embodiment, the fondant comprises capillary fine crystals having an average length of 30 micrometers, specifically about 1 to about 25 micrometers as described further herein. The fondant portion can be generally prepared from one or more sugar polyols and water. The types and amounts of sugar polyols for use in the fondant are described in further detail below.

In some embodiments, the fondant is present in the candy composition in an amount of about 2.0 to about 15.0% w/w, specifically about 4.0 to about 12.0% w/w, more specifically about 5.0 to about 10.0% w/w, and yet more specifically about 6.0 to about 7.5% w/w of the candy portion when prepared using a pulling process. Higher levels of fondant provide increased chewiness and softness to the candy. In multilayer confectionery products containing a combination of layers of chewing gum and a layer of candy, these levels of fondant result in layers of chewy candy composition that minimizes undesired shape deformation caused by cold flow, specifically an "oozing" of the candy portion from the layered format. Lower levels of fondant can be used and the chewiness of the candy composition can still be achieved by using increased mechanical pulling or longer storage times at ambient temperature to promote graining.

In one embodiment, a moisture content of the fondant prior to its incorporation with the base portion can be about 6.5 to about 11.0% w/w of the fondant, specifically about 8.0 to about 9.5% w/w of the fondant, and yet more specifically about 8.5 to about 9.0% w/w.

The base portion or the fondant portion generally contains a sugar polyol, specifically two or more sugar polyols. The sugar polyol(s) used in the base portion can be the same or different from the sugar polyol(s) used in the fondant portion. Suitable sugar polyols include, but are not limited to erythritol, galactitol, hydrogenated isomaltulose (isomalt), a hydrogenated starch hydrolysate, lactitol, maltitol, mannitol, polyglycitol, sorbitol, xylitol and mixtures thereof.

The sugar polyols can be used in crystalline form or amorphous form. Specifically, crystalline sugar polyols include crystalline erythritol, isomalt, lactitol, maltitol, mannitol, sorbitol, xylitol, and a combination thereof. When a crystalline sugar polyol is used in the candy composition or when the sugar polyol is allowed to crystallize in the composition, the resulting texture can become more grained or short. In one embodiment, the candy composition is chewy with a texture grained to a degree that allows for the quick delivery of flavor to the consumer.

Exemplary amorphous polyols include erythritol syrup, a hydrogenated starch hydrolysate syrup, isomalt syrup, lactitol syrup, maltitol syrup, mannitol syrup, sorbitol syrup, xylitol syrup, and a combination thereof.

In one embodiment, the base portion or the fondant portion contains a crystalline polyol such as mannitol. In another embodiment, the base portion or the fondant portion contains an amorphous polyol such as a hydrogenated starch hydrolysate syrup.

In yet another embodiment, the base portion or the fondant portion contains a crystalline polyol and an amorphous polyol. In one embodiment, the crystalline polyol is mannitol and the amorphous polyol is a hydrogenated starch hydrolysate syrup such as Lycasin 80/55.

When the base portion and the fondant portion both contain the same crystalline polyol (e.g. both contain mannitol or both contain isomalt), there is the advantage that the fondant forms seed crystals to promote graining in the base portion. Such graining can provide increased body and less cold flow shape deformation in a chewy candy composition and provide for a softer chewy texture. In the alternative, by having the base portion polyol be different from the fondant polyol (e.g., mannitol base and isomalt fondant, or isomalt base and mannitol fondant), graining can be inhibited thereby providing a different texture or having the base portion texture remain unchanged.

In one embodiment, the base portion comprises isomalt or mannitol as a first sugar polyol, and hydrogenated starch hydrolysate syrup as a second sugar polyol. In another embodiment, the fondant portion comprises isomalt or mannitol as a first sugar polyol, and hydrogenated starch hydrolysate syrup as a second sugar polyol.

Isomalt is disaccharide alcohol. Isomalt can be prepared by hydrogenating isomaltulose. Products of the hydrogenation can include 6-O-α-D-glucopyranosyl-D-sorbitol (1,6-GPS); 1-O-α-D-glucopyranosyl-D-sorbitol (1,1-GPS); 1-O-α-D-glucopyranosyl-D-mannitol (1,1-GPM); 6-O-α-D-glucopyranosyl-D-mannitol (1,6-GPM); and mixtures thereof. Some commercially available isomalt materials include an almost equimolar mixture of 1,6-GPS, and 1,1-GPM. Other isomalt materials can include pure 1,6-GPS; 1,1-GPS; 1,6-GP; and 1,1-GPM. Still other isomalt materials can include mixtures of 1,6-GPS; 1,1-GPS; 1,6-GPM; and 1,1-GPM at any ratio. Exemplary commercially available isomalt includes Isomalt ST, Isomalt GS, Isomalt M, Isomalt DC, and Isomalt LM available from BENEO-Palatinit, Südzucker Group.

Suitable hydrogenated starch hydrolysates include those disclosed in U.S. Pat. No. 4,279,931 and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a line of commercially available products manufactured by Roquette Freres of France, and HYSTAR™, a line of commercially available products manufactured by Lonza, Inc., of Fairlawn, N.J., also can be useful. LYCASIN® is a hydrogenated starch hydrolysate including sorbitol and maltitol.

An exemplary hydrogenated starch hydrolysate is LYCASIN® 80/55, having about 75% solids, and containing polyols having a degree of polymerization (DP) of about 4% w/w sorbitol, about 53% w/w maltitol, about 22% w/w DP3-5, and about 21% w/w DP6 and greater. Another exemplary hydrogenated starch hydrolysate is LYCASIN® 80/55 HDS, having about 85% solids, and containing about 4% w/w sorbitol, about 53% w/w maltitol, about 22% w/w DP3-5, and about 21% w/w DP6 and greater.

The total amount of sugar polyol present in the candy composition is about 50 to about 95% w/w of the candy composition, specifically about 70 to about 90% w/w of the candy composition, and more specifically about 75 to about 85% w/w of the candy composition.

In one embodiment, the base portion comprises about 30 to about 50% w/w isomalt and about 50 to about 70% w/w hydrogenated starch hydrolysate syrup of the base portion (dry weight), specifically about 35 to about 45% w/w isomalt and about 55 to about 65% w/w hydrogenated starch hydrolysate syrup of the base portion (dry weight).

In one embodiment, the fondant portion comprises about 65 to about 80% w/w isomalt and about 20 to about 35% w/w hydrogenated starch hydrolysate syrup of the fondant portion (dry weight), specifically about 70 to about 75% w/w isomalt and about 25 to about 30% w/w hydrogenated starch hydrolysate syrup of the fondant portion (dry weight).

In one embodiment, the ratio of isomalt to hydrogenated starch hydrolysate syrup is about 30:70 to about 50:50 based on the candy composition, specifically about 35:65 to about 45:55 based on the candy composition, and more specifically about 40:60 based on the candy composition. In a further embodiment, the candy composition having the aforementioned ratios is a chewy candy.

In another embodiment, the ratio of isomalt to hydrogenated starch hydrolysate syrup is about 75:25 to about 55:45 based on the candy composition, specifically about 70:30 to about 60:40 based on the candy composition, and more specifically about 65:35 based on the candy composition. In a further embodiment, the candy composition having the aforementioned ratios is a less chewy and more crunchy candy.

The isomalt of the confect composition can contain greater than 50% w/w of 1,6-GPS based on the total weight of the isomalt, specifically about 75 to about 80% w/w of 1,6-GPS based on the total weight of the isomalt. In one embodiment, the base portion, the fondant portion, or both portions contain isomalt having greater than 50% w/w of 1,6-GPS based on the total weight of the isomalt, specifically about 75 to about 80% w/w of 1,6-GPS based on the total weight of the isomalt.

In another embodiment, the candy composition comprises isomalt having a ratio of about 1:1 1,6-GPS to 1,1-GPM which can be present in the base portion, fondant portion or both.

In one embodiment, the base portion and fondant portion comprise mannitol as a first sugar polyol, and hydrogenated starch hydrolysate syrup as a second sugar polyol. The greater the amount of mannitol, the more grained the candy composition will be resulting in a less crunchy material that exhibits sufficient body to minimize cold flow shape deformation of the candy composition from a multilayered format. The amount of mannitol to achieve sufficient graining and body in a chewy candy is balanced by the ability to pull the candy sufficiently to aerate the candy mass, when a pulling step is employed. Too much mannitol results in rapid crystallization occurring before the candy mass can be pulled. To avoid this potential problem, the amount of mannitol is limited to prevent rapid crystallization or the pulling process is replaced with high energy mixing, such as using a sigma mixer. When a pulling step is desired to prepare a chewy candy composition, the total amount of mannitol present in the candy composition can be about 6 to about 22% w/w dry weight based on the total weight of candy composition (including the base and fondant portions), specifically about 8 to about 18, and more specifically about 10 to about 15% w/w; and the total amount of hydrogenated starch hydrolysate syrup based on the total weight of candy composition is about 65 to about 85% w/w, specifically about 70 to about 80% w/w, and more specifically about 73 to about 77% w/w. Greater amounts of mannitol can be used when high energy, intensive mixing is employed in the process.

In one embodiment, the fondant is a mannitol fondant comprising capillary fine crystals, mainly of mannitol, having an average length of 30 micrometers as described in Unexamined Japanese Patent Application Bulletin No. 2007-215450, Patent Application No. 2006-37910 to Michihide Obara, filing date Feb. 15, 2006, published Aug. 30, 2007, which is incorporated herein by reference in its entirety. It has been found that a mannitol fondant can be prepared to have smoothness and property stability that are equivalent to those of a sugar fondant, and having a high crystal concentration. The term "property stability" means that such properties as the feeling on the tongue, smoothness, hardness, water retention (there are cases where this is called the syneresis prevention effect) are stable, and these properties are maintained well during ordinary storage, transport and handling.

The mannitol fondant comprising capillary fine crystals generally contains mannitol and a noncrystalline carbohydrate (e.g. amorphous polyol) other than the mannitol, as a crystal precipitation regulating agent. Use of the noncrystalline carbohydrate makes it possible to regulate the crystallization speed of the mannitol, to provide a mannitol fondant having smoothness similar to sugar fondant. Without the use of the noncrystalline carbohydrate, and preparing a mannitol fondant using conventional methods, large crystals of mannitol are obtained resulting in a rough fondant.

The mass ratio of the mannitol:noncrystalline carbohydrate in the mannitol fondant comprising capillary fine crystals is about 80:20 to about 10:90, specifically about 70:30 to about 20:80. When the mass ratio of the mannitol exceeds 80, the crystallization speed is fast, crude and large crystals precipitate, and the fondant is rough and becomes hard. When the mass ratio of the mannitol falls below 10, the crystal concentration is low and it does not provide a good fondant. In addition, when the mass ratio of the mannitol:noncrystalline carbohydrate is in a range of 80:20 to 10:90, the higher the mass ratio of mannitol is the lower the boiling temperature may be. The mannitol can be D-mannitol, L-mannitol, or D, L-mannitol, specifically D-mannitol.

The noncrystalline carbohydrate of the mannitol fondant comprising capillary fine crystals refers to a carbohydrate that does not crystallize at any concentration or temperature zone in an aqueous state, and which does not impair the production of or the stability of the quality after production of the resulting mannitol fondant. Exemplary noncrystalline carbohydrates include, starch syrup (e.g. glucose syrup, corn syrup), reduced starch syrup (e.g., hydrogenated starch hydrolysate), reduced maltose starch syrup (e.g., maltitol syrup), coupling sugar (e.g., oligosaccharide such as Oligo GGF™ a trisaccharide composed of D-galactose, D-glucose and D-fructose), oligomers (e.g., lacto-sucrose, fructo-oligosaccharide, soybean oligosaccharide, etc.), dietary fibers (e.g, glucomannan, indigestible dextrin, polydextrose, cellulose, gum arabic, pullulan, agar agar, sodium alginate, and polysaccharides like starch, dextrin, etc), and a combination thereof.

Certain noncrystalline carbohydrates are suitable for preparation of a mannitol fondant comprising capillary fine crystals having an average length of 30 μm, but which may exhibit insufficient water retention (syneresis prevention effect) for a particular application. These noncrystalline carbohydrates include for example starch syrup and reduced starch syrup. Use of a water retention improvement agent in combination with starch syrup or reduced starch syrup can be used to provide the desired water retention. Exemplary water retention improvement agents include certain noncrystalline carbohydrates such as gelatins, celluloses (crystal cellulose, methyl cellulose, hydroxypropyl methyl cellulose, carboxymethyl cellulose, etc.), gums, algins, agar-agar, glucomannan, and the like, and a combination thereof. The amount of water retention improvement agent can be about 0 to about 30 weight %, specifically 0.05 to 30 weight %, and more specifically 0.5 to 10 weight % based on the total weight of the mannitol fondant comprising capillary fine crystals.

In one embodiment, an emulsifier may also be added and employed as a crystal regulating agent. Exemplary emulsifiers include sucrose fatty acid esters, glycerin fatty acid esters, sorbitan fatty acid esters, propylene glycol fatty acid esters, lecithin, and the like, and a combination thereof.

The amount of emulsifier can be about 0.01 to about 2 weight %, and more specifically about 0.1 to about 1 weight % based on the total weight of the mannitol fondant comprising capillary fine crystals. In another embodiment, a combination of emulsifier and water retention improvement agent is used in a combined amount of about 0.05 to about 30 weight %, and more specifically about 0.1 to about 10 weight % based on the total weight of the mannitol fondant comprising capillary fine crystals. The emulsifier may have an HLB of about 3 to about 11.

Additional additives may be added to the mannitol fondant comprising capillary fine crystals provided the capillary fine crystals having an average length of 30 micrometers are formed. Exemplary additional additives include acidulants, flavoring agents, coloring agents, and the like, and a combination thereof.

A generalized process to prepare the mannitol fondant comprising capillary fine crystals comprises boiling a liquid mixture of mannitol, noncrystalline carbohydrate, and water; and stirring the liquid mixture at a high speed while continuing to cool the liquid to obtain the capillary fine crystals, each consisting mainly of the mannitol and having an average length of 30 micrometers. The boiling temperature is chosen based on the mass ratio of the mannitol and the noncrystalline carbohydrate. Exemplary boiling temperatures are about 100 to about 134° C. under atmospheric pressure, and specifically about 120 to about 132° C. The boiling temperature may be regulated to control the moisture of the fondant, which may be 30 weight % and under, and specifically about 10 to about 20 weight %. Concentration may optionally be performed under reduced pressure.

After the liquid mixture is boiled, it is cooled to about 95 to about 100° C., and then stirred at high speed while the cooling is continued to form the capillary fine crystals. High speed stirring can be carried out at 55 to 594 rpm under atmospheric pressure, for about 30 minutes to about 1 hour.

In an exemplary embodiment, a mannitol fondant having capillary fine crystals, each consisting mainly of mannitol and having an average length of 30 micrometers, is prepared by adding forty grams of water to 700 g mannitol powder (available from Towa-Kasei Co., Ltd.) and 300 grams of reduced starch syrup (HS-300 available from Hayashibara KK) to form a liquid mixture. The liquid mixture was boiled up to 128° C., cooled to 95° C. and subjected to high speed stirring at 132 rpm to 594 rpm with a stirrer (KM-800 made by KENMIX Co., Ltd.) for 30 minutes until fine crystals were obtained. Similar fondants were prepared by varying the mass ratio of mannitol powder to reduced starch syrup. Ratios of 20:80; 30:70; 40:60; 50:50; 60:40; and 70:30 D-Mannitol powder: reduced starch syrup provided fondants having capillary fine crystals, each consisting mainly of the mannitol and having an average length of ≤30 μm, and that are not rough, and that have smoothness and property stability that are equivalent to those of sugar fondant. Ratios of 10:90 and 80:20 D-Mannitol powder: reduced starch syrup provided fondants with a little roughness, yet have the smoothness and property stability equivalent to sugar fondant. Microscopic analysis of these fondants revealed the fondants contain 90% or more capillary fine crystals whose average length is 30 micrometers and under. A ratio of 70:30 D-Mannitol powder: reduced starch syrup provided a rougher fondant containing 90% or more capillary fine crystals whose average length is 50 micrometers and above by microscopic analysis.

In one embodiment, a fondant can be prepared from crystalline mannitol, hydrogenated starch hydrolysate syrup. It has been found that chewy confectionery compositions can be prepared from fondants containing hydrogenated starch hydrolysate syrups containing higher amounts of sorbitol so that the mannitol crystallization can be inhibited long enough to incorporate higher amounts of mannitol in the fondant during preparation, but allow for sufficient graining once the candy composition is prepared. The hydrogenated starch hydrolysate syrup can generally contain about 1:0.5 to 1:1.5 sorbitol to maltitol, specifically about 1:0.8 to 1:1.2, more specifically about 1:0.9 to about 1:1.1, and yet more specifically about 1:1 sorbitol to maltitol. When a hydrogenated starch hydrolysate syrup is used that does not have the desired ratio of sorbitol to maltitol, a combination of a hydrogenated starch hydrolysate syrup having low amounts of sorbitol and a hydrogenated starch hydrolysate syrup containing higher amounts of sorbitol (sorbitol syrup) can be used to result in the desired ratio. For example, a hydrogenated starch hydrolysate syrup containing about 50 to about 55% maltitol and about 8% sorbitol can be combined with a sorbitol syrup containing about 45 to about 54% sorbitol. The sorbitol syrup can be about 70% solids w/w of the sorbitol syrup (about 28.5 to 31.5% w/w water) and can contain about 45.0 to about 54.0% w/w D-sorbitol (e.g., Polyol 70/100 available from Roquette America, Inc). Amounts of hydrogenated starch hydrolysate syrups used to prepare the fondant can be about 15 to about 30% w/w of the fondant with water when a sorbitol syrup is employed or about 35 to about 60% w/w of the fondant with water when no sorbitol syrup is used. When a sorbitol syrup is employed, it can be present in amounts of about 7 to about 12% w/w of the fondant.

The use of the sorbitol syrup in a mannitol fondant allows for the preparation of a chewy confectionery composition at higher cook temperatures and results in a chewy confectionery having good body, lack of crunchiness, and minimal cold flow shape deformation ("oozing") from multilayered formats. Mannitol based fondant prepared without the sorbitol syrup can contain up to about 57% w/w mannitol based on the weight of the fondant when swept or scraped surface mixing equipment is used to prepare the fondant. Lower amounts of mannitol, about 33 to about 48% w/w based on the weight of the fondant, can be used to prepare the fondant in the absence of the sorbitol syrup when sigma blade or other similar high energy, intensive mixing equipment is used in the preparation of the chewy candy. If pulling is employed using a mannitol fondant free of sorbitol syrup, the amount of mannitol is reduced to about 22% w/w of the fondant. Mannitol fondant prepared with the sorbitol syrup can contain mannitol in an amount of about 35 to about 60% w/w (dry weight) of the fondant; about 25 to about 40% w/w of the fondant including water.

In another embodiment, the chewy confectionery compositions can be prepared with a mannitol fondant wherein the crystalline polyol is mannitol having a median particle size of ≤40 micrometers, specifically about 1 to about 35 micrometers, and yet more specifically about 10 to about 30 micrometers as measured by laser light diffraction techniques.

In several embodiments, chewy confectionery compositions can be prepared without the use of a fondant when sufficient amounts of crystalline polyols are used to promote graining of the confectionery composition. In one embodiment, the crystalline polyol, such as those previously described, is chosen so that at least a substantial portion of the crystalline polyol has very small particle size to provide a grained confectionery product with a smooth mouthfeel. In one embodiment, the crystalline polyol is mannitol having crystals of an average length of ≤30 micrometers as determined by microscopic analysis, specifically having crystals of an average length of about 1 to about 25 micrometers.

In one embodiment, the chewy confectionery produced without a fondant, but with a crystalline polyol having a very small particle size, is prepared using a high energy mixer such as a sigma mixer to ensure a chewy product exhibiting minimal cold flow is produced.

In an embodiment, a fondant is employed to prepare a chewy confectionery at the start of a continuous process using a high energy mixer, but is subsequently not used once the process continuously has some earlier material and later material in the mixer at the same time allowing the earlier material to grain the later material.

A wide variety of one or more conventional additives can be used as an additional ingredient present in the confectionary composition, including fats, oils, texturizing agents, emulsifiers, food acids, additional sweeteners, high intensity sweeteners, flavor modulators or potentiators, flavors, coloring agents, medicaments, oral care agents, throat care agents, breath fresheners, mineral adjuvants, bulking agents, acidulants, buffering agents, sensates (e.g., warming agents, cooling agents, tingling agents, effervescent agents), thickeners, mouth moisteners, flavor enhancing composition, antioxidants (e.g., butylated hydroxytoluene (BHT), butylated hydroxyanisole (BHA), or propyl gallate), preservatives, functional ingredients (e.g., a breath freshener, a dental care component, an active, an herbal, an effervescing system, an appetite suppressor, a vitamin, a micronutrient, a mouth moistening component, a throat care component, an energy boosting agent, a concentration boosting agent), a gas, a mixture thereof, and the like. Some of these additives can serve more than one purpose within the confectionery composition. Furthermore, some of these additives can be at least partially encapsulated.

In one embodiment, the additional ingredient is combined with the base portion prior to the introduction of the fondant portion.

In another embodiment, the additional ingredient is added with or after the introduction of the fondant portion to the base portion.

In yet another embodiment, the additional ingredient is an optional component of the base portion.

The confectionery composition may further comprise a type and amount of texturizing agent to provide a range of desired texture characteristics to the finished confectionery products, from a soft and pliable chewy composition to a hard and friable material. When higher amounts of the texturizing agent such as gelatin is used in a chewy confectionery composition, the composition has more body and tends to exhibit less cold flow shape deformation when prepared into multilayered formats.

The texturizing agent can be selected from the group consisting of a gelatin (pork, beef, etc.), other hydrocolloid material, and a combination thereof.

The gel strength of the gelatin can be greater than or equal to about 125 bloom, specifically greater than or equal to about 200 bloom, and more specifically from about 130 bloom to about 250 bloom.

Exemplary hydrocolloid materials include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, and bacterial gums.

When used, the amount of texturizing agent, specifically gelatin, in the confectionery composition can be about 0.5 to about 3.0% w/w, specifically about 1.0 to about 2.5% w/w, and more specifically about 1.5 to about 2.0% w/w of the confectionery composition.

The confectionery composition may further contain an oil or fat. Suitable oils and fats for use in the confectionery compositions include partially or fully hydrogenated vegetable or animal fats, such as coconut oil, corn oil, cottonseed oil, palm kernel oil, peanut oil, sesame oil, soy bean oil, beef tallow, and lard, among others, as well as cocoa butter, milk fat, a glyceride, and the like.

The oil or fat of the confectionery composition can contain both trans fatty acids, non-trans fatty acids, or a combination thereof. In one embodiment, the oil or fat is free of trans fatty acids.

In one embodiment, the iodine value of the fat/oil can be about 10 or less, specifically 5 or less. In another embodiment, the iodine value of the fat/oil can be about 45 to about 55, specifically about 48 to about 53. Within this embodiment, the fat/oil may contain monounsaturated fatty acids.

The amount of oil/fat present in the confectionery composition can be about 2.0 to about 6.0% w/w, specifically about 3.0 to about 5.0% w/w of the confectionery composition.

In one embodiment, a chewy confectionery composition contains an oil/fat having a melting temperature similar to body temperature to allow for good release of flavor and good chew texture when the confectionery composition is consumed. The melting temperature can be about 35 to about 40° C., specifically about 36 to about 39° C., and more specifically about 37 to about 38° C.

In one embodiment, the fat/oil is palm oil, hydrogenated coconut oil, and a combination thereof.

The confectionery composition may further contain an emulsifier. When used in a chewy confectionery composition, the emulsifier contributes to the degree of aeration that can be achieved in the confectionery thereby contributing to the overall body of the confectionery composition. Increased body results in minimized cold flow shape deformation of the chewy confectionery composition from multilayered format during processing and storage. Suitable emulsifiers include glyceryl monostearate, lecithin, a fatty acid monoglyceride, a diglyceride, propylene glycol monostearate, and a combination thereof.

The emulsifier can be present in the confectionery composition at about 0.1 to about 1.0% w/w of the confectionery composition, specifically about 0.15 to about 0.8, and more specifically about 0.2 to about 0.6% w/w.

In one embodiment, a specific emulsifier is a combination of lecithin and glyceryl monostearate at a ratio of lecithin to glyceryl monostearate of about 1:1 to about 1:50, specifically about 1:2 to about 1:20, and more specifically about 1:5 to about 1:7.

The amount of lecithin present in a chewy confectionery composition can be about 0.001 to about 0.1% w/w, specifically about 0.01 to about 0.06% w/w, and more specifically about 0.03 to about 0.04% w/w. The amount of glyceryl monostearate present in a chewy confectionery composition can be about 0.01 to about 0.7% w/w, specifically about 0.1 to about 0.5% w/w, and more specifically about 0.2 to about 0.4% w/w.

In one embodiment, the confectionery composition comprises an emulsifier and a texturizing agent, wherein the ratio of the total amount of emulsifier to the total amount of texturizing agent is about 1:6 to about 1:9.

The confectionery composition may further include a food acid or salt thereof. Exemplary food acids and food acid salts include acetic acid, adipic acid, ascorbic acid, butyric acid, citric acid, formic acid, fumaric acid, glyconic acid, lactic acid, phosphoric acid, malic acid, oxalic acid, succinic acid, tartaric acid, and a combination thereof, and alkali metal salts thereof (e.g., sodium citrate dihydrate).

In one embodiment, the confectionery composition contains two or more different food acids/salts, for example citric acid and malic acid. In one embodiment, the food acid is a combination of citric and malic acid present in a ratio of about 2:1, specifically about 1.5:1, and more specifically about 1:1 citric to malic acid.

The food acid or salt thereof can be present in the confectionery composition in an amount of about 0.5 to about 4.0% w/w of the confectionery composition, specifically about 1.0 to about 3.75% w/w, and yet more specifically about 1.5 to about 3.0% w/w.

A "high intensity sweetener" as used herein means agents having a sweetness greater than the sweetness of sucrose. In some embodiments, a high intensity sweetener has a sweetness that is at least 100 times that of sugar (sucrose) on a per weight basis, specifically at least 500 times that of sugar on a per weight basis. In one embodiment the high intensity sweetener is at least 1,000 times that of sugar on a per weight basis, more specifically at least 5,000 times that of sugar on a per weight basis. The high intensity sweetener can be selected from a wide range of materials, including water-soluble sweeteners, water-soluble artificial sweeteners, water-soluble sweeteners derived from naturally occurring water-soluble sweeteners, dipeptide based sweeteners, and protein based sweeteners. Combinations comprising one or more sweeteners or one or more of the foregoing types of sweeteners can be used. Without being limited to particular sweeteners, representative categories and examples include:

water-soluble sweetening agents such as dihydrochalcones, monellin, steviosides, rebaudiosides, glycyrrhizin, dihydroflavenol, monatin, and L-aminodicarboxylic acid aminoalkenoic acid ester amides, such as those disclosed in U.S. Pat. No. 4,619,834, and a combination thereof;

water-soluble artificial sweeteners such as soluble saccharin salts, i.e., sodium or calcium saccharin salts, cyclamate salts, acesulfame salts, such as the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and a combination thereof; dipeptide based sweeteners, for example the L-aspartic acid derived sweeteners such as L-aspartyl-L-phenylalanine methyl ester (Aspartame) and materials described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, neotame, and a combination thereof;

water-soluble sweeteners derived from naturally occurring water-soluble sweeteners, such as steviosides, rebaudiosides, chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro1',6'-dideoxy sucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6, 6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-dideox y-beta-D-fructofuranoside, or 4,6,1',6'-tetrachloro4,6,1',6'-tetradeoxygalacto-sucrose; 4,6,1',6'-tetradeoxy-sucrose, and a combination thereof.

protein based sweeteners such as thaumaoccous danielli, talin, and a combination thereof; and amino acid based sweeteners.

The high intensity sweetener can be used in a variety of distinct physical forms, for example those known in the art to provide an initial burst of sweetness and/or a prolonged sensation of sweetness. Without being limited thereto, such physical forms include free forms (e.g., spray dried or powdered), beaded forms, encapsulated forms, and a combination thereof.

A sweet taste in the confectionery can come from flavor modulators or potentiators and/or from flavorants as well as from sweeteners. Flavor potentiators can consist of materials that intensify, supplement, modify or enhance the taste or aroma perception of an original material without introducing a characteristic taste or aroma perception of their own. Flavor modulators can impart a characteristic of their own that complements or negates a characteristic of another component. In some embodiments, flavor modulators or potentiators are designed to intensify, supplement, modify, or enhance the perception of flavor, sweetness, tartness, umami, kokumi, saltiness and combinations thereof can be included. Thus, the addition of flavor modulators or potentiators can impact the overall taste of the comestible. For example, flavors can be compounded to have additional sweet notes by the inclusion of flavor modulators or potentiators, such as vanilla, vanillin, ethyl maltol, furfual, ethyl propionate, lactones, and a combination thereof.

Exemplary flavor modulators or potentiators include monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, neotame, thaumatin, neohesperidin dihydrochalcone, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs), and a combination thereof. In some embodiments, sugar acids, sodium chloride, potassium chloride, sodium acid sulfate, and a combination thereof are used. In other embodiments, glutamates such as monosodium glutamate, monopotassium glutamate, hydrolyzed vegetable protein, hydrolyzed animal protein, yeast extract, and a combination thereof are included. Further examples include adenosine monophosphate (AMP), glutathione, and nucleotides such as inosine monophosphate, disodium inosinate, xanthosine monophosphate, guanylate monophosphate, and a combination thereof. Further examples of flavor potentiator compositions that impart kokumi are also included in U.S. Pat. No. 5,679,397 to Kuroda et al.

The amount of flavor modulators, flavor potentiators, and flavorants used herein can be a matter of preference subject to such factors as the type of final comestible product composition, the individual flavor, the confectionary base employed, and the strength of flavor desired. Thus, the amount of flavoring can be varied in order to obtain the result desired in the final product and such variations are within the capabilities of those skilled in the art without the need for undue experimentation.

Flavorants that can be used include those artificial or natural flavors known in the art, for example synthetic flavor oils, natural flavoring aromatics and/or oils, oleoresins, extracts derived from plants, leaves, flowers, fruits, and the like, and a combination thereof. Nonlimiting representative flavors include oils such as spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, cassia oil, and citrus oils including lemon, orange, lime, grapefruit, vanilla, fruit essences, including apple, pear, peach, grape, strawberry, raspberry, blackberry, cherry, plum, pineapple, apricot, banana, melon, tropical fruit, mango, mangosteen, pomegranate, papaya, honey lemon, and the like, and a combination thereof. Specific flavorants are mints such as peppermint, spearmint, artificial vanilla, cinnamon derivatives, and various fruit flavors.

Other types of flavorants include various aldehydes and esters such as cinnamyl acetate, cinnamaldehyde, citral diethylacetal, dihydrocarvyl acetate, eugenyl formate, p-methylamisol, acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin).

The flavoring agent can be used in liquid or solid form. When used in solid (dry) form, suitable drying means such as spray drying the oil can be used. Alternatively, the flavoring agent can be encapsulated, absorbed onto water soluble materials by means known in the art, for example cellulose, starch, sugar, maltodextrin, gum arabic, and the like. In some embodiments, the flavoring agents can be used in physical forms effective to provide an initial burst of flavor or a prolonged sensation of flavor.

Sensate compounds can include cooling agents, warming agents, tingling agents, effervescent agents, and combinations thereof. Coolants are additives that provide a cooling or refreshing effect in the mouth, in the nasal cavity, or on skin. For example, among the useful cooling agents are included menthane, menthone, ketals, menthone ketals, menthone glycerol ketals, substituted p menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p menthane, 2 mercapto cyclo decanone, hydroxycarboxylic acids with 2 6 carbon atoms, cyclohexanamides, menthyl acetate, menthyl salicylate, N,2,3 trimethyl 2 isopropyl butanamide (WS 23), N-ethyl-2,2-diisopropylbutanamide, N ethyl p menthane 3 carboxamide (WS 3), ethyl ester of N-[[5-methyl-2-(1-methylethyl)cyclohexyl]carbonyl]glycine (WS5), as well as the substantially pure ethyl ester of N-[[5-methyl-2-(1-methylethyl)cyclohexyl]carbonyl]glycine as disclosed in U.S. Pat. No. 7,189,760 to Erman, et al which is incorporated in its entirety herein by reference, isopulegol, menthyloxy propane diol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, Japanese mint oil, peppermint oil, 3-(1-menthoxy) ethan-1-ol, 3-(1-menthoxy)propan-1-ol, menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthane-carboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehtha-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; Menthol methyl ether, menthyl pyrrolidone carboxylate; 2,5-dimethyl-4-(1-pyrrolidinyl)-3(2H)-furanone; cyclic α-keto enamines, cyclotene derivatives such as cyclopentenes including 3-methyl-2-(1-pyrrolidinyl)-2-cyclopenten-1-one and 5-methyl-2-(1-pyrrolidinyl)-2-cyclopenten-1-one, compounds of the formula:
  wherein B is selected from H, CH3, C2H5, OCH3, OC2H5; and OH; and wherein A is a moiety of the formula-CO-D, wherein D is selected from the following moieties: (i) —NR1R2, wherein R' and R2 are independently selected from H and C 1-C8 straight or branched-chain aliphatic, alkoxyalkyl, hydroxyalkyl, araliphatic and cycloalkyl groups, or R1 and R2 together with the nitrogen atom to which they are attached form part of an optionally-substituted, five- or six-membered heterocyclic ring; (ii) —NIICH2COOCH2CH3, —NHCH2CONH2, —NHCH2CH2OCH3, —NHCH2CH2OH, —NHCH2CH(OH)CH2OH and (iii) a moiety selected from the group consisting of:
  as disclosed in PCT Patent Application WO2006/125334 to Bell et al which is incorporated in its entirety herein by reference, among others. Other compounds include the alpha-keto enamines disclosed in U.S. Pat. No. 6,592,884 to Hofmann et al which is incorporated in its entirety herein by reference. These and other suitable cooling agents are further described in the following U.S. patents, all of which are incorporated in their entirety by reference hereto: U.S. Pat. Nos. 4,230,688; 4,032,661; 4,459,425; 4,178,459; 4,296,255; 4,136,163; 5,009,893; 5,266,592; 5,698,181; 6,277,385; 6,627,233; 7,030,273. Still other suitable cooling agents are further described in the following U.S. Patent Applications, all of which are incorporated in their entirety by reference hereto: U.S. 2005/0222256; 2005/0265930.

Warming components can be selected from a wide variety of compounds known to provide the sensory signal of warming to the user. These compounds offer the perceived sensation of warmth, particularly in the oral cavity, and often enhance the perception of flavors, sweeteners and other organoleptic components. Among the useful warming compounds included are vanillyl alcohol n-butylether (TK-1000) supplied by Takasago Perfumary Company Limited, Tokyo, Japan, vanillyl alcohol n-propylether, vanillyl alcohol iso-propylether, vanillyl alcohol isobutylether, vanillyl alcohol n-aminoether, vanillyl alcohol isoamyleather, vanillyl alcohol n-hexyleather, vanillyl alcohol methylether, vanillyl alcohol ethyleather, gingerol, shogaol, paradol, zingerone, capsaicin, dihydrocapsaicin, nordihydrocapsaicin, homocapsaicin, homodihydrocapsaicin, ethanol, isopropol alcohol, iso-amylalcohol, benzyl alcohol, glycerine, and a combination thereof.

In some embodiments, tingling agents may be employed to provide a tingling, stinging or numbing sensation to the user. Tingling agents include, but are not limited to: Jambu Oleoresin or para cress (*Spilanthes* sp.), in which the active ingredient is Spilanthol; Japanese pepper extract (*Zanthoxylum peperitum*), including the ingredients known as Saanshool-I, Saanshool-II and Sanshoamide; perillartine; 4-(1-menthoxymethyl)-2-phenyl-1,3-dioxolane; black pepper extract (piper nigrum), including the active ingredients chavicine and piperine; Echinacea extract; Northern Prickly Ash extract; trans-pellitorin, and red pepper oleoresin. In some embodiments, alkylamides extracted from materials such as jambu or sanshool may be included. Additionally, in some embodiments, a sensation is created due to effervescence. Such effervescence is created by combining an alkaline material with an acidic material, either or both of which may be encapsulated. In some embodiments, an alkaline material may include alkali metal carbonates, alkali metal bicarbonates, alkaline earth metal carbonates, alkaline earth metal bicarbonates and mixtures thereof. In some embodiments, an acidic material may include acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof. Examples of "tingling" type sensates include those disclosed in U.S. Pat. Nos. 6,780,443, 6,159,509, 5,545,424, and 5,407,665, each of which is incorporated by reference herein in its entirety.

The confectionery compositions described herein can be formulated to comprise significant amounts of flavor not used in conventional confections providing an initial burst of flavor with a long lasting flavor profile. Typical amounts of flavor found in candies range from 0.5 to 0.6% w/w based on the total candy weight. The candy portion of the confectionery composition can contain flavorants, flavor modulators, flavor potentiators, sensates, and a combination thereof in an amount of about 0.75 to about 2.0% w/w of the candy composition or more. Processing difficulties arise when flavorants are added to the base portion in amounts greater than can be incorporated quick enough to prevent the flavorant from running off the candy mass and remaining on mixing equipment. It has been found that flavorants, particularly oily flavorants, tend to resist incorporation into the candy mass when added in large amounts. Particular processing techniques were developed to overcome the difficulty in incorporating large amounts of flavors by incorporating flavorants into the fondant or creating a food acid/flavorant premix which is subsequently incorporated into the base portion.

In one embodiment, the fondant comprises flavorants, flavor modulators, flavor potentiators, sensates, and a combination thereof to provide high levels of flavor in the sugar-free confectionery composition. The amount of flavorant present in the fondant can be about 0.01 to about 5.0% w/w of the fondant, specifically about 1.0 to about 4.0% w/w, and more specifically about 2.0 to about 3.0% w/w.

In a particular embodiment, the flavorants, flavor modulators, flavor potentiators, sensates, and a combination thereof is combined with an emulsifier and mixed with the fondant prior to introducing the fondant to the base portion. Exemplary emulsifiers are those previously discussed, specifically lecithin. The amount of flavorants, etc. which is combined with the emulsifier can be about 1.0 to about 11.25% w/w, specifically about 2.0 to about 7.5% w/w, and more specifically about 4.5% w/w based on the total weight of the fondant. The amount of emulsifier which is combined with the flavorants, etc. can be about 0.02 to about 0.5% w/w, specifically about 0.4 to about 0.25% w/w, and more specifically about 0.1% w/w based on the total weight of the fondant.

In another embodiment, a food acid/flavorant premix is prepared and subsequently added to the base portion to achieve high levels of flavorant in the final composition. The premix can be prepared by mixing an excess amount of food acid by weight to an amount of flavorant to form a paste, specifically about 20:1, more specifically about 10:1, yet more specifically about 5:1, and still more specifically about a 1:1 weight ratio of food acid to flavorant. The flavorant is absorbed by the food acid resulting in the minimization of flash off of flavor and minimization of flavor loss during mixing as discussed above.

In one embodiment, the sugar-free candy portion contains small amounts of spray-dried flavorants, specifically less than 10% w/w of the total flavorant is spray-dried flavorant, more specifically is essentially free of spray-dried flavorant, and yet more specifically free of spray-dried flavorant. Spray-dried flavorants often contain other materials such as maltodextrin, starch, or cellulose, in addition to the flavor, which can affect the balance for crystallization of the polyol in the candy portion making it difficult to achieve the desired graining/texture consistency, and can contribute to flavors that are not as clean.

Coloring agents (colors, colorants, colorings) can be used in amounts effective to produce a desired color for the confectionery composition. Suitable coloring agents include pigments, which can be incorporated in amounts up to about 6% w/w of the composition. For example, titanium dioxide can be incorporated in amounts up to about 2% w/w, and specifically less than about 1% w/w by weight of the composition. Suitable coloring agents also include natural food colors and dyes suitable for food, drug, and cosmetic applications. Suitable colors include annatto extract (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E1610, caramel (E150(a-d)), β-apo-8'-carotenal (E160e), β-carotene (E160a), alpha carotene, gamma carotene, ethyl ester of beta-apo-8 carotenal (E1600, flavoxanthin (E161a), lutein (E161b), cochineal extract (E120), carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminium (E173), silver (E174), gold (E175), pigment rubine/lithol rubine BK (E180), calcium carbonate (E170), carbon black (E153), black PN/brilliant black BN (E151), green S/acid brilliant green BS (E142), and a combination thereof. In some embodiments, certified colors can include FD&C aluminum lakes, and a combination thereof. A full recitation of all FD&C colorants and their corresponding chemical structures may be found in the Kirk-Othmer Encyclopedia of Chemical Technology, 3rd Edition, in volume 5 at pages 857-884, which text is incorporated herein by reference.

Exemplary breath fresheners include to zinc citrate, zinc acetate, zinc fluoride, zinc ammonium sulfate, zinc bromide, zinc iodide, zinc chloride, zinc nitrate, zinc fluorosilicate, zinc gluconate, zinc tartarate, zinc succinate, zinc formate, zinc chromate, zinc phenol sulfonate, zinc dithionate, zinc sulfate, silver nitrate, zinc salicylate, zinc glycerophosphate, copper nitrate, chlorophyll, copper chlorophyll, chlorophyllin, hydrogenated cottonseed oil, chlorine dioxide, beta cyclodextrin, zeolite, silica-based material, carbon-based material, enzymes such as laccase, and a combination thereof. Breath fresheners can include essential oils as well as various aldehydes and alcohols. Essential oils used as breath fresheners can include oils of spearmint, peppermint, wintergreen, sassafras, chlorophyll, citral, geraniol, cardamom, clove, sage, carvacrol, eucalyptus, cardamom, magnolia bark extract, marjoram, cinnamon, lemon, lime, grapefruit, orange, and a combination thereof. Aldehydes such as cinnamic aldehyde and salicylaldehyde can be used. Additionally, chemicals such as menthol, carvone, iso-garrigol, and anethole can function as breath fresheners.

Exemplary mouth moisteners include saliva stimulators such as acids and salts including acetic acid, adipic acid, ascorbic acid, butyric acid, citric acid, formic acid, fumaric acid, glyconic acid, lactic acid, phosphoric acid, malic acid, oxalic acid, succinic acid, and tartaric acid. Mouth moisteners can include hydrocolloid materials that hydrate and can adhere to oral surface to provide a sensation of mouth moistening. Hydrocolloid materials can include naturally occurring materials such as plant exudates, seed gums, and seaweed extracts or they can be chemically modified materials such as cellulose, starch, or natural gum derivatives. Furthermore, hydrocolloid materials can include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, and bacterial gums. Mouth moisteners can include modified natural gums such as propylene glycol alginate, carboxymethyl locust bean gum, low methoxyl pectin, and a combination thereof. Modified celluloses can be included such as microcrystalline cellulose, carboxymethlcellulose (CMC), methylcellulose (MC), hydroxypropylmethylcellulose (HPCM), hydroxypropylcellulose (MPC), and a combination thereof.

Similarly, humectants, which can provide a perception of mouth hydration, can be included. Such humectants can include glycerol, sorbitol, polyethylene glycol, erythritol, xylitol, and a combination thereof. Additionally, in some embodiments, fats can provide a perception of mouth moistening. Such fats can include medium chain triglycerides, vegetable oils, fish oils, mineral oils, and a combination thereof.

Suitable acidulants illustratively include acetic, citric, fumaric, hydrochloric, lactic and nitric acids as well as sodium citrate, sodium bicarbonate and carbonate, sodium or potassium phosphate and magnesium oxide, potassium metaphosphate, sodium acetate, and a combination thereof.

Exemplary buffering agents include sodium bicarbonate, sodium phosphate, sodium hydroxide, ammonium hydroxide, potassium hydroxide, sodium stannate, triethanolamine, citric acid, hydrochloric acid, sodium citrate, and a combination thereof.

The buffering agent may be present in the sugar-free candy portion in an amount up to 2.0% w/w based on the total weight of the sugar-free candy portion, specifically about 0.01 to about 1.5% w/w, more specifically about 0.1 to about 1.3% w/w, and yet more specifically about 0.5 to about 1.0% w/w.

Suitable oral care agents include breath fresheners, tooth whiteners, antimicrobial agents, tooth mineralizers, tooth decay inhibitors, topical anesthetics, mucoprotectants, stain removers, oral cleaning, bleaching agents, desensitizing agents, dental remineralization agents, antibacterial agents, anticaries agents, plaque acid buffering agents, surfactants and anticalculus agents, and a combination thereof.

Throat care or throat-soothing ingredients include analgesics, antihistamines, anesthetics, demulcents, mucolytics, expectorants, antitussive, and antiseptics. In some embodiments, throat soothing agents such as honey, propolis, aloe vera, glycerine, menthol and a combination thereof.

Medicaments can be included in the confectionery or chewing gum composition. Nonlimiting illustrative categories and specific examples include antihistamines, decongestants (sympathomimetics), antitussives (cough suppressants), anti-inflammatories, homeopathic agents, expectorants, anesthetics, demulcents, analgesics, anticholinergics, throat-soothing agents, antibacterial agents, antiviral agents, antifungal agents, antacids, antinauseants, chemotherapeutics, diuretics, psychotherapeutic agents, cardiovascular agents, various alkaloids, laxatives, appetite suppressants, ACE-inhibitors, anti-asthmatics, anti-cholesterolemics, anti-depressants, anti-diarrhea preparations, anti-hypertensives, anti-lipid agents, acne drugs, amino acid preparations, anti-uricemic drugs, anabolic preparations, appetite stimulants, bone metabolism regulators, contraceptives, endometriosis management agents, enzymes, erectile dysfunction therapies such as sildenafil citrate, fertility agents, gastrointestinal agents, homeopathic remedies, hormones, motion sickness treatments, muscle relaxants, osteoporosis preparations, oxytocics, parasympatholytics, parasympathomimetics, prostaglandins, respiratory agents, sedatives, smoking cessation aids such as bromocryptine or nicotine, tremor preparations, urinary tract agents, anti-ulcer agents, anti-emetics, hyper- and hypo-glycemic agents, thyroid and anti-thyroid preparations, terine relaxants, erythropoietic drugs, mucolytics, DNA and genetic modifying drugs, and nutritional supplements, including nutraceuticals, micronutrients, vitamins and co-enzymes. The pharmaceutically acceptable salts and prodrugs of the medicaments are also included unless specified otherwise. Some of these medicaments can serve more than one purpose. Combinations of the foregoing types of optional medicaments can be used. Two or more medicaments that have activity against the same or different symptoms can be used together in a combination.

In one embodiment, the confectionery composition is a chewy composition. In another embodiment, the confectionery composition is a crunchy composition. The level of chewiness or crunchiness of the confectionery composition is modulated by the amount of moisture present coupled with the type and degree of sugar polyol crystallization. Typically, lower amounts of moisture result in a harder texture, while higher amounts of moisture result in a softer texture. The cook temperature used to prepare the confectionery composition determines the moisture content and thus determines the texture of crunchy/chewy and stand up/body. More discussion of cook temperature is provided herein.

The type of crystallization also contributes to the overall texture of the product. Uniform planes of crystallization result in a crunchier product, while localized crystal formation will provide a product that is less crunchy. Additionally, the degree of crystallization affects the confectionery composition's texture. Generally, the higher the degree of crystallization i.e. the more grained the product is, the softer the bite. In some embodiments there can be an interaction between the type and degree of crystallization. For example, a high degree of uniform planes of crystallization will result in a product that is crunchier than a low degree of uniform planes of crystallization. For another example, a high degree of localized crystal formation will provide a product with little or no crunch and a softer bite while a low degree of localized crystal formation will provide a product that may have some crunch and is chewier. Thus, by controlling the moisture content and the type and degree of crystallization in the final confectionery product, a range of textures can be obtained from chewy to crunchy/crispy.

In several embodiments, the type of crystallization observed is localized crystal formation of the sugar polyols. Use of certain types of sugar polyol will result in more or less crystallization. For example, use of hydrogenated starch hydrolysate syrup is less prone to crystallization as compared to mannitol, which tends to provide confectionery products with a higher degree of crystallinity.

In several embodiments, a fondant is used to modulate the graining of the confectionery composition to obtain a chewy or crunchy texture as the fondant can impart a degree of crystallinity to the product. In lieu of the fondant, crystalline powder material such as a crystalline sugar polyol can be added to the confectionery composition as a crystallization promoter to impart a degree of crystallinity. In an alternative embodiment, crystallinity can be introduced into the confectionery composition by the use of cooking kettles or processing equipment containing residual particulate material such as crystalline sugar polyols.

In one embodiment, a chewy confectionery composition is prepared having a balance of properties to result in a stable layer in the multilayered compositions. The chewy composition exhibits sufficient body so that it does not exhibit cold flow shape deformation and "ooze" from the multilayered compositions, thereby maintaining visually distinct portions of a confectionery component and adjacent layers of confectionery, e.g., chewing gum over time. Further embodiments of the chewy confectionery results in a chewy texture without converting into a crunchy texture over time.

The chewy confectionery can exhibit a body/hardness, density, or viscosity suitable for use in multilayered compositions. It is known that the viscosity of sugar free confections tend to be lower than corresponding sugar matrices making sugar free confections more difficult to process and requiring more "body" to withstand pressures of adjacent layers in a multilayerd format.

The confectionery composition generally has a moisture content of no more than about 12% w/w, specifically no more than about 6.0% w/w of the confectionery. In one embodiment, a chewy confectionery composition has a moisture content of about 6.0 to about 8.0% w/w, specifically about 6.3 to about 7.5% w/w, and more specifically about 6.5 to about 7.0% w/w. In another embodiment, a crunchy confectionery composition has a moisture content of about 4.0 to about 5.0% w/w of the confectionery, specifically about 4.3 to about 4.7% w/w.

In one embodiment, the final cook temperature used to prepare the chewy confectionery composition is about 126 to about 145° C., specifically about 128 to about 136° C., more specifically about 130 to about 134° C., and yet more specifically about 132° C. to give a final moisture content of about 6 to about 7. This final cook temperature provides a chewy confectionery composition having desirable chewiness with good body having minimal shape deformation upon processing into multilayered formats and upon standing over time.

The confectionery composition can be prepared using a continuous process, a batch process, and a combination thereof. The confectionery composition can be prepared using conventional equipment, such as fire cookers, vacuum cookers, or scraped-surface cookers (also referred to as high speed atmospheric cookers). The confectionery composition can be prepared by a general process of preparing a base portion by applying heat to a mixture of sugar polyol and water to increase the solids content of the mixture by the removal of moisture. In another embodiment, base portion can be created by increasing the solids content without a heat process such as by incorporating a solid sugar polyol into an aqueous sugar polyol syrup.

Once the base portion is prepared ingredients such as fats/oils, emulsifiers, texturizing agents, colors, acids, flavors, and other optional ingredients can be mixed with the base. In the foregoing methods, the additive(s) are specifically mixed for a time effective to provide a uniform distribution of the materials, for example about 4 to about 10 minutes.

The resulting mixture can be tempered on a cooling table and cooled to about 40 to about 55° C., specifically about 45 to about 55° C. prior to the addition of the fondant portion, if used. In embodiments where fondant is used, the fondant can be incorporated into the mixture of base portion and other ingredients and the resulting material can be further worked by pulling, kneading, etc. to achieve a desired consistency.

The fondant can generally be prepared by mixing a desired sugar polyol or polyols with water. In several embodiments, the amount of water is used such that a slurry is prepared thus retaining some of the crystalline nature of the polyol. In an alternate embodiment, the sugar polyol and water are heated, optionally to reduce the level of water, and then allowed to cool to result in polyol crystal formation.

In one embodiment, the confectionery composition once formed is pulled for about 4 to about 12 minutes, specifically about 6 to about 10 minutes, and yet more specifically about 7 to about 9 minutes.

In one embodiment, the confectionery composition once formed is pulled for about 8 to about 12 minutes, specifically about 9 to about 10 minutes to provide a chewy confectionery composition.

In another embodiment, the confectionery composition once formed is pulled for about 2 to about 5 minutes, specifically about 3 to about 4 minutes to provide a crunchy confectionery composition.

Once the composition has been properly tempered, it can be cut into workable portions or otherwise formed into desired shapes and sizes using forming techniques such as are known in the art or formed into multilayed confectionery compositions as described herein. In one embodiment, the resulting tempered material may be allowed to stand for a period of time to allow polyol crystal formation, if desired.

The process to prepare the confectionery composition may further include graining the confectionery by seeding or by mechanical agitation.

In another embodiment, the candy layer is prepared from a sugar-free, hard boiled candy to result in a crunchy layer of amorphous candy. Sugar-free, hard boiled candies are generally hard and essentially amorphous confectionery products low in moisture prepared by the removal of moisture from cooked sugar polyol syrups. Exemplary sugar polyols are disclosed herein.

The sugar-free hard candy can contain about 0.1 to about 3 w/w % water based on the total weight of the hard candy, specifically about 0.2 to about 2.5 w/w %, and more specifically about 0.5 to about 2.0 w/w %.

In general, preparation of the hard candy involves: mixing and heating, forming a melt a sugar polyol and optionally, other sugar polyols and/or a diluent such as water; cooking the melt; removing excess moisture from the melt; cooling the melt with mixing until the melt is a plastic-like, workable mass; while the melt is a plastic-like mass, incorporating optional ingredients; and forming the plastic-like mixture into a desired size and shape.

Methods known in the art of making hard confectionaries include those utilizing fire cookers, vacuum cookers, and scraped-surface cookers (aka high speed atmospheric cookers).

In a suitable example of a method utilizing fire cookers, the desired quantity of the sugar polyol is dissolved in water by heating in a kettle until dissolved. Additional optional sugar polyols can be added and cooking continued until a final temperature of about 145-165° C. is achieved. The mix is then cooled, worked as a plastic-like mass, and admixed optional ingredients such as flavors, colorants, high-intensity sweeteners, and the like.

A suitable example of a method utilizing vacuum cookers, the sugar polyol components are boiled at a temperature of about 125-132° C., vacuum is applied and additional water is boiled off without extra heating. When cooking is complete, the mass is a semi-solid having a plastic-like consistency. Optional conventional additives are admixed into the mass at this point by conventional methods.

In a suitable example of a method using scraped-surface cookers, a film of a mixture of the sugar polyol components is spread on a heat exchange surface and heated to about 165-170° C. within a few minutes. The composition is then rapidly cooled to about 100-120° C. and worked as a plastic-like mass, mixing in any optional conventional additives.

In the foregoing methods, the cooking temperature should be sufficiently high to drive water from the mix. Where vacuum is employed, lower temperatures can typically be used. In the foregoing methods, the additive(s) are specifically mixed for a time effective to provide a uniform distribution of the materials, for example about 4 to about 10 minutes. Once the composition has been properly tempered, it can be cut into workable portions or otherwise formed into desired shapes and sizes using forming techniques such as are known in the art.

In one embodiment, a confectionery composition comprises a base portion comprising about 9.7 to about 10.2 w/w % mannitol, about 67.0 to about 77.0% w/w % hydrogenated starch hydrolysate syrup, about 3.2 to about 3.8 w/w % oil/fat having a melting temperature of about 35 to about 40° C., about 0.1 to about 0.3 w/w % glycerol monostearate, about 0.03 to about 0.05 w/w % lecithin, colorant, about 1.0 to about 1.4 w/w % citric acid, about 0.6 to about 1.0 w/w % malic acid, about 0.5 to about 0.8 w/w % flavor, and about 1.0 to about 1.6 w/w % gelatin 250 bloom; and a fondant portion comprising about 4.6 to about 5.4 w/w % mannitol, about 0.6 to about 1.0 w/w % water, about 1.6 to about 3.5 to about 4.2 w/w % hydrogenated starch hydrolysate syrup having a ratio of sorbitol to maltitol of about 1:1; wherein all amounts are based on the total weight of the confectionery composition; and wherein the fondant portion and base portion are mixed to form a sugar-free confectionery composition.

Now that some non-limiting compositional information of chewing gum and candy type confectioneries, which can be used to form multilayer confectionery products of the present invention embodiments, has been generally described, the system and method of making the multilayer confectionery product according to the embodiment of FIG. 1 will be further discussed in detail. Further, non-limiting and non-exhaustive alternative embodiments will also be discussed.

Further Details of the Embodiment of FIG. 1.

Referring back to FIG. 1, system 100 can manufacture various three-layer confectionery products. In one embodiment, each layer is formed of a same type of confectionery. In this embodiment, at least one of the upstream mixing systems 102, 104, 106 prepares a confectionery having at least one characteristic different than other confectioneries. For example, all three upstream systems 102, 104, 106 can make a chewing gum, but the upstream systems 102, 106 may make a blue gum while the upstream system 104 makes a red gum to provide a multilayer, multicolor gum product.

In embodiments, wherein two or more forming stations form a same confectionery, the two or more forming stations may share the upstream mixing system or a mixer in the upstream mixing system. For example, in the multilayer, multicolor gum embodiment discussed above, a gum base prepared in a batch mixer may be fed to two different extruders wherein a color and other gum ingredients are further mixed with the gum base. In this embodiment, one of the extruders adds a blue color and feeds the forming station 108, 112, while the other extruder adds a red color and feeds the forming station 110.

In another embodiment, the upstream mixing systems 102, 106 prepare a chewing gum, while the upstream mixing system 104 prepares a chewy candy. Thus, the upstream mixing systems 102, 106 include at least one mixer and other equipments necessary for gum making. The upstream mixing systems 102, 106 may share a mixer and/or other equipments. The upstream mixing system 104 includes at least one mixer and other necessary equipments for making the chewy candy.

As shown in FIG. 1, the forming stations 108, 110, 112 are arranged in series on the conveyor belt 118, wherein the forming station 108 is arranged upstream of forming station 110, and the forming station 110 is arranged in upstream of the forming station 112. Although, the system 100 is illustrated with three forming stations to form a three-layer confectionery product, it is also contemplated that other embodiments may include two forming stations for a two-layer confectionery product or more than three forming stations for more than three-layer confectionery products.

In the embodiment shown in FIG. 1, each of the forming stations 108, 110, 112 includes a set of forming drums 124, 126, 128. Each set of forming drums 124, 126, 128 includes an upper forming drum 148, 150, 152 and a lower forming drum 154, 156, 158. Although each set of forming drums 124, 126, 128 is illustrated with two forming drums in FIG. 1, it is also contemplated that a set of forming drums may include more than two forming drums. The forming drum is also referred herein as "drum", "forming roller", "roller", "forming roll", or other like terms. The forming drums can have a smooth surface or include embossing patterns.

In this embodiment, the upper drum 148 and the lower drum 154 of the forming station 108 are arranged in a vertically and horizontally offset relation, such that the x-axis 147 of the upper drum 148 is vertically above the x-axis 153 of the lower drum 154, and the y-axis 149 of the upper drum 148 is horizontally offset from the y-axis 155 of the lower drum 154. Further, the upper drum 148 and the lower drum 154 are arranged with a gap 125 therebetween, which allows the confectionery to pass between the drums. The upper drum 148, the lower drum 154, and the gap 125 are configured to apply a compressive force onto the confectionery to form a continuous sheet of confectionery having a generally uniform thickness corresponding to the gap. Depending on the desired thickness of a confectionery layer, the gap between forming drums can be set as low as 0.1 mm, and preferably between about 0.3 mm and 10.0 mm.

The term "generally uniform thickness" of the confectionery is used broadly herein to describe a cross sectional web shape of the confectionery upon exiting the set of forming drums. The gap can be adjusted according to a desired thickness of the confectionery layer. The "gap" is the minimum space between the outer surface of an upper drum and the outer surface of a lower drum and also referred to as a "spacing" herein.

The downstream forming stations 110, 112 are configured similar to the forming stations 108. The upper drum 150 and the lower drum 156 of the forming station 110 and the upper drum 152 and the lower drum 158 of the forming station 112 are arranged in an offset relation with the x-axes 147', 147" of the upper drums 150, 152 being vertically above the x-axes 153', 153" of the lower drums 156, 158, and the y-axes 151 153 of the upper drums 150, 152 being horizontally offset from the y-axes 157, 159 of the lower drums 156, 158. As it was with the upper drum 148 and the lower drum 154, the upper drums 150, 152 and the lower drums 156, 158 are arranged with gaps 127, 129 therebetween, which can be adjusted according to a desired thickness of confectionery layers 144, 146. Since the forming stations 108, 110, 112 of the embodiment shown in FIG. 1 are similarly configured, further details of the forming stations will be explained referring to components of the forming station 108.

It should be appreciated that the upper drum 148 may be configured with a desirable actuation device, such as but not limited to a servomechanism, to control the position of the upper drum 148, thereby adjusting the gap 125. The upper drum 148 and the lower drum 154 may also be externally driven by motors operably coupled thereto. In such an embodiment, since each drum is provided with a separate motor, a rotational speed of the upper drum 148 and lower drum 154 may be independently controlled.

Figure 8:
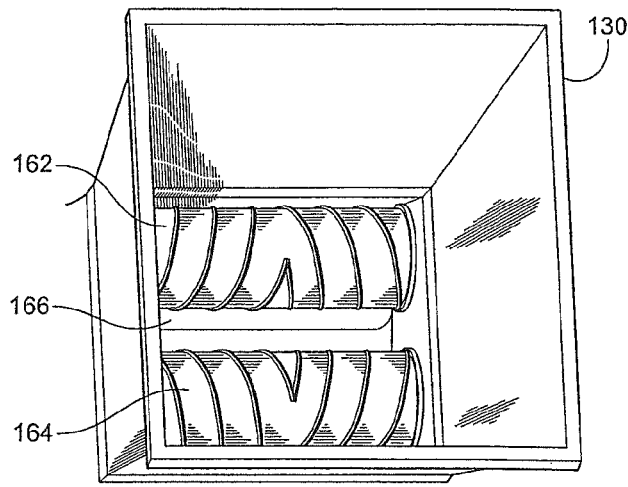
FIG. 8 is a perspective top view of a hopper including a pair of feed rollers according to an embodiment of the present invention.

Referring back to FIG. 1, the confectionery prepared in the upstream mixing system 102 is fed into the hopper 130. The hopper 130 can be used for upstream surge control, capacity, and feed control. The hopper 130 can be configured to receive a confectionery in various forms such as a non-uniform confectionery mass, loaves of confectionery, a rope of confectionery, and somewhat uniform web of confectionery having various thickness and width. The confectionery can be fed continuously or in batches. In embodiments, where the confectionery is continuously fed to a hopper in a form of somewhat uniform web, an inlet region of the hopper may be adjusted according to the feed width. In some embodiments, the hopper 130 can include a set of feed rollers 162, 164 as shown in FIG. 8 to facilitate feeding of a confectionery toward the forming drums. The feed rollers 162, 164 in this embodiment are auger rollers having helical blades 166.

The confectionery 136 in the hopper 130 is guided by the upper drum 148 toward the lower drum 154. The upper drum 148 and the lower drum 154 are configured to counter rotate to pull the confectionery 136 through the gap 125. In the embodiment shown in FIG. 1, the upper drum 148 is configured to rotate in a clockwise direction and the lower drum 154 is configured to rotate in a counter clockwise direction. The counter rotating drums 148 and 154 pull the confectionery 136 through the gap 125 and compress the confectionery 136 to form a confectionery sheet 142 having a desired thickness and width.

The forming drums 148, 154 can be configured to have various diameter and width. In the embodiment of FIG. 1, the lower drum 154 has a larger diameter than the upper drum 148. However, in other embodiments, the upper drum 148 can have a larger diameter than the lower drum 154, or the forming drums 148, 154 can have a same diameter. In one embodiment, the lower drum 154 has a diameter between about 0.5 m and 3 m, and a width between about 0.6 m and 1.3 m, while the upper drum 148 has a diameter between about 0.25 m and 1 m and a width between about 0.6 m and 1.3 m. While smaller width forming drums are possible, the forming drums having such width or wider can improve production output. With wider forming drums, the confectionery forming process can run slower, if desirable, while still producing the same amount of confectionery, or increase the production output with an increased forming speed.

The upper drum 148 and the lower drum 154 can run at a same rotational speed or different rotational speeds. The rotational speed of a forming drum is selected depending on characteristics of the confectionery input, and the desired thickness, width, and temperature of the confectionery layer 142. In one embodiment, the lower drum 154, which has a larger diameter than the upper drum 148 runs at a higher rotational speed than the smaller upper drum 148. Further, a relative rotational speed of the forming drums 148, 154 can be controlled to produce a desired quality of the confectionery layer.

The forming drums 148, 154 can also be configured to run at a same linear speed or a different linear speed, i.e. measured at the tangent of the surface of the rollers. In one embodiment, one forming drum is set at a constant linear speed, while a linear speed of the other forming drum is varied ±30% of the constant linear speed of the first forming drum. The linear speed range of one forming drum can be ±40%, ±30%, ±20%, or ±10% of the constant linear speed of the other forming drum. For example, a linear speed of the lower drum 154 is set at 3 m/min, while a linear speed of the upper drum 148 is varied between about 2.1 m/min and 3.9 m/min. In such embodiment, the linear speed of the upper drum 148 is controlled within a set range to minimize surface irregularities, such as wrinkles, and to obtain a smooth surfaced confectionery layer 142. Alternatively, the upper drum 148 can be set at a constant linear speed, while the linear speed of the lower drum 154 is varies within a set range. In an embodiment, the forming drums having different diameters are configured to run at a same linear speed (e.g. a same seed at the tangent, but different angular speed in that the smaller diameter drum rotates faster.)

Figure 9:
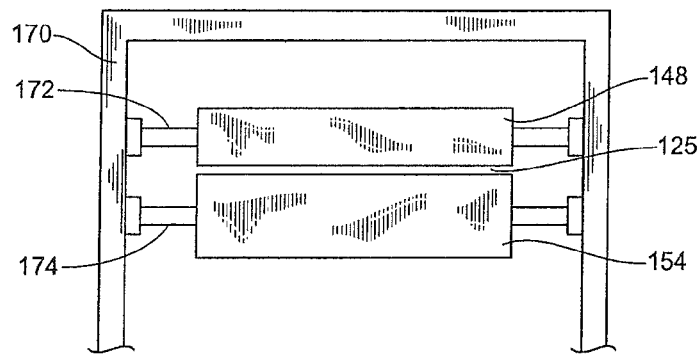
FIG. 9 is a schematic illustration of a cross-web view of a confection forming station including a set of forming drums secured to structural frames, wherein a generally uniform cross web spacing is provided between the pair of forming drums.
Figure 10:
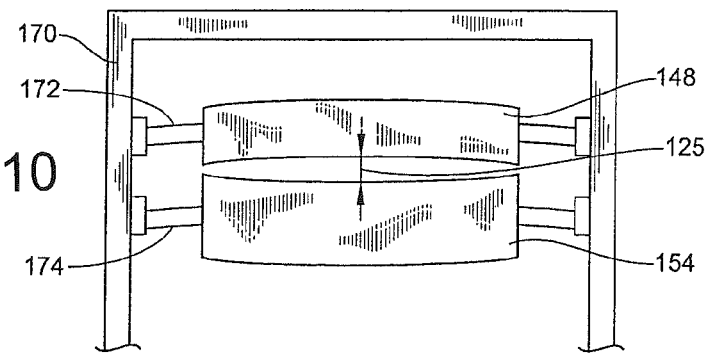
FIG. 10 is a schematic illustration of a cross-web view of the confection forming station of FIG. 9 showing a deflection between the pair of forming drums.

The dimensional configuration and material for the forming drums 148, 154, and support structures of the forming drums 148, 154 are engineered to minimize or eliminate deflection in the forming drums 148, 154. FIG. 9 is a schematic illustration of a cross-web view of the forming drums 148, 154 secured to structural fames 170 via shafts 172, 174. As shown, the forming drums 148, 154 are arranged to provide a generally uniform cross-web gap 125 from one end of the forming drums to the other end. However, some high viscosity and/or low elasticity confectionery, such as a gum, can impart a high stress to the forming drums 148, 154 as the forming drums compress the confectionery. Some very viscous confectionery, such as some gum structures or dough-like coating material, can require additional force, such as feeding augers in the hopper 130 pushing the gum structure into the gap 125. Such viscous confectionery exerts a high stress on the forming drums 148, 154, which can result in a deflection of in the forming drums as shown in FIG. 10 (the deflection is exaggerated for the illustration purpose.) As shown, the deflection in the forming drums 148, 154 results in an uneven gap 125 across the forming drums 148, 154, wherein the gap 125 around the center of the forming drums is greater than the gap 125 near the ends of the forming drums. Such uneven gap 125 will produce a confectionery layer having a non-uniform cross-web thickness, which is very much undesirable as it will produce confectionery products having inconsistent dimensions. Further, solid components of a viscous confectionery composition having a low compressibility can indent the surface of the forming drums.

Thus, the forming drums 148, 154 are strengthened, for example, by providing an added structural support and/or supporting the drums closer to the ends to minimize or eliminate the deflection. In one embodiment, the forming drums 148, 154 are strengthened and supported such that the maximum deflection between the forming drums is maintained under 0.5 mm, preferably under 0.1 mm, and more preferably under 0.05 mm. Further, the deflection can also be minimized or eliminated by increasing a diameter of the forming drums or selecting a forming drum material having an enhanced strength to withstand the stress. Thus, a diameter to width ratio of the forming drums is carefully engineered to minimize the deflection.

Further, the upper drum 148 and/or the lower drum 154 can be configured as heat transfer drums to heat or cool the confectionery during the forming and sizing, and being carried on the lower drum 154. Such heat transfer forming drums can heat or cool the confectionery to adjust viscosity of the confectionery. For example, when the viscosity of the confectionery is too high and causes an undesirable deflection between the forming drums, the forming drums can be heated to increase the temperature of the confectionery to lower the viscosity, thereby reducing the stress imparted to the forming drums. In one embodiment, the forming drums 148, 154 are provided with internal channels for circulation of a thermal fluid. The upper drum 148 and the lower drum 154 can be cooled or heated to a same temperature or different temperatures. For example, the upper drum 148 may be heated above the ambient temperature to facilitate the forming, while the lower drum 154 is cooled below the ambient temperature to lower the temperature of the confectionery layer post forming and sizing. In one embodiment, the forming drums 148, 154 are maintained above the ambient temperature, preferably between 40° C.-60° C., to form a gum sheet having a thickness between about 0.3 mm and 15 mm, preferably between about 1 mm and 10 mm, with a coefficient of variation less than 25%, preferably less than 20%, more preferably less than 10%.

The confectionery layer 142 can have a temperature gradient across the thickness. The temperature gradient can be large when one forming drum is heated while the other forming drum is cooled. However, even if the forming drums are maintained at a same temperature, a temperature gradient across the thickness can still exist, as many confectioneries are not a good thermal conductor, and thus, the inner portion of the confectionery thickness can remain at a different temperature than that of the outer surfaces, which are in direct contact with the forming drums. Further, crystallization of the confectionery can also vary across the thickness. For example, crystallization of a confectionery on the surface in contact with a chilled forming drum can be substantially different than that of the surface in contact with a heated forming drum.

The chilled forming drums 148, 154 can effectively reduce a temperature of a relatively thin confectionery layer as it is formed and carried on the lower forming drum 154. When immediate cooling of the confectionery after forming and sizing is desired, a larger diameter chilled roller can be selected for the lower drum 154 to increase a residence time of the confectionery layer 142 on the lower drum. In such embodiment, the confectionery layer 142 is carried on the lower drum over at least ¼ of rotation. In one embodiment, the confectionery layer 142 is carried on the lower drum 154 at least 90°, and preferably about 180°. Chilled water circulating the internal channels of the forming drums is excellent for maintaining a surface temperature of the forming drums at about 5° C. to 25° C.; and preferably about 15° C.

The heat transfer from or to the confectionery layer can be controlled by adjusting a residence time of the confectionery layer on the heat transfer roller(s) and a surface temperature of the heat transfer roller(s). The residence time can be increased or decreased by changing a diameter of the heat transfer roller(s) and/or rotational speed of the heat transfer roller(s). For example, when the lower drum 154 having a diameter of 1 m is chilled, the heat transfer from the confectionery layer 143 can be increased by decreasing the surface temperature of the lower drum 154, or slowing down the rotational speed of the lower drum 154 to increase the residence time of the confectionery layer 142 on the lower drum 154. Alternatively, the lower drum 154 may be changed to a larger diameter roller, which can increase the residence time while maintaining a higher rotational speed, thereby maintaining desired productivity. Some confectionery may be sensitive to cold temperatures and result in undesirable crystallization when exposed to low temperatures. For such confectioneries, the temperature of the heat transfer roller(s) is maintained above certain temperature to avoid the undesirable crystallization.

In one embodiment, the confectionery 136 is a gum structure, and the gum structure is compressively formed and sized via the upper drum 148 and the lower drum 154. A sheet of gum structure formed and sized by the forming drums 148, 154 has a generally uniform thickness with a coefficient of variation less than about 20%, preferably less than 10%, and more preferably less than 5% or less. For example, when a target thickness of the gum layer is 3 mm, the gap between the upper and lower drums is controlled such that the thickness of the gum layer is between about 2.4 mm and 3.6 mm, preferably between about 2.7 mm and 3.3 mm, and more preferably between about 2.85 mm and 2.15 mm, or less variance. In this embodiment, a temperature of the forming drums 148, 154 are heat to a temperature above the ambient temperature (the ambient temperature is between about 20° C. and 25° C.)

After being compressively formed and sized by the set of forming drums 124, the sheet of confectionery 142 is carried on the lower drum 154 for at least 30°, preferably at least 45°, and more preferably greater than 60°, and transferred onto the conveyor belt 118. As the sheet of confectionery 142 is carried on the lower drum 154, a temperature of the sheet confectionery 142 can further change depending on a temperature of the lower drum 154.

The forming drums can be provided with a liquid lubricant applicator. In embodiments, wherein the forming drums form a confectionery that traditionally require a dusting agent, such as a chewing gum, the use of a liquid lubricator can provide further production advantages. By eliminating the use of dusting powders, a clean up process of a manufacturing line can be dramatically made easy, since a substantially large portion of residual mess requiring lengthy cleaning in conventional lines, such as conventional rolling and scoring lines, is due to the use of the powder and the large number of rollers. Thus, the clean up time for a change over, which can be hours in conventional rolling and scoring gum lines, can be reduce to minutes. Further, eliminating the use a powder dusting agent can produce more aesthetically pleasing products with more vibrant colors as the powder dusting agent can dull the final product color.

In the embodiment shown in FIG. 1, each of the forming drums is provided with an oiling roller 180, 182, 184,186, 188, 190. The oiling rollers lubricate the forming drums with a food quality vegetable or mineral oil, which acts to prevent a confectionery from sticking to the forming drums. Although each of the forming drums in this embodiment is equipped with the oiling roller, in other embodiments wherein the forming drums have a sufficiently low surface tension, less than all forming drums may be provided with an oiling roller. Further, other types of lubricant applicators, such as a spray bar or a dipping basin can be used to apply a suitable liquid lubricator.

One or more forming drums can also be provided with a scraper to aid in releasing of a confectionery sheet from the surface of the forming drums. In the system of FIG. 1, each of the forming drums is provided with a scraper 192, 193, 194, 195, 196, 197. The scraper 192 ensures the sheet of confectionery 142 to release from the surface of the upper drum 148, while the scraper 193 facilitates release of the confectionery sheet 142 from the surface of the lower drum 154 to the conveyor belt 118.

The conveyor belt 118 can also be heated or cooled to adjust the temperature of the sheet of confectionery 142 by conduction. The use of a chilled conveyor belt is possible in embodiments wherein the use of a powder anti-sticking agent is eliminated, for example, by using a liquid lubricator as described above. In conventional gum lines that use a powder dusting material, a chilled conveyor belt is not feasible, since the powder dusting material will stick to the chilled surface of the conveyor belt.

The confectionery sheet is carried on the conveyor belt 118 toward the forming station 110. The forming station 110 is similarly configured as the first forming station 108. A confectionery 138, which may be same or different than the first confectionery 136 is prepared in the upstream mixing system 104. The confectionery 138 is then fed into the hopper 132 and formed between the set of forming drums 126 into a sheet of confectionery 144 having a desired thickness and a width. As it was with the forming station 108, the upper drum 150 or the lower drum 156 or the both drums 150, 156 can be configured to be a heat transfer drum to adjust a temperature of the confectionery 138 as the confectionery 138 is being formed between the drums 150, 156. The sheet of confectionery 144 is then transferred on top of the confectionery sheet 142 being carried on the conveyor 118. When the sheet of confectionery 144 is transferred from the lower drum 156 onto the sheet of confectionery 142, two confectionery layers 142, 144 are laminated together between the lower drum 156 and the conveyor belt 118. A gap between the lower drum 156 and the conveyor belt 118 can be adjusted to control a compressive pressure applied on the laminated confectionery layers 142, 144. The compressive pressured is controlled to maximize adhesion between the confectionery layers 142, 144, while minimizing oozing and/or slipping between the layers. The laminated confectionery layers 142, 144 are then carried on the conveyor belt 118 toward the forming station 112.

The forming station 112 is similarly configured as the first and second forming stations 108, 110. As it was with the forming stations 108, 110, a confectionery composition 140 is prepared in the upstream mixing system 106. The preparation of the confectionery compositions 136, 138, 140 may be performed simultaneously. Alternatively, confectionery compositions 136, 138, 140 can be prepared at different times and stored for the subsequent forming process. The confectionery 140 is fed into the hopper 134 and formed between the set of forming drums 128 into a sheet of confectionery 146 having a desired thickness and a width. The upper drum 152 or the lower drum 158 or the both drums 152, 158 can be configured to be a heat transfer drum to adjust a temperature of the confectionery 140 while being formed between the drums 152, 158. The sheet of confectionery 146 is then transferred on top of the laminated confectionery layers 142, 144 being carried on the conveyor belt 119. When the confectionery sheet 146 is transferred from the lower drum 158 onto the laminated confectionery layers 142, 144, the confectionery sheet 146 is laminated on top of the confectionery layer 144. A gap between the lower drum 158 and the conveyor belt 118 can be adjusted to control a compressive pressure applied on the laminated confectionery layers 142, 144, 146 to maximize adhesion between the confectionery layers 142, 144, 146, while minimizing oozing and/or slipping between layers.

A three-layer confectionery 160 including the laminated confectionery layers 142, 144, 146 is then carried on the conveyor belt 118 toward the compression drum 114. The compression drum 114 smoothes out the three-layer confectionery composition 160 by removing any imperfections on the top surface. The compression drum 114 may further reduce a thickness of the three-layer confectionery composition 160 to a desired final thickness. Typically, the compression drum 114 adjusts the thickness by 10% or less. Further, a compressive pressure applied by the compression roller 114 can further improve the adhesion between the confectionery layers 142, 144, 146 to reduce a risk of delamination between layers during downstream processes. The compressive pressure applied on the three-layer confectionery 160 can be controlled by adjusting a gap between the compression drum 114 and the conveyor belt 118.

The three-layer confectionery product 160 having a desired final thickness further travels on the conveyor belt 118 to the scoring roller 116, wherein the three-layer confectionery product 160 is scored. The scored three-layer confectionery product 160 may then pass through the optional cooling tunnel 120, wherein the three-layer confectionery product 160 is conditioned to a desired temperature prior to being packaged. The three-layer confectionery product 160 can then be packaged in the packaging station 122.

Gum-Candy-Gum Embodiments

Figure 2:
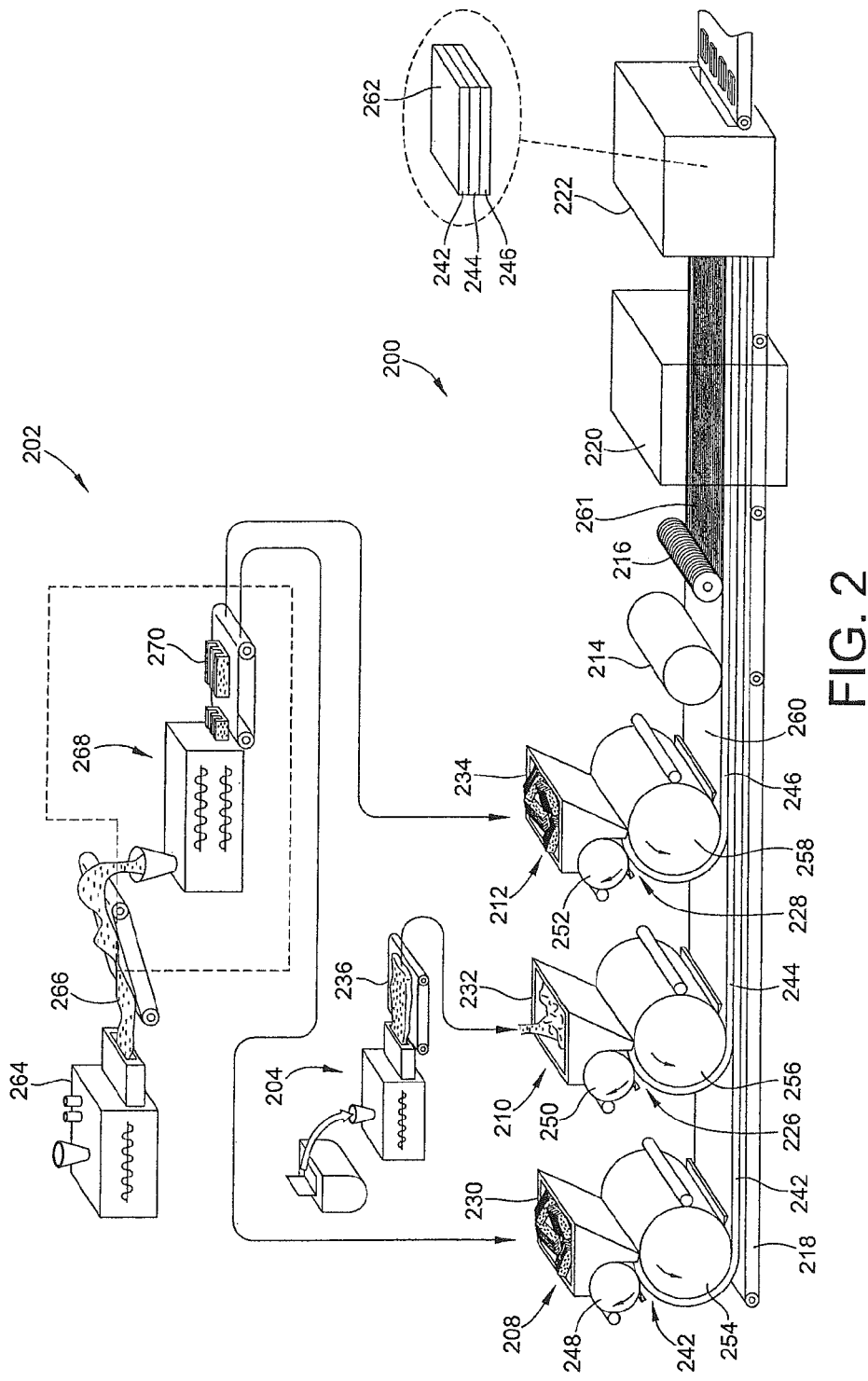
FIG. 2 is a partly schematic and partly perspective illustration of a multilayer confectionery product manufacturing system according to a different embodiment of the present invention including a three confectionery forming stations, wherein two of the confectionery forming stations share a common upstream confectionery mixing extruder and the other confectionery forming station receives a feed from a separate mixing extruder.

Multilayer confectionery products manufactured according to embodiments of the present invention provide visually distinct portions of the confectionery components, thereby enhancing the consumer experience. An example of the multilayer confectionery product formed as a slab according to an embodiment of the present invention is shown in FIG. 2. The three-layer confectionery product 262 includes a candy layer 244 sandwiched between two outer chewing gum layers 242, 246. In such embodiments, the chewing gum portion provides consumers with a prolonged and lasting flavor profile, while the candy type confectionery portion provide a faster release of flavor for an initial burst of flavor or sweetness. Further, textures of the candy component and the gum components can be controlled to match or mismatch, thereby providing a new and unique consumer experience. For example, the candy component can be formulated to exhibit either a chewy or crunch texture. Further, the chewiness of the candy can be matched to the texture of the chewing gum. To provide the match or mismatch of textures in the multilayer composition, the texture of the candy component may be selected from any point in a spectrum of hard to soft or crunch to chewy. Furthermore, within the range of hardness, the candy composition may be more or less amorphous or more or less crystalline. For example, a hard-boiled candy is an amorphous confectionery that can provide a hard, crunchy texture. In contrast, a candy prepared from a low boiled sugar polyol syrup can provide a chewy confectionery that can be formulated to contain small amount of localized crystalline polyol.

Manufacturing of such multilayer confectionery products including confectionery components having different physical properties can present various challenges. For example, the gum and candy components can have differing rheological properties and thermal properties. Further, various candy compositions can have much differing physical properties. Similarly, various gum compositions may have different viscosity, elasticity, etc. Such confectionery components having differing physical properties can react differently to different processing conditions, such as compression, stretching, temperature, etc. For example, when forming and laminating different confectionery components, a component having a lower viscosity may ooze, or layers may not adhere to each other sufficiently and may slide against each other.

FIG. 2 shows a manufacturing system 200 for making multilayer confectionery products according to an embodiment of the present invention that can solve these challenges. In this embodiment, the manufacturing system 200 is configured to produce a three-layer confectionery product 262 including a chewing gum layer 242, a chewy candy layer 244, and a chewing gum layer 246. As shown, the chewy candy layer 244 is sandwiched between the chewing gum layers 242, 246. Similar to the manufacturing system 100, the manufacturing system 200 generally includes upstream mixing systems 202, 204, forming stations 208, 210, 212, a compression roller 214, a scoring roller 216, a conveyor belt 218, a cooling tunnel 220 and a packaging station 222. In this embodiment, the forming stations 208, 212 share the same upstream system 202 for their input. The upstream system 202 makes a chewing gum composition, which is used to form the chewing gum layers 242, 246. The upstream system 204 makes a chewy candy composition and feeds the forming station 210.

In accordance with various inventive aspects, the forming stations 208, 210, 212 provide for forming, and/or heat transferring, and particularly for the gum, can eliminate downstream progressive rolling operations. The gum forming stations 208, 212 also can be used to eliminate sizing type extruders (e.g. the extruders that form wide thin ribbons of gum), and thereby can reduce the processing shear force and increase the amount of shear sensitive ingredients remaining intact with the chewing gum through processing. The forming stations 208, 212 may be used to form various gum structures, such as a finished gum, a finished gum base, a gum base including candy bits, etc. Similarly, the candy forming station 210 can be used to form various candies, such as a hard candy, chewy candy, taffy, etc.

The forming stations 208, 210, 212 can be used to form any type of gum structures or other confectionery compositions, and the actual components of the upstream systems 202, 204 are not of great importance relative to the invention, although the upstream system components, such as different types of mixers, may affect the feed characteristics into the forming stations 208, 210, 212. Further, in preparing a gum structure to feed the forming stations 208, 212, different types of preconditioning and low shear extruders may be employed to modify the raw mixer output and generate a regular stream and/or a continuous stream. In either event, it is contemplated that the new forming stations are readily usable with a variety of upstream systems employed in the industry to prepare confectionery compositions.

In this embodiment, the upstream mixing system 202 includes a mixing extruder 264 that mixes a variety of gum ingredients to form a gum structure 266, and an optional low shear extruder 268 that forms the gum structure 266 into loaves of gum structure 270. In other embodiments, the upstream system 202 can include more than one mixers. The mixers can provide different types of mixing depending on the ingredients being mixed. Similarly, the upstream system 204 can include one or more mixers and other necessary equipments to prepare a desired candy formulation.

Before further discussing other components of the manufacturing system 200, mixers which can be used in various upstream systems for making gum structures and/or other confectioneries will be generally discussed.

Mixers Generally

The mixers of the upstream systems may be a continuous mixer or a batch mixer. As used herein, "a continuous mixer", which may also be referred to herein as a "continuous processor", is processing equipment in which the various ingredients used to prepare a confectionery composition, such as a chewing gum, are fed substantially continuously into the device while those ingredients are being mixed and transferred within the mixing device and ejected from the mixing device. For example, in a continuous mixing extruder, ingredients are substantially continuously introduced through various upstream and downstream feed ports, all the while, the screws, blades, pins, paddles or other mixing elements continue to convey the mixture through the system, all the while mixing the same. At a downstream portion of the extruder, the wholly or partly combined downstream portion of the mass is ejected from the extruder by the force of the mass substantially continually or continually being conveyed. The ejection of the mass from the extruder may be facilitated by inclusion of an external or supplemental pump.

A continuous mixer may provide dispersive mixing, distributive mixing or a combination of both dispersive mixing and distributive mixing. Dispersive mixing is typically high shear mixing that breaks up individual ingredients and aggregations of ingredients within a composition into smaller pieces. Distributive mixing is typically lower shear mixing than distributive mixing and is used to distribute the individual ingredients throughout the composition to provide a more uniform composition. Dispersive and distributive mixing are more thoroughly described and discussed in U.S. Pat. No. 5,562,936, the teachings and disclosure of which are hereby incorporated in their entireties by reference thereto.

A continuous mixer in the form of an extruder can have all dispersive mixing elements, all distributive mixing elements, or a combination of dispersive mixing elements and distributive mixing elements. The dispersive mixing elements are typically upstream of the distributive mixing elements, however, continuous mixers according to the present invention are not limited to that arrangement.

As used herein, "a batch mixer", which may also be referred to herein as a "batch processor", is processing equipment used to prepare a confectionery composition that once the composition is prepared the composition is ejected from the equipment all at once or at least discrete non-continuous portions of the composition will be ejected at intermittent intervals, but the composition is not continuously ejected during mixing. Typically, individual ingredients or portions of the individual ingredients used to prepare the composition are fed into the device substantially all at one time or in a predetermined temporal sequence in discrete amounts. Individual ingredients added to a batch mixer may be added at different times throughout the mixing cycle such that some ingredients have a residence time substantially equal to the entire length of the mixing cycle while other ingredients have a residence time for only a fraction of the entire length of the mixing cycle. Further, individual ingredients that are used for different purposes throughout the mixing cycle may have different discrete portions of the ingredient added at different times throughout the mixing process. For example, in mixing a gum structure, one ingredient may be used to facilitate compounding elastomer as well as may be used as a bulking agent. Such an ingredient may have a first portion added at the beginning of the mixing cycle such that it has a residence time equal to the entire mixing time while a second portion of the same ingredient may be added later in the mixing cycle such that the second portion has a residence time less than the entire mixing time.

A batch mixer will typically provide either dispersive mixing or distributive mixing, but usually not both dispersive and distributive mixing. However, a batch mixer used in practicing the present invention could be configured to provide both dispersive and distributive mixing. For example, it is contemplated that a kettle mixer that includes internal blades could be configured to shift between dispersive and distributive mixing by modifying the pitch or orientation of the blades. Alternatively, the kettle mixer could include multiple sets of blades, such that one set is configured for dispersive mixing while another set is configured for distributive mixing. It is contemplated the mixer would most likely only use one set of the blades at a time to provide one type of mixing at a time.

The upstream systems of various embodiments of the present invention can be configured to include one or more continuous mixers and/or one or more batch mixers arranged in series and/or parallel. Various parallel and series mixing system arrangements for preparation of gum structures are described in U.S. patent application Ser. Nos. 12/338,428 and 12/338,682, which are assigned to the present assignee, the disclosures of which are hereby incorporated by reference in their entireties.

Further Details of the Manufacturing System 200

Now referring back to FIG. 2, a gum structure output 266 from the extruder 264 is generally irregular or otherwise has a non-uniform thickness. The gum structure output 266 may be an elastomer or a finished gum or any gum structures therebetween, and may include any number of gum base ingredients and/or gum ingredients. In this embodiment, the gum structure output 266 is preferably a finished gum. Depending on a formulation of the gum structure, the non-uniform gum structure output 266 can be fed directly into the forming stations 208, 212 to form a continuous sheet of gum structure 242, 246 having a desired uniform thickness. In some embodiments, as shown in FIG. 2, the non-uniform gum structure output 266 is further processed into a generally uniform structure, for example, loaves of gum structure 270 having a uniform shape and width, prior to entering the forming stations 208, 212. The loaves can be fed to forming stations 208, 212 directly off of the loafing extruder 268, or can be transferred and/or stored for a period of time before being formed into a sheet of gum. In another embodiment, the non-uniform gum structure output 266 is converted into a generally uniform web of gum structure having a thickness greater than about 20 mm via a separate low shear extruder or attaching an appropriate die at the exit of the mixing extruder 264.

The upstream gum preparation system 202 notably does not need to include a sizing type extruder. Thus, one feature and advantage of such embodiments is that by eliminate the use of a sizing type extruder that requires relatively higher shear than the optional low shear extruder 268, an overall shear stress applied to the gum 242, 246 is substantially reduced to preserve more shear sensitive ingredients. Shear sensitive ingredients such as those described above including particular encapsulated sweeteners, flavors and various active pharmaceutical ingredients are contemplated to particularly benefit from the lower shear processing. Further, conventional gum lines including such sizing type extruder is limited to producing a gum structure having a maximum width of about 220 mm to 460 mm due to the high shear nature of the process. In forming a continuous sheet of gum structure using the forming stations 208, 210, such width restriction no longer applies, as a non-uniform gum or a generally uniform gum having a much greater thickness than that of gum processed via the sizing type of extruder can be processed by the forming stations 208, 210. Further, the forming stations 208, 210 can be operated with a substantially less power, for example, using a 1-5 HP motor, thereby resulting in significant energy savings compared to conventional gum forming systems including a sizing type extruder and rolling scoring line.

The forming stations 208, 210, 212 are similarly configured as the forming stations 108, 110, 112 of the FIG. 1 embodiment. Each of the forming stations 208, 210, 212 generally includes a set of forming drums 224, 226, 228 and a hopper 230, 232, 234. Each set of forming drums 224, 226, 228 includes an upper drum 248, 250, 252, and a lower drum 254, 256, 258, wherein the upper drum and the lower drum are arranged vertically and horizontally off set from each other as it was with the upper and lower drums of the forming stations 108, 110, 112.

In this embodiment, the forming stations 208 and 212 receive a gum structure prepared in the upstream mixing system 202, preferably a finished gum, and form a sheet of gum having a desired width and thickness. The incoming gum received form the upstream mixing system 202 has a temperature between about 45° C. and 55° C., and a viscosity of about 1,000,000 cP±10%. The hopper 230, 234 can be configured to receive various forms of gum structure, such as a non-uniform gum structure, loaves of gum structure, and/or a somewhat uniform web of gum structure. The width of the inlet region of the hopper 230, 234 can be adjusted to receive gum structures of various widths. In one embodiment, the pair of forming drums 224, 228 and the hopper 230, 234 are configured to accommodate a width of the gum structure between about 25 mm to 1 m, or perhaps wider. It may be desirable to form a wider sheet of the gum of greater than about 0.6 m in width so as to be able to provide a substantial gum mass volume that can operate at slower speeds while generating sufficient output.

The forming stations 208 and 212 are configured to form a gum sheet having a thickness between about 0.3 mm and 15 mm, preferably between 1 mm and 10 mm. In one embodiment, the forming station 208 is configured to form a finished gum sheet having as average thickness between about 1.5 mm and 5.5 mm. The upper forming drum 248 has a smaller diameter than the lower forming drum 254, and upper and lower drums 248, 254 have a same width. Each of the upper and lower drums 248, 254 is configured as a heat transfer drums with internal channel for circulating a cooling or heating fluid. Further, each of the upper and lower drums 248, 254 are made of a highly polished stainless steel. The upper and lower forming drums 248, 254 are configured to counter rotate and driven independently by a separate motor. Thus, the upper and lower drums 248, 254 can rotate at a same or different speed. Each of the upper and lower drums 248, 254 can be configured to rotate at a linear speed between about 1-40 m/min, preferably between about 3-35 m/min, and more preferably between about 5-16 m/min.

In this embodiment, the upper and lower drums 248, 254 are configured to have a generally same temperature between about 5° C. and 90° C., preferably between about 15° C. and 70° C., and more preferably between about 45° C. and 60° C. A gap between the upper and lower drums 248, 254 is set according to a target thickness of the gum sheet. In one embodiment, the gap between the upper and lower drums 248, 254 is set at 1.5 mm, and a surface temperature of the upper and lower forming drums 248, 254 at around 60° C., wherein the upper and lower forming drums 248, 254 counter rotate at a same linear speed of about 16 m/min to form a gum sheet 242 having an average thickness of about 1.5 mm. Each of the drums 248, 254 is lubricated with a food grade liquid lubricator to avoid the need of a powder dusting agent for preventing gum from sticking to the forming drums. The gum sheet 242 formed by the forming station 208 is transferred on the conveyor belt 218 toward the forming station 210. The conveyor belt 218 can be chilled to lower the temperature of the gum sheet 242.

The upstream mixing system 204 prepares a chewy candy 236 and feeds the forming station 210, wherein the chewy candy is formed into a sheet of chewy candy 244 having a desired thickness. In one embodiment, the processing of the chewy candy composition begins with forming a batch of fondant. A cooked candy mass is also prepared using a candy cooking apparatus, preferably a semi-continuous candy cooker. The cooked candy mass is then added to a candy bowl, wherein a vacuum of between about 2.5 and 6.5 inches of Hg is applied. Gelatin is added to the cooked candy and mixed to form a gelatinized cooked candy mass. The gelatinized cooked candy is dropped on a chilled cooling table, wherein acids and flavors are added by folding until the temperature of the mixture drops to between about 45° C. and 80° C. The folded gelatinized candy mass is further processed in a kneading machine until the temperature drops to between about 35° C. and 65° C. The fondant is then added to this candy mass to form the chewy candy composition. Typically, the chewy candy composition includes approximately between 5 wt. %-20 wt. % fondant. The chewy candy can be fed to the forming station 210 as a non-uniform mass or be preformed into a somewhat uniform mass via a pre-extruder. In FIG. 2, the upstream mixing system 204 is greatly simplified.

The hopper 232 is configured to receive various forms of the chewy candy, such as a non-uniform mass or a generally uniform web of chewy candy. The forming station 226 is similarly configured as the forming station 224, and includes the upper drum 250 and the lower drum 256 that counter rotate to pull the chewy candy through a gap therebetween to compressively form the chewy candy into the sheet of chewy candy 244 having a desired thickness and width. The upper and lower drums 250, 256 are provided with internal channels to circulate a cooling or heating fluid. Depending on characteristics of the chewy candy (e.g. viscosity, elasticity, etc.), the one or both drums 250, 256 can be heated or cooled. For example, when the chewy candy in the hopper 232 has a significantly lower viscosity than that of the gum sheet 142, the one or both forming drums 250, 256 can be chilled to lower the temperature of the chewy candy to increase the viscosity, such that the chewy candy may not ooze as being laminated with the gum sheets 242, 246. Further, the viscosities of the gum sheet 242, 246 and the chewy candy 244 are carefully controlled to ensure sufficient adhesion between the sheets 242, 244, 246, such that the sheets 242, 244, 246 do not slip against each other and remain as a laminated three-layer sheet 260 during downstream processes. The viscosities of the gum and chewy candy in this embodiment is a function of a temperature, thus the temperatures of the gum sheets 242, 246 and chewy gum sheet 244 are carefully controlled by engineering process parameters of the forming drums 248, 250, 252, 254, 256, 258 (e.g. speed of forming drums and temperature of forming drums) and conveyor belt 218 (e.g. temperature of conveyor belt.)

Once the chewy gum sheet 244 is formed between the forming drums 250, 256, the chewy gum sheet 244 is carried on the lower drum 256 and transferred on the conveyor belt 218 carrying the gum sheet 242. In this embodiment, each of the drums 250, 256 is provided with a liquid lubricant applicator to apply a food grade lubricant to prevent the chewy gum from sticking to the forming drum surfaces. In one embodiment, the forming station 210 is configured and set up with operational parameters to form the chewy candy sheet 244 having an average thickness about 1.5 mm and a viscosity approximately matching the viscosity of the gum sheet 242. A gap between the lower drum 256 and the conveyor belt 218 is set such that that the lower drum 256 applies a compressive force on the laminated sheets 242, 244 to provide sufficient adhesion between the sheets 242, 244, while minimizing oozing. The laminated sheets 242, 244 are then transferred on the conveyor belt 218 toward the forming stations 212.

The forming stations 212 is similarly configured as the forming stations 208 and includes the hopper 234, an upper forming drum 252, and a lower forming drum 258. In one embodiment, the forming drums 252, 258 are set up with the identical operational parameters as the forming drums 248, 254 to form the gum sheet 246 having an average thickness of 1.5 mm. A gap between the lower drum 258 and the conveyor belt 218 is set to apply a sufficient compressive force on the laminated sheets 260 such that adhesion between the sheets 242, 244, 246 is sufficient to prevent slipping between the sheets, while oozing is minimized or prevented.

The laminated gum-chewy candy-gum sheet 260 is transferred on the conveyor belt 218 toward a compression roller 214. The conveyor belt 218 can be chilled to adjust the temperature of the laminated sheet 260 while being carried on the conveyor belt 218. The compression roller 214 is arranged preferably about 0.5 m to 3 m from the lower drum 258, more preferably about 1 m-1.5 m. A gap between the compression roller 214 and the conveyor belt 218 is preferably set to generally match the average thickness of the laminated sheet 260, thus any compressive force applied on the laminated sheet 260 by the compression roller 214 is minimal. As such, the compression roller can remove surface imperfections, kinks, and further enhance the adhesion between the sheets 242, 244, 246, but will not significantly adjust the thickness of the laminated sheet 260. In some embodiments, the compression roller 214 can further reduce the thickness of the laminated sheet 260, however usually any further reductions of thickness is limited to 10% or less. In one embodiment, the laminated sheet 260 has a total thickness of about 4.5 mm including 1.5 mm gum sheet 242, 1.5 mm chewy gum sheet 244, and 1.5 mm gum sheet 246, and the compression roller 214 smoothes out any surface imperfections and evens out any uneven cross-web thickness of the laminated sheet 260. The compression roller 214 can also be a heat transfer roller. In some embodiments, the compression roller 214 is chilled to further reduce the temperature of the laminated sheet 260. In other embodiments, the compression roller 214 is heated to facilitate smoothing out and/or additional minimal thickness reduction of the laminated sheet 260.

Exiting the compression roller 214, the laminated sheet 260 is transferred on the conveyor belt 218 toward a scoring roller 216. Although not shown in FIG. 2, a lateral dividing roller may also be provided along with the scoring roller 216. The scored laminated sheet 261 is then conveyed through a cooling tunnel 220, wherein the scored laminated sheet 261 is cooled from both top and bottom sides with a forced air. As the scored laminated sheet 261 is conditioned in the cooling tunnel 220, each layer of the gum-chewy candy-gum sheet stiffens sufficient enough for final shaping and packaging so as to maintain shape and to minimize material creep. In one embodiment, the cooling tunnel 220 is configured to condition the scored laminated sheet 261 to a temperature as low as about 0° C.-15° C. The conditioned sheet 261 may then be further die-cut and/or wrapped in a downstream device 222 to produce the final three-layer confectionery product 262 including the chewy candy layer 244 sandwiched between the gum layers 242, 244. In other embodiments, the scored and conditioned sheet 261 is stacked into stacks and transferred for subsequent packaging processes.

Although, the FIG. 2 embodiment is shown with the cooling tunnel 220, the cooling tunnel 220 is optional. In other embodiments, one or more of the forming drums 248, 250, 252, 254, 256, 258, the compression roller 214 and/or the conveyor belt 128 is chilled to sufficiently lower the temperature of the laminated sheet 260, and further conditioning in a cooling tunnel may not be necessary. Further, the one or more chilled drums, the chilled compression roller, the chilled conveyor belt and/or the cooling tunnel can provide sufficient cooling and conditioning of the three-layer sheet, and a subsequent conditioning in a conditioning room prior to packaging is not necessary for some multi-layer formulations. The elimination of a lengthy conditioning in the conditioning room can substantially reduce flash off of volatile confectionery ingredients such as flavors, thereby preserving more flavors for consumer enjoyment.

Since each of the confectionery layers is formed using a separate forming station, the layers can be formed to have different thicknesses or widths according to a desired size and shape of the finished product. Further, the multilayer confectionery products manufactured using the methods and systems according to embodiments of the present invention can be structurally distinguishable from products produced using conventional equipments. For example, the systems of the present invention embodiments can result in different crystallization of confectionery components, by eliminating a high shear sizing-type extruder and providing a quick contact cooling by cooling drums. Further, the embodiments of the present invention can produce more aesthetically pleasing products by eliminating use of powder dusting materials and producing each confectionery layer having a desired thickness and width with relatively small thickness and width variances when compared to those produced via conventional systems.

Three-Layer Embodiment with Marbled Gum Layer

Figure 3:
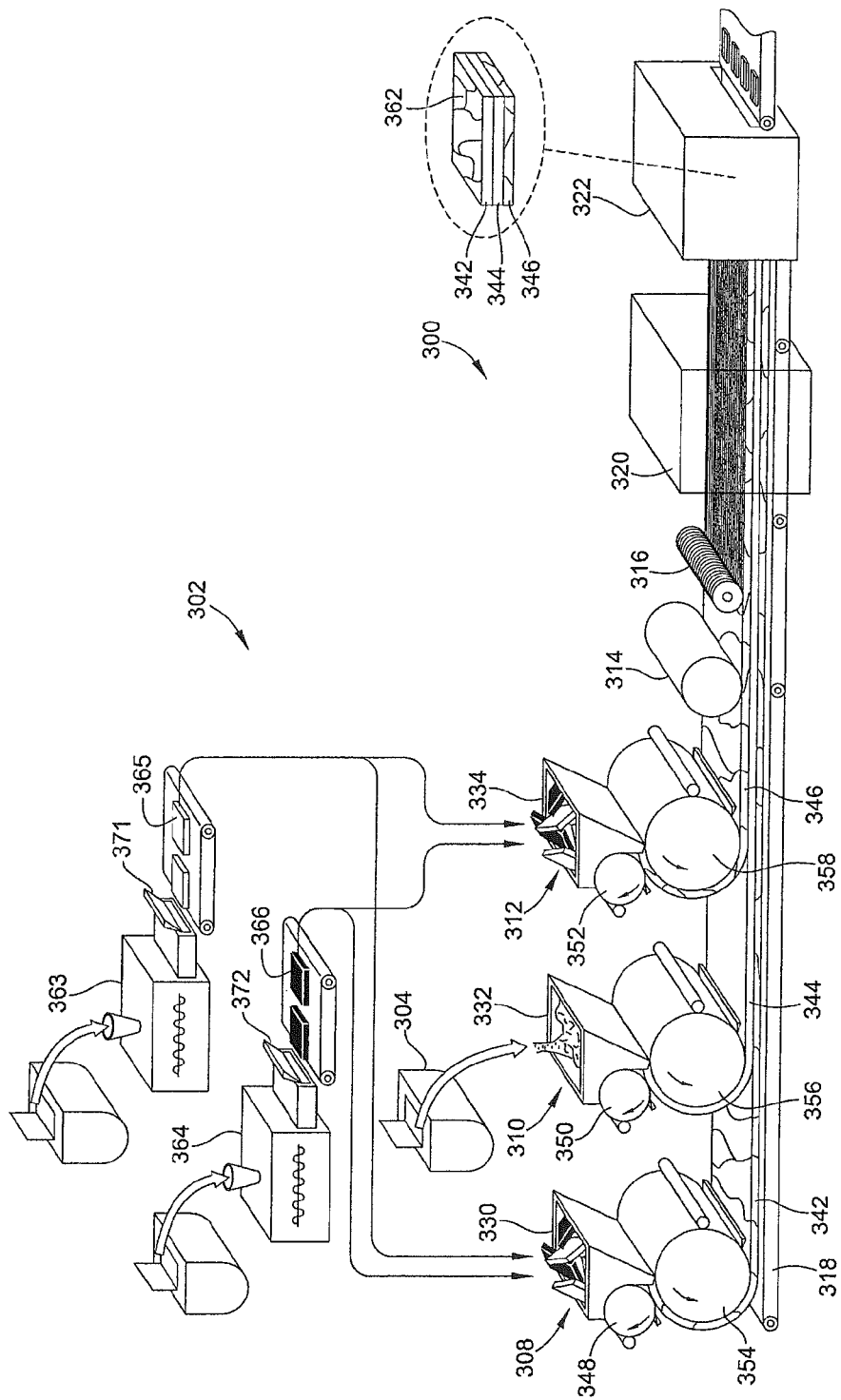
FIG. 3 is a partly schematic and partly perspective illustration of a multilayer confectionery product manufacturing system according to another embodiment of the present invention including three confectionery forming stations, wherein marbled gum-candy-marbled gum layers are laminated together.

FIG. 3 shows a manufacturing system 300 for making a three-layer confectionery product according to a different embodiment of the present invention. The manufacturing system 300 is similarly configured as the manufacturing system 200. However, an upstream mixing system 302 of the manufacturing system 300 includes at least two mixers for making at least two different color and/or flavor gums to form marbled gum sheets using forming stations 308, 312. Thus, the manufacturing system 300 can produce a three-layer confectionery product 362 including a marbled gum layer 342, a candy layer 344, and a marled gum layer 346.

As it was with the manufacturing system 200, the manufacturing system 300 generally includes upstream mixing systems 302, 304, forming stations 308, 310, 312, a compression roller 314, a scoring roller 316, a conveyor belt 318, a cooling tunnel 320 and a packaging station 322. The upstream mixing system 302 includes an extruder 363 for making a first gum 365, and an extruder 364 for making a second gum 366, which has a different color and/or flavor than the first gum. The upstream system 304 makes a candy, such as a chewy candy composition. Each of the forming stations 308, 310, 312 includes an upper forming drum 348, 350, 352 and an lower forming drums 354, 356, 358, which are configured and operated similarly as the forming drums of previously discussed embodiments.

In one embodiment, the extruder 363 produces a ribbon of a red colored chewing gum. The red chewing gum can be flavored with various flavors such as a cherry flavor. Similarly, the extruder 364 produces a ribbon of a blue colored chewing gum. The blue chewing gum can be flavored with a same flavor or a different flavor than the red chewing gum, for example, a lime flavor. The red chewing gum and the blue chewing gum can be fed to the forming stations 308, 310 in a form of ribbon to produce marbled gum sheet having a stripe-like appearance. A width and a thickness of the red gum ribbon may be same or different than that of the blue gum ribbon. For example, the extruder 363 can produce about 1 inch width ribbon, while the extruder 354 produces about 0.5 inch ribbon. In such embodiments, the forming stations 308, 310 can produce marbled gum sheets having more red color chewing gum than the blue color chewing gum. Further, even in embodiments where two extruders 363, 364 produce ribbons having a same size, the amount of each gum in marbled gum sheets can be adjusted by varying feed rate of each gum ribbon. In some embodiments, the extruders 363, 364 can be provided with a die to produce various other shapes of gum outputs to vary patterns of the marbled gum sheets.

In the embodiment shown in FIG. 3, each of the extruders 363, 364 is provided with a cutter 371, 372. In this embodiment, as the extruders 363, 364 produce a gum ribbon, the cutters 371, 372, cut the ribbon into pieces, which can be a consistent predetermined size or random sizes. The red gum pieces 365 and the blue gum pieces 366 are then fed into hoppers 330, 334 of the forming stations 308, 312. An amount of gum pieces 365, 366 fed to forming stations 308, 312 can be varied. By feeding the gums in pieces and/or by varying an amount of each gum, the marbled gum sheets can have a more random pattern. In other embodiments, the gum pieces 365, 366 are premade using various different methods and equipments.

Figure 4:
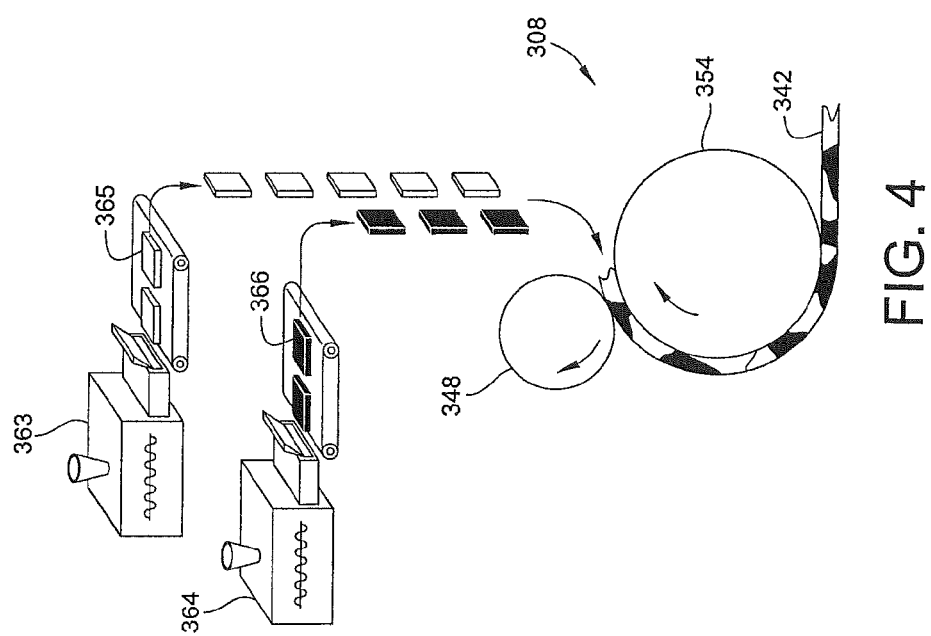
FIG. 4 is a schematic illustration of a forming station of the manufacturing system of FIG. 3 forming a marbled gum sheet.

In one embodiment, the extruders 363, 364 and the cutters 371, 373 are configured to produce approximately equal sized gum pieces. A same amount of red gum pieces 365 and blue gum pieces 366 are fed into the hopper 330. The mixture of gum pieces 365, 366 are then pulled via the counter rotating forming drums 348, 354 through a gap therebetween, and compressively formed into the marbled gum sheet 342. FIG. 4 schematically illustrates the forming station 308 without the hopper 330 to show the mixture of gum pieces 365, 366 being formed into the marbled gum sheet 342 by the forming drums 348, 354. The appearance of marbled gum sheet 342 can be altered by varying a linear speed of the forming drums 348, 354. For example, by increasing a linear speed differential between the forming drums 348, 354, more smeared appearance of the colors can be achieved. The better contrast of colors can be achieved when the forming drums are rotating at a same linear speed. The marbled gum sheet 342 is transferred via the conveyor belt 318 toward the forming stations 310.

The upstream mixing system 304 can produce various different confectioneries, for example, a gum or a candy. In one embodiment, the upstream mixing system 304 prepares a chewy candy such as the chewy candy described in FIG. 2 embodiment. The chewy candy is formed into the chewy candy sheet 344 via the forming station 310, and laminated with the marbled gum sheet 342. The laminated sheet of marbled gum 342 and the chewy candy 344 is then transferred toward the forming station 312 on the conveyor belt 318. The forming station 312 receives the gum pieces 365, 366 from the upstream system 302 and forms the marbled gum sheet 346 similarly as the forming station 308. The marbled gum sheet 346 is then laminated on top of the chewy candy sheet 344. The laminated sheet of marbled gum-chewy candy-marbled gum is then further processed the same as the FIG. 2 embodiment.

Coated Gum

In one embodiment, the manufacturing system 100 of FIG. 1 is configured to make a chewing gum coated on one or both sides. Conventionally, a gum is coated using a panning process, wherein numerous thin layers of sugar syrup coating material are applied on the gum. Such coating process typically takes several hours. In this embodiment, a dough-like coating material is compressively formed and laminated on a gum sheet to form a desirable coating, in as little as a single application in a processing time of seconds to minutes. Further, as the gum forming and coating processes can be carried on in a single line, time and cost savings are great. Although a gum sheet is formed and coated in this embodiment, various different confectionery sheets, such as a chewy candy, can be formed and coated. Further, various different coating materials can be coated to produce a coating having a desired hardness (e,g, soft, hard, crunch.) In some embodiments, a different coating material and/or thicknesses can be coated on each side of the core confectionery sheet. Thus, the manufacturing system 100 can provide a great flexibility in product format.

In one embodiment, a gum sheet is coated with a hard crunch shell, similar to a shell of conventional pellet gums, in a single layer. Such coating can be formulated using solid sugar alcohols or sugar, and a viscous sugar liquid binder. The coating formulation is prepared in the upstream mixing system 102 and fed into the hopper 136. In this embodiment, the coating is formulated using a polyol selected from maltitol, isolmalt and sorbitol, and a binder selected from xanthan gum, sodium alginate, CMC and Tica film (blend of alginate, Carrageenan and CMC). For example, a coating formulation includes malitol and about 3.7 wt. % xantham gum. The coating formulation can also include other ingredients, such as flavors. The coating formulation includes less than 20%, preferably less than 10%, overall moisture content to allow fast drying of the coating.

The coating formulation is compressively formed between the counter rotating forming drums 148, 154. When the coating formulation is compressed between the forming drums 148, 154, the binder adheres to the solid particles and forms a coating film 142 that can be laminated to a gum surface. The gap 125 between the forming drums 148, 154 is set according to the desired thickness of the coating film 142. In one embodiment, the forming drums 148, 154 are configured and operated to form the coating film 142 having a thickness between 0.1 mm and 5 mm, preferably between 0.3 mm and 2 mm, and more preferably between 0.5 mm and 1 mm. The coating film 142 is carried on the conveyor belt 118 toward the forming station 110. The forming station 110 received a desired gum formulation from the upstream mixing system 104 and forms a gum sheet 144 using the forming drums 150, 156. The gum sheet 144 is then laminated on top of the coating film 142 between the lower forming drum 156 and the conveyor belt 118. The coating is formulated such that the coating film 142 has sufficient visco-elasticity characteristics to be compressively formed into a continuous film that can adhere to the gum sheet 144. Further, temperatures of the forming drums 148, 150, 154, 156 are controlled to maintain optimal visco-elasticity characteristics of the coating and the gum, such that the coating film sufficiently adheres to the gum sheet while minimizing any oozing.

The one side coated gum sheet is then transferred on the conveyor belt 118 toward the forming station 112. The upstream mixing system 106 prepare a coating formulation that may be same or different than the coating formulation prepared in the upstream mixing system 102. The coating formulation is then fed into the hopper 140 and formed into a coating film 146 via the forming drums 152, 158. The coating film 146 may have a same or a different thickness than that of the coating film 142. In one embodiment, the coating film 142 may form a crunch coating while the coating film 146 forms a soft coating. The coating film 146 is then laminated on top of the gum sheet 144 via the lower forming drum 158, thereby forming a laminated sheet of coating-gum-coating 160. The coating-gum-coating sheet 160 is then smoothed out by the compression roller 114, and further processed into a desired product format.

Other Embodiments

Figure 5:
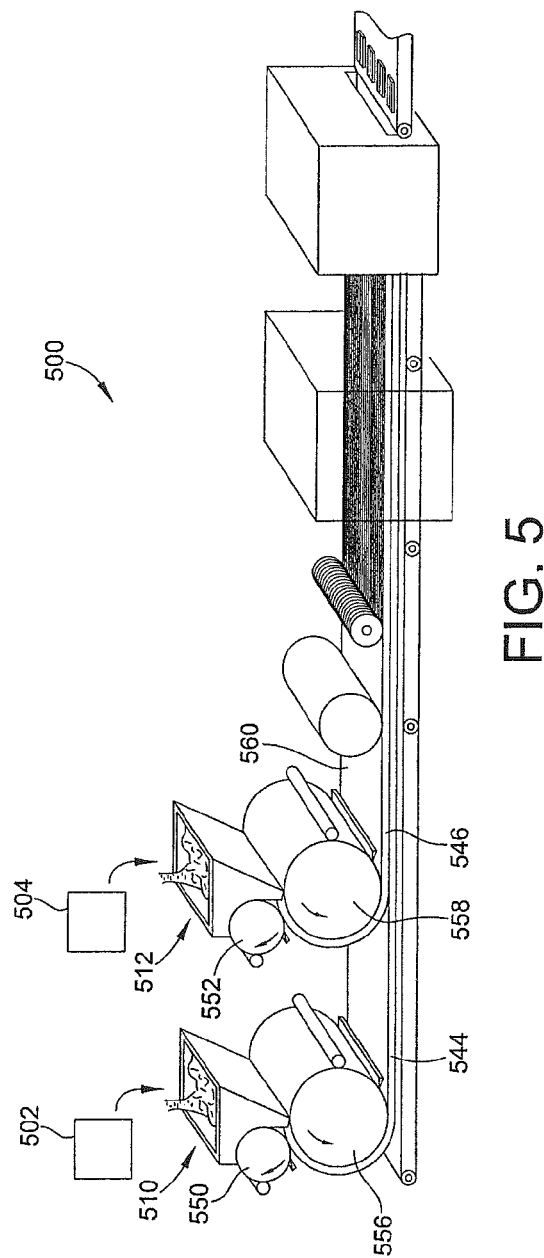
FIG. 5 is a partly schematic and partly perspective illustration of a system for making a two-layer confectionery product according to an embodiment of the present invention.

FIG. 5 shows a manufacturing system 500 according to a different embodiment of the present invention for making a two-layer confectionery product. The system 500 is similarly configured as the system 100 of FIG. 1, but only includes two upstream mixing systems 504, 504, and two forming stations 510, 512. As it was with the system 100, the forming station 512 is arranged downstream of the forming station 510 to form a two-layer laminated sheet 560. Each of the forming stations include counter rotating upper forming drum 550, 552 and low forming drum 156, 158, which forms a confectionery sheet 144, 146, as it was with the system 100. Although the system 500 includes same down steam equipments as the system 100, other down stream equipments can be used with the forming stations 510, 512 to make a desired confectionery product.

Figure 6:
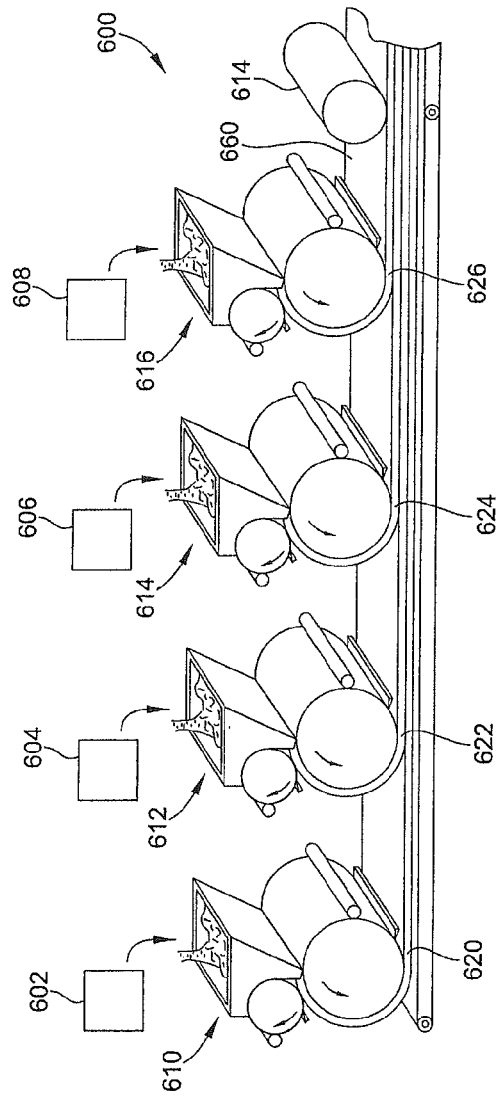
FIG. 6 is a partly schematic and partly perspective illustration of system for making a four-layer confectionery product according an embodiment of the present invention.

FIG. 6 shows a manufacturing 600 according to another embodiment of the present invention for making a four-layer confectionery product. The system 600 is similarly configured as the system 100 of FIG. 1, but includes four upstream mixing systems 602, 604, 606, 608, and four forming stations 610, 612, 614, 616. The forming stations 610, 612, 614, 616 are arranged in series, wherein each forming station forms a confectionery sheet 620, 622, 624, 626, which are laminated together to form a four-layer laminated sheet 660. Depending on the characteristics of the confectioneries and adhesion between layers, a compression roller 614 can be provided downstream of the forming station 616 to smooth out any surface irregularities and/or to even out cross-web thickness of the four-layer sheet 660. The four-layer sheet 660 can then be further processes or stored.

Figure 7:
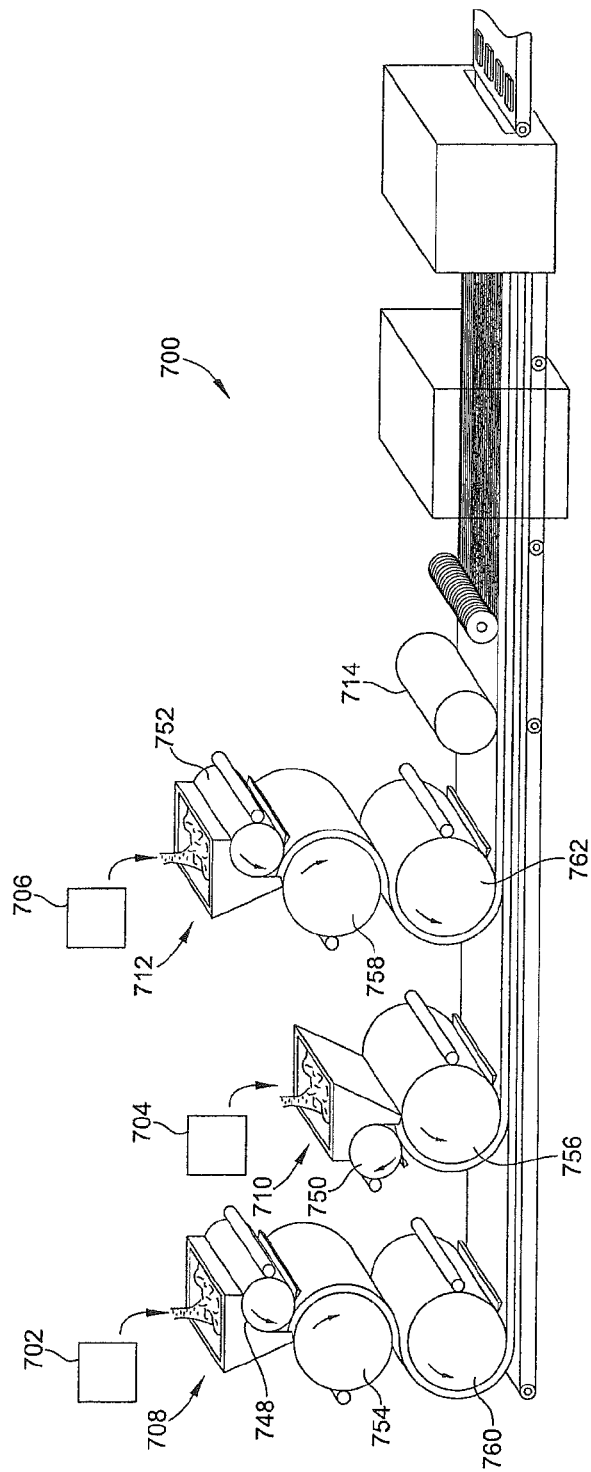
FIG. 7 is a partly schematic and partly perspective illustration of system for making a three-layer confectionery product according to an embodiment of the present invention, wherein some forming stations include three forming drums.

FIG. 7 shows a manufacturing system 700 according to yet another embodiment of the present invention for making a three-layer confectionery product. The system 700 is similarly configured as the system 100, and includes three upstream mixing systems 702, 704, 706, and three forming stations 708, 710, 712. In FIG. 7, the system 700 is also shown with the same down stream equipments as the system 100 of FIG. 1. However, different equipments can be arranged downstream of the forming station 708.

The forming stations 708, 710, 712 are arranged in a series as it was with the system 100. The second forming station 710 is similarly configured and operated as the forming stations 108, 110, 112, and includes two counter-rotating forming drums 750, 756. However, the forming stations 708 and 712 include a third forming drum 760, 762. As shown, the forming stations 708, 712 includes an upper forming drum 748, 752 that is arranged vertically above and horizontally offset from a lower forming drum 754, 758 with a gap therebetween, similar to the upper and lower forming drums of forming stations 108. 110. 112. The forming stations 708, 712 further include the third forming drum 760, 762, which is arranged vertically below the low forming drum 754, 758. Although the third forming drum 760, 762 is shown as sharing a common vertical axis as the lower forming drum 754, 758, the third forming drum 760, 762 can also be arranged horizontally offset from the lower forming drum 754, 758.

The forming drums are configured to counter-rotate against the adjacent forming drum. In this embodiment, the upper forming drum 748, 752 rotates in a counterclockwise direct, while the lower forming drum 754, 758 rotates in a clockwise direction such that the upper forming drum 748, 752 and the lower drum 754, 758 counter-rotate. Further, the third forming drum 760, 762 rotates in a counterclockwise direction, and thus, the lower drum 754, 758 and the third forming drum 760, 762 also counter-rotate. In this embodiment, the lower forming drum 754, 758 and the third forming drum 760, 762 are configured to have a same diameter, while the upper forming drum 748, 752 has a smaller diameter than the lower forming drum and the third forming drum. However, in other embodiments, all three forming drums can be configured to have a same diameter or all different diameters. One or more of the forming drums can be provided with an internal channel to circulate a cooling or heating fluid, such that the forming drums can also function as heat transfer rollers.

In one embodiment, the upstream mixing system 702 makes and feeds a gum formulation into a hopper 730. The counter-rotating upper and lower forming drums 748, 754 pulls the gum through a gap therebetween, and compressively forms a sheet of gum 742. In one embodiment, the gap is set at 2 mm and the upper and lower forming drums 748, 754 are heated to a temperature between about 40° C. and 60° C. to form the gum sheet 742 having an average thickness of about 2 mm at the point of exiting the upper and lower forming drums 748, 754. The gum sheet 742 is then carried on the lower drum 754 and can further be formed between the lower forming drum 754 and the third forming drum 760. When no further thickness reduction is desired, a gap between the lower forming drum 754 and the third forming drum 760 can be set to be the same as the gap between the upper forming drum 748 and the lower forming drum 754. Thus, the lower forming drum 754 and the third forming drum 760 applies no or minimal compressive force on the gum sheet 142, and only act to smooth out any surface irregularity and/or even out the cross-web thickness of the gum sheet 742. In such embodiments, the third forming drum is configured to rotate at a same linear speed as the lower forming drum 754, such that no substantial thickness reduction occurs due to pulling action between the counter-rotating lower forming drum and the third forming drum. The third forming drum 760 can be chilled to lower a temperature of the gum sheet 742 while being carried on the third forming drum 760.

In embodiments, where a further thickness reduction of the gum sheet 742 is desired after being formed between the upper and lower forming drums 748, 754, the gap between the lower forming drum 754 and the third forming drum 760 can be set to be smaller than the gap between the upper and lower forming drums 748, 754. For example, when the gap between the upper and lower forming drums 748, 754 is set at 2 mm, the gap between the lower and third forming drums 754, 760 can be set at 1.5 mm to make the gum sheet having an average thickness of about 1.5 mm. A thickness reduction of the gum sheet 142 can also be achieved by rotating the third roller 760 at a higher linear speed than that of the lower forming drum 754 to pull and stretch the gum sheet 744, thereby reducing the thickness. In such embodiments, the third forming drum 760 can be heated above an ambient temperature to facilitate further forming of the gum sheet 742. The gum sheet 742 is then carried on a conveyor belt 718 toward the second forming station 710.

The upstream mixing system 710 can prepare various different confectioneries as discussed above for previous embodiments. For example, the upstream mixing system 710 can make a candy formulation. The candy is then formed into a sheet of candy 744, and laminated on top of the gum sheet 142 via the lower forming drum 756. The laminated candy sheet 744 and the gum sheet 742 are then transferred toward the forming station 712. The upstream mixing system 706 can prepare various different confectionery formulations. In this embodiment, the upstream mixing system 706 prepares and feeds a gum to the forming station 712. The forming station 712 forms a sheet of gum 746 having a desired thickness using the forming drums 752, 758, 762, similarly as the forming station 708. The gum sheet 746 is then laminated on top of the candy sheet 744 by the third forming drum 762, thereby forming a gum-candy-gum sheet 764. The gum-candy-gum sheet 764 is then carried on the conveyor belt 718 toward a compression roller 714, wherein the compression roller 714 smoothes out any surface irregularities and/or even out cross-web thickness of the gum-candy-gum sheet 764.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for forming a multilayered confectionery, comprising:
   a conveyor belt;
   a first forming station for forming a first confectionery sheet and depositing the first confectionery sheet onto the conveyor, the first forming station having a first pair of forming drums including a first forming drum and a second forming drum arranged with a gap therebetween;
   a second forming station for forming a second confectionery sheet and depositing the second confectionery sheet onto the first confectionery sheet, the second forming station having a second pair of forming drums including a third forming drum and a fourth forming drum arranged with another gap therebetween, the second forming station being arranged downstream from and in series with the first forming station;
   a gap setting device for adjusting a position of at least one of the first pair of forming drums and the second pair of forming drums to set at least one of the gap and the another gap at between to about 0.3 mm and 10 mm; and a mixing station for forming a confectionery structure, the mixing station being arranged upstream from at least one of the first forming station and the second forming station such that the confectionery structure is supplied to at least one of the first forming station and the second forming station;

wherein at least one of the second pair of forming drums is positioned to laminate the second confectionery sheet and the first confectionery sheet to form a multilayer confectionery sheet.

2. The apparatus of claim 1, wherein the second forming drum is arranged in an offset relation with the first forming drum; wherein the first forming drum and the second forming drum counter rotate to pull a first confectionery through the gap therebetween and compress the first confectionery to form the first confectionery sheet;

wherein the first forming drum and the second forming drum are configured and structured to maintain a maximum deflection under 0.5 mm during forming, wherein the maximum deflection is a maximum variance of the gap between the first and second forming drums across the width of the first and second forming drums; and the fourth forming drum is arranged in an offset relationship with the third forming drum;

wherein the third forming drum and the fourth forming drum counter rotate to pull a second confectionery through the gap therebetween and compress the second confectionery to form the second confectionery sheet; and wherein the third forming drum and the fourth forming drum are configured and structured to maintain the maximum deflection under 0.5 mm during forming.

3. The apparatus of claim 2, wherein the first set of forming drums forms a gum sheet having an average thickness between about 2 mm and 6 mm with a coefficient of variation of less than 15% from a gum structure; wherein each of the first forming drum and the second forming drum includes an internal channel for circulating a heat transfer fluid; the first and second forming drums being heated to a surface temperature between about 40° C. and 60° C. by circulating a heated fluid through the internal channels.

4. The apparatus of claim 3, wherein the mixing station is a gum mixing system for mixing a plurality of gum ingredients to prepare the gum structure, wherein the mixing station comprises at least one continuous mixer or at least one batch mixer.

5. The apparatus of claim 3, further including a roller arranged downstream of the second pair of forming drums, wherein the roller is arranged on the conveyor belt with a gap therebetween, the gap between the roller and the conveyor belt being approximately equal to an average thickness of the multilayer confectionery sheet, wherein the roller is chilled to a surface temperature of between about 5° C. and 20° C.

6. The apparatus of claim 3, wherein the first set of forming drums further includes a fifth forming drum, the fifth forming drum being arranged adjacent to the second forming drum of the first set of forming drums with a gap there between, wherein the gap between the second forming drum and the fifth forming drum is equal to or less than the gap between the first forming drum and the second forming drum.

7. The apparatus of claim 6, wherein the fifth forming drum is chilled to a surface temperature between about 5° C. and 25° C.

8. The apparatus of claim 1, wherein the first pair of forming drums and the second pair of forming drums are configured to produce a confectionery sheet having a width between 0.9 m and 1.3 m.

9. The apparatus of claim 1, further including a shaping system downstream of the at least two sets of forming drums for converting the multilayer confectionery sheet into a desired shape.

10. The apparatus of claim 1, further including a cooling station downstream of the at least two sets of forming drums.

* * * * *